US012638338B2

(12) United States Patent
Clements et al.

(10) Patent No.: US 12,638,338 B2
(45) Date of Patent: May 26, 2026

(54) SYSTEM AND METHOD FOR TEMPERATURE SENSING USING THERMOPILE INTEGRATED WITH RIGID PRINTED CIRCUIT BOARD

(71) Applicant: Apple Inc., Cupertino, CA (US)

(72) Inventors: James C. Clements, Campbell, CA (US); Lan Hoang Hoang, Los Gatos, CA (US); Leilei Zhang, Sunnyvale, CA (US); Jacky G. Ko, Sunnyvale, CA (US); Jafir A. Haidri, San Francisco, CA (US); Xinsheng Chu, Saratoga, CA (US); Saahil Mehra, Brookline, MA (US)

(73) Assignee: Apple Inc., Cupertino, CA (US)

( * ) Notice: Subject to any disclaimer, the term of this patent is extended or adjusted under 35 U.S.C. 154(b) by 593 days.

(21) Appl. No.: 17/930,053

(22) Filed: Sep. 6, 2022

(65) Prior Publication Data

US 2023/0099638 A1     Mar. 30, 2023

Related U.S. Application Data

(60) Provisional application No. 63/371,820, filed on Aug. 18, 2022, provisional application No. 63/261,663, (Continued)

(51) Int. Cl.
| | |
|---|---|
| *G01K 1/143* | (2021.01) |
| *G01K 7/04* | (2006.01) |
| *G01K 13/20* | (2021.01) |

(52) U.S. Cl.
CPC ............... *G01K 1/143* (2013.01); *G01K 7/04* (2013.01); *G01K 13/20* (2021.01)

(58) Field of Classification Search
CPC .......... G01K 1/143; G01K 7/04; G01K 13/20; G01K 1/026; G01K 3/14; G01K 7/42; G01K 17/00
(Continued)

(56) References Cited

U.S. PATENT DOCUMENTS

| | | |
|---|---|---|
| 4,138,878 A | 2/1979 | Holmes et al. |
| 4,197,738 A | 4/1980 | Degenne |

(Continued)

FOREIGN PATENT DOCUMENTS

| | | |
|---|---|---|
| CN | 109632144 A | 4/2019 |
| CN | 111867456 A | 10/2020 |

(Continued)

OTHER PUBLICATIONS

Extended European Search Report received for European Patent Application No. 22197480.1, mailed on May 25, 2023, 12 pages.
(Continued)

*Primary Examiner* — Kristina M Deherrera
*Assistant Examiner* — Evan Mancini
(74) *Attorney, Agent, or Firm* — Kubota & Basol LLP

(57)     ABSTRACT

Robust estimation of temperatures inside and outside a device can be achieved using one or more absolute temperature sensors optionally in conjunction with thermopile heat flux sensors. Thermopile temperature sensing systems can measure a temperature gradient across two locations within the device, to estimate absolute temperature at locations that are impractical to measure using absolute temperature sensors. Using heat flux models associated with the device, the thermopile temperature sensing system can be used to estimate temperature associated with objects that contact an outer surface of the device, such as a user's skin temperature. Additionally, the thermopile temperature sensing system can be used to estimate ambient air temperature.

(Continued)

Within a device, temperature measurements from the thermopile temperature sensors can be used to compensate sensor measurements, such as when the accuracy or reliability of a sensor varies with temperature.

20 Claims, 15 Drawing Sheets

Related U.S. Application Data filed on Sep. 25, 2021, provisional application No. 63/261,661, filed on Sep. 24, 2021, provisional application No. 63/261,659, filed on Sep. 24, 2021, provisional application No. 63/261,660, filed on Sep. 24, 2021.

(58) Field of Classification Search
USPC ........................................................ 374/126
See application file for complete search history.

(56) References Cited

U.S. PATENT DOCUMENTS

| | | | |
|---|---|---|---|
| 4,567,365 | A | 1/1986 | Degenne |
| 5,294,200 | A | 3/1994 | Rall |
| 6,278,051 | B1 | 8/2001 | Peabody |
| 9,664,569 | B2 | 5/2017 | Mittleman et al. |
| 9,704,209 | B2 | 7/2017 | Proud et al. |
| 9,976,908 | B2 | 5/2018 | Jarboe et al. |
| 10,060,803 | B2 | 8/2018 | Nakagawa et al. |
| 10,098,548 | B2 | 10/2018 | Abreu |
| 10,227,063 | B2 | 3/2019 | Abreu |
| 10,670,546 | B2 | 6/2020 | Rud et al. |
| 11,313,741 | B2 | 4/2022 | Lupo et al. |
| 2005/0043631 | A1 | 2/2005 | Fraden |
| 2006/0056487 | A1 | 3/2006 | Kuroda et al. |
| 2006/0071323 | A1 | 4/2006 | Martin et al. |
| 2009/0219969 | A1 | 9/2009 | Yamamoto |
| 2011/0118608 | A1* | 5/2011 | Lindner ................. A61B 5/015 600/474 |
| 2011/0273378 | A1 | 11/2011 | Alameh et al. |
| 2012/0128024 | A1 | 5/2012 | Tsuchida et al. |
| 2012/0134386 | A1 | 5/2012 | Bender et al. |
| 2013/0331728 | A1 | 12/2013 | Sun et al. |
| 2014/0278201 | A1 | 9/2014 | Shimizu |
| 2015/0104206 | A1 | 4/2015 | Okada |
| 2015/0258544 | A1* | 9/2015 | Stern ................. B01L 3/502746 506/40 |
| 2015/0308906 | A1 | 10/2015 | Durrer et al. |
| 2016/0178443 | A1* | 6/2016 | Emadi ................... G01J 5/0816 374/133 |
| 2016/0238463 | A1 | 8/2016 | Bieberich et al. |
| 2017/0147017 | A1 | 5/2017 | Ishii et al. |
| 2017/0258329 | A1 | 9/2017 | Marsh |
| 2017/0311812 | A1 | 11/2017 | Husheer |
| 2017/0320463 | A1* | 11/2017 | Saitou ................. B60N 2/0026 |
| 2018/0313699 | A1* | 11/2018 | Vaiana ................... H03H 17/02 |
| 2019/0049317 | A1 | 2/2019 | Tsuchimoto |
| 2019/0117155 | A1 | 4/2019 | Cross et al. |
| 2019/0388031 | A1* | 12/2019 | Haber ................... G01K 7/427 |
| 2020/0085310 | A1 | 3/2020 | Zahner et al. |
| 2021/0028340 | A1 | 1/2021 | Taniguchi |
| 2021/0223817 | A1 | 7/2021 | Ishii et al. |
| 2021/0404883 | A1 | 12/2021 | Rahmani et al. |
| 2022/0000375 | A1 | 1/2022 | Meisal |
| 2022/0026284 | A1 | 1/2022 | Clements et al. |
| 2023/0098236 | A1 | 3/2023 | Tadele et al. |
| 2023/0099531 | A1 | 3/2023 | Tadele et al. |
| 2024/0060832 | A1 | 2/2024 | Huang et al. |

FOREIGN PATENT DOCUMENTS

| | | | | |
|---|---|---|---|---|
| CN | 112189129 | A | 1/2021 | |
| CN | 112771357 | A | 5/2021 | |
| DE | 102004059730 | A1 | 10/2005 | |
| EP | 0003271 | A1 | 8/1979 | |
| EP | 2099264 | A1 | 9/2009 | |
| EP | 2458356 | A2 | 5/2012 | |
| EP | 3064917 | A1 | 9/2016 | |
| EP | 3431946 | A1 | 1/2019 | |
| EP | 4155699 | A1 | 3/2023 | |
| GB | 1182937 | A | 3/1970 | |
| JP | 2009-192431 | A | 8/2009 | |
| JP | 5368715 | B2 * | 12/2013 | |
| JP | 2021022615 | A * | 2/2021 | ............ H05K 7/205 |
| JP | WO2020184511 | A1 | 3/2021 | |
| WO | 1999/019702 | A1 | 4/1999 | |
| WO | WO-2014194077 | A2 * | 12/2014 | ............ G01K 19/00 |
| WO | 2015/088024 | A1 | 6/2015 | |
| WO | 2016/067952 | A1 | 5/2016 | |
| WO | 2016/116481 | A1 | 7/2016 | |
| WO | WO-2021059391 | A1 * | 4/2021 | ............ G01K 17/00 |

OTHER PUBLICATIONS

Extended European Search Report received for European Patent Application No. 22197502.2, mailed on Feb. 23, 2023, 9 pages.

Extended European Search Report received for European Patent Application No. 22197505.5, mailed on May 30, 2023, 12 pages.

Partial European Search Report received for European Patent Application No. 22197480.1, mailed on Feb. 20, 2023, 7 pages.

Partial European Search Report received for European Patent Application No. 22197505.5, mailed on Feb. 23, 2023, 7 pages.

Tamura et al., "Current Developments in Wearable Thermometers", Advanced Biomedical Engineering, vol. 7, 2018, pp. 88-99.

Yousef et al., "Vertical Thermopiles Embedded in a Polyimide-Based Flexible Printed Circuit Board", Journal of Microelectromechanical Systems, vol. 16, No. 6, Dec. 2007, pp. 1341-1348.

Non-Final Office Action received for U.S. Appl. No. 17/930,041, mailed on Apr. 24, 2025, 16 pages.

Extended European Search Report received for European Patent Application No. 23191664.4, mailed on Jan. 26, 2024, 8 pages.

Restriction Requirement received for U.S. Appl. No. 17/930,057, mailed on Dec. 27, 2024, 7 pages.

Kitamura, et al., "Development of a New Method for the Noninvasive Measurement of Deep Body Temperature Without a Heater", Medical Engineering & Physics, vol. 32, No. 1, 2010, pp. 1-6.

Restriction Requirement received for U.S. Appl. No. 17/930,057, mailed on Apr. 30, 2025, 7 Pages.

Search Report received for Chinese Patent Application No. 202211163270.5, mailed on Jun. 14, 2025, 7 pages (4 pages of English Translation and 3 Pages of Official Copy).

Search Report received for Chinese Patent Application No. 202211162589.6, mailed on Jul. 5, 2025, 7 pages (4 pages of English Translation and 3 Pages of Official Copy).

Search Report received for Chinese Patent Application No. 202211165123.1, mailed on Jul. 10, 2025, 6 pages (3 pages of English Translation and 3 Pages of Official Copy).

Final Office Action received for U.S. Appl. No. 17/930,057, mailed on Dec. 1, 2025, 10 pages.

Non-Final Office Action received for U.S. Appl. No. 17/930,057, mailed on Jun. 23, 2025, 11 pages.

Corrected Notice of Allowability received for U.S. Appl. No. 17/930,041, mailed on Oct. 23, 2025, 2 pages.

Notice of Allowance received for U.S. Appl. No. 17/930,041, mailed on Jul. 7, 2025, 8 pages.

Non-Final Office Action received for U.S. Appl. No. 18/353,040, mailed on Oct. 1, 2025, 7 pages.

* cited by examiner

MOBILE TELEPHONE 136

TOUCH SCREEN 124

TOUCH SCREEN 126

MEDIA PLAYER 140

TOUCH SCREEN 128

PERSONAL COMPUTER 144

TRACK PAD 146

TOUCH SCREEN 130

TABLET COMPUTER 148

STRAP 154

TOUCH SCREEN 152

WEARABLE DEVICE 150

154 STRAP

WEARABLE
DEVICE
160

FRONT FACE
162

FRONT SENSING
REGION
163

HOUSING
164

BACK SENSING
REGION
165

BACK FACE
166

170

172

174

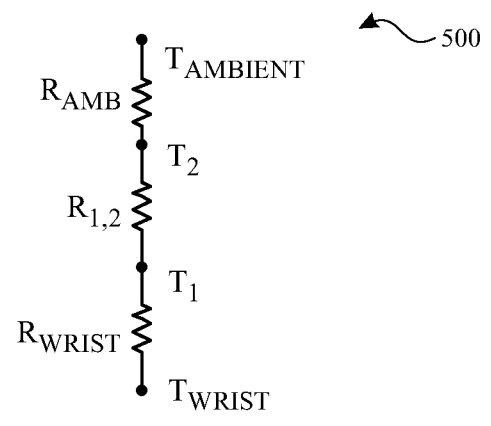
FIG. 5A
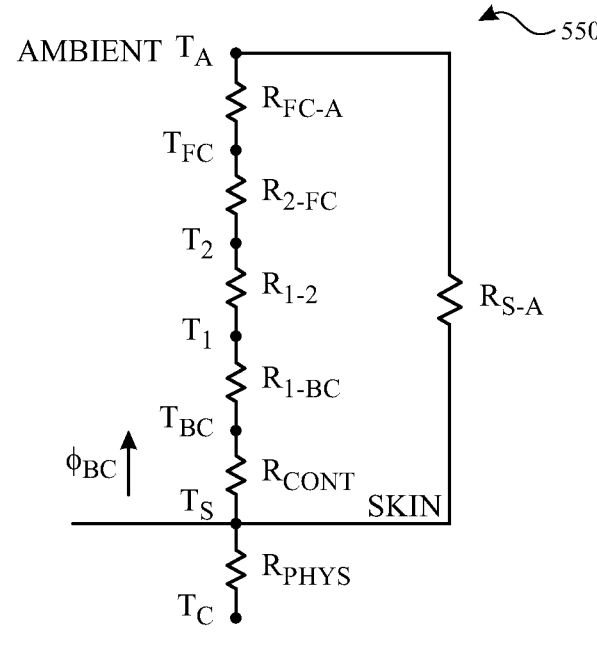
FIG. 5B
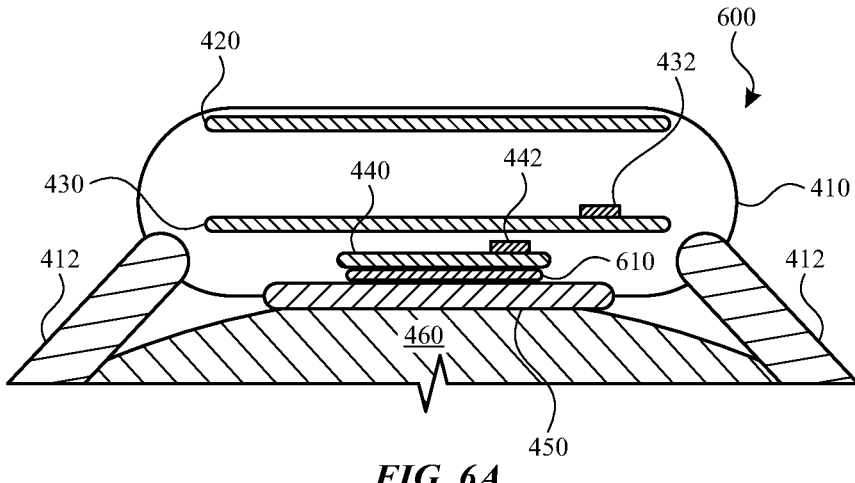
FIG. 6A

TO BACK CRYSTAL

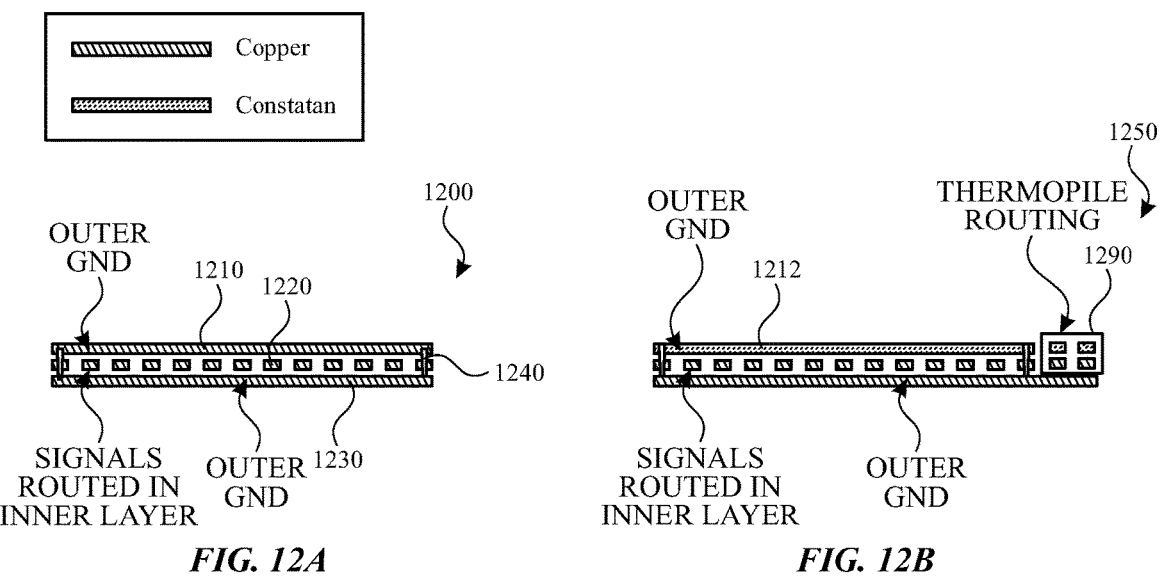
FIG. 12A                    FIG. 12B
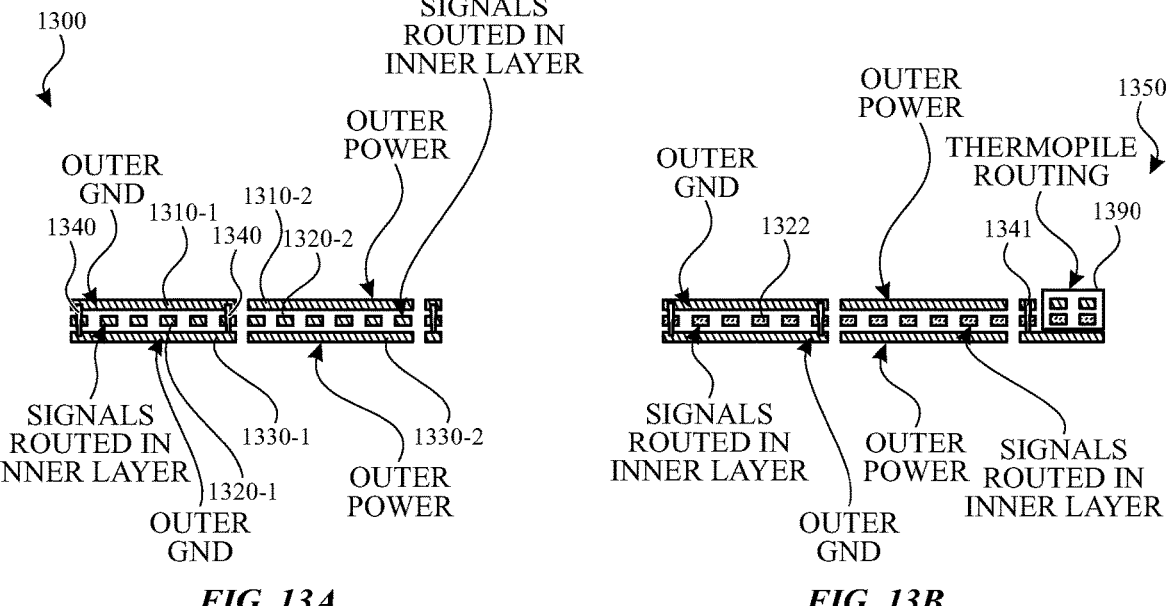
FIG. 13A                    FIG. 13B

SYSTEM AND METHOD FOR TEMPERATURE SENSING USING THERMOPILE INTEGRATED WITH RIGID PRINTED CIRCUIT BOARD

CROSS-REFERENCE TO RELATED APPLICATIONS

This application claims the benefit of U.S. Provisional Application No. 63/261,659, filed Sep. 24, 2021, U.S. Provisional Application No. 63/261,660, filed Sep. 24, 2021, U.S. Provisional Application No. 63/261,661, filed Sep. 24, 2021, U.S. Provisional Application No. 63/261,663, filed Sep. 25, 2021, and U.S. Provisional Application No. 63/371,820, filed Aug. 18, 2022, the contents of which are incorporated herein by reference in their entireties for all purposes.

FIELD OF THE DISCLOSURE

This relates generally to temperature sensing systems and methods, and more particularly, to temperature sensing systems and methods using a thermopile and/or multiple temperature sensors.

BACKGROUND OF THE DISCLOSURE

Many types of electronic devices include a temperature sensor for measuring a temperature. The temperature sensor can measure a temperature at a location within the electronic device, and provide a signal corresponding to its temperature measurement to a processor on the electronic device.

SUMMARY OF THE DISCLOSURE

In some examples, systems and methods for temperature sensing using a thermopile (a collection of series-connected thermocouples) are disclosed. An electronic device can leverage measurements from multiple sensors—including at least one absolute temperature sensor and at least one other absolute or gradient sensor such as at least one thermopile temperature sensor—within the device, to estimate temperature inside or outside the device. In some examples, an electronic device estimates the temperature of the surrounding air (e.g., ambient air temperature) using measurements from sensors within the device. In other examples, an electronic device estimates the temperature of objects (e.g., skin or body temperature) contacting one or more of its surfaces (e.g., a rear surface of the device, a front surface, etc.). In some examples, one or more absolute temperature sensors within the electronic device can be disposed on or otherwise integrated with one or more printed circuit board (PCB) (e.g., a logic board, a system-in-package, a display, etc.). In some examples, a thermopile temperature can be configured to measure a temperature differential inside the device. In some examples, a thermopile can be embedded within or otherwise integrated with a rigid circuit board (e.g., a rigid PCB). In some examples, a thermopile can be embedded, or otherwise integrated, within a flexible printed circuit (FPC, also referred to herein as a flexible circuit or flex circuit). In some examples, the thermopile can be embedded or otherwise integrated within rigid PCBs and FPCs that are used within an electronic device for other purposes to reduce the additional space required for temperature and/or heat flux sensing by the device. A temperature differential measurement (temperature gradient measurement) of the thermopile temperature sensor can be used for inferring heat flux (e.g., through the electronic device) and/or to estimate temperatures outside the device (e.g., air temperature around the device, surface temperature of objects contacting the device housing, body temperature of a user wearing the device, etc.).

In some examples, temperature sensing systems of electronic devices and methods that utilize multiple temperature sensors are disclosed. An electronic device can leverage measurements from a plurality of temperature sensors, including, for example, a first absolute temperature sensor at a first location in the device and a second absolute temperature sensor at a second location in the device, to estimate temperature inside or outside the device (e.g., temperature of the surrounding air (e.g., ambient air temperature) or the temperature of objects (e.g., skin or body temperature) contacting one or more of its surfaces (e.g., a rear surface of the device, a front surface, etc.)) using measurements from the temperature sensors of the device, optionally in addition to thermal resistance values at various locations inside and/or outside the device. In some examples, the first absolute temperature sensor is disposed on or otherwise integrated with a first printed circuit board (PCB) (e.g., a logic board, a main logic board, a system-in-package component, a display, etc.) and the second absolute temperature sensor is disposed on or otherwise integrated with a second PCB different from the first PCB. In some examples, estimating temperatures outside of the electronic device is a function of a first temperature measurement from the first absolute temperature sensor, a second temperature measurement from the second absolute temperature measurement, and one or more thermal resistance values corresponding to various locations or regions inside and/or outside the device. In some examples, an electronic device leverages measurements from a plurality of temperature sensors, including, for example, at least two temperature sensors (e.g., 2, 3, or 4 temperature sensors), to measure and/or estimate ambient temperature.

BRIEF DESCRIPTION OF THE DRAWINGS

FIGS. 5A and 5B illustrate simplified schematic views of heat flux models for an electronic device relative to a user's body according to some examples of the disclosure.

FIG. 6A illustrates a cross-sectional side view of an exemplary electronic device with temperature sensing circuitry and/or heat flux sensing circuitry integrated with a printed circuit board according to some examples of the disclosure.

FIG. 12A illustrates a cross-sectional side view of an exemplary flexible circuit with an inner layer used for signal propagation and outer ground layers that protect the inner layer according to some examples of the disclosure.

FIG. 12B illustrates a cross-sectional side view of the exemplary flexible circuit of FIG. 12A with an integrated thermopile according to some examples of the disclosure.

FIG. 13A illustrates a cross-sectional side view of an exemplary flexible circuit with a first segment using an inner layer for data signal propagation and a second segment using an outer layer (or outer layers) for power signal propagation according to some examples of the disclosure.

FIG. 13B illustrates a cross-sectional side view of the exemplary flexible circuit of FIG. 13A with an integrated thermopile according to some examples of the disclosure.

DETAILED DESCRIPTION

Figures 1A, 1B, 1C, 1D, 1E:
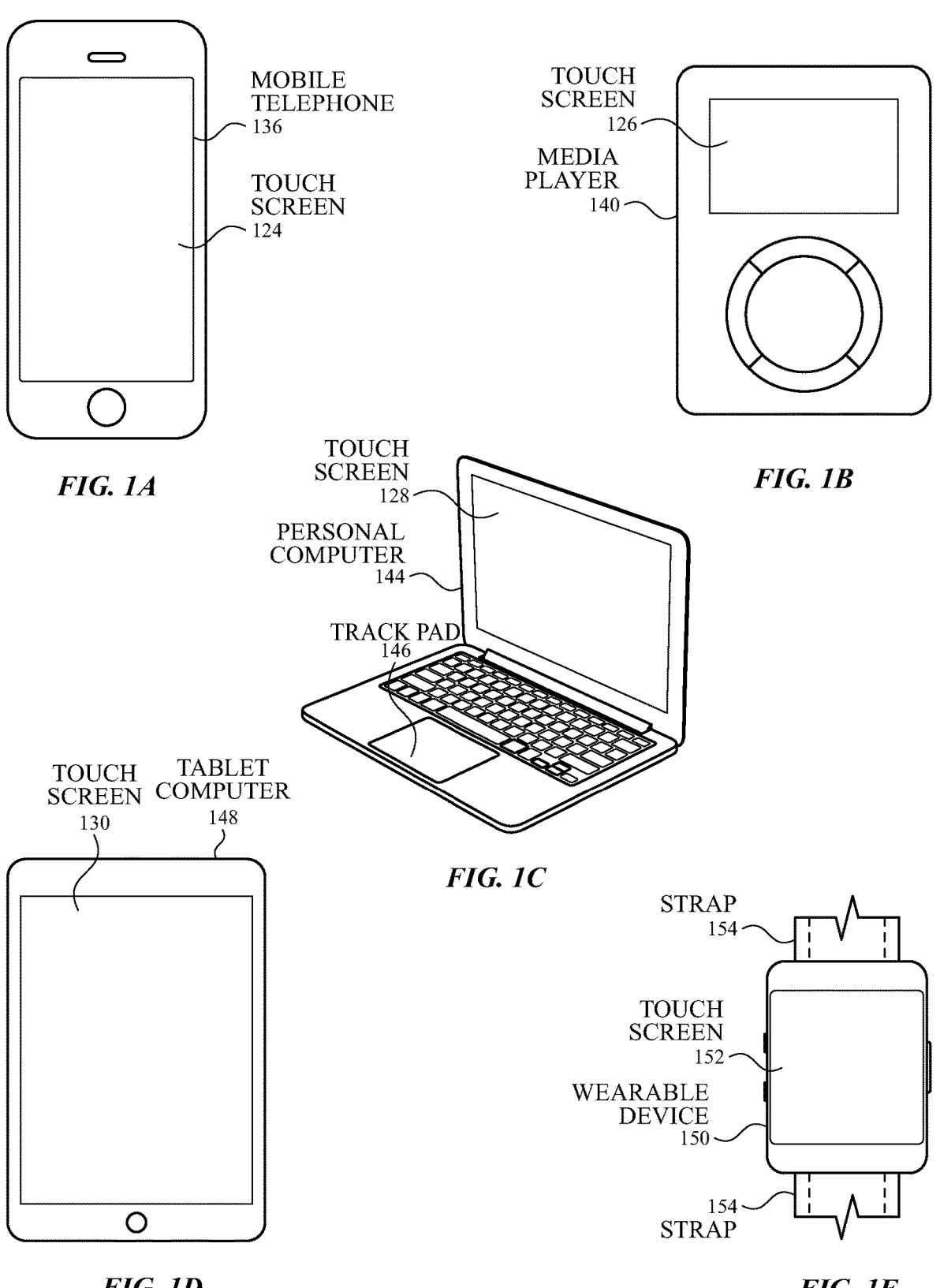
FIGS. 1A-1G illustrate exemplary systems with heat flux and/or temperature sensors configured for measuring or estimating temperatures within and/or outside the system according to some examples of the disclosure.

In the following description of examples, reference is made to the accompanying drawings which form a part hereof, and in which it is shown by way of illustration specific examples that are optionally practiced. It is to be understood that other examples are optionally used and structural changes are optionally made without departing from the scope of the disclosed examples.

This relates to systems and methods for temperature sensing using a thermopile (a collection of series-connected thermocouples). An electronic device can leverage measurements from multiple sensors—including at least one absolute temperature sensor and at least one other absolute or gradient sensor such as at least one thermopile temperature sensor—within the device, to estimate temperature inside or outside the device. In some examples, an electronic device estimates the temperature of the surrounding air (e.g., ambient air temperature) using measurements from sensors within the device. In other examples, an electronic device estimates the temperature of objects (e.g., skin or body temperature) contacting one or more of its surfaces (e.g., a rear surface of the device, a front surface, etc.). In some examples, one or more absolute temperature sensors within the electronic device can be disposed on or otherwise integrated with one or more printed circuit board (PCB) (e.g., a logic board, a system-in-package, a display, etc.). In some examples, a thermopile temperature sensor can be configured to measure a temperature differential inside the device. In some examples, a thermopile can be embedded within or otherwise integrated with a rigid circuit board (e.g., a rigid PCB). In some examples, a thermopile can be embedded, or otherwise integrated, within a flexible printed circuit (FPC, also referred to herein as a flexible circuit or flex circuit). In some examples, the thermopile can be embedded or otherwise integrated within rigid PCBs and FPCs that are used within an electronic device for other purposes to reduce the additional space required for temperature and/or heat flux sensing by the device. A temperature differential measurement (temperature gradient measurement) of the thermopile temperature sensor can be used for inferring heat flux (e.g., through the electronic device) and/or to estimate temperatures outside the device (e.g., air temperature around the device, surface temperature of objects contacting the device housing, body temperature of a user wearing the device, etc.).

This also relates to temperature sensing systems of electronic devices and methods that utilize multiple temperature sensors. An electronic device can leverage measurements from a plurality of temperature sensors, including, for example, a first absolute temperature sensor at a first location in the device and a second absolute temperature sensor at a second location in the device, to estimate temperature inside or outside the device (e.g., temperature of the surrounding air (e.g., ambient air temperature) or the temperature of objects (e.g., skin or body temperature) contacting one or more of its surfaces (e.g., a rear surface of the device, a front surface, etc.)) using measurements from the temperature sensors of the device, optionally in addition to thermal resistance values at various locations inside and/or outside the device. In some examples, the first absolute temperature sensor is disposed on or otherwise integrated with a first printed circuit board (PCB) (e.g., a logic board, a main logic board, a system-in-package component, a display, etc.) and the second absolute temperature sensor is disposed on or otherwise integrated with a second PCB different from the first PCB. In some examples, estimating temperatures outside of the electronic device is a function of a first temperature measurement from the first absolute temperature sensor, a second temperature measurement from the second absolute temperature measurement, and one or more thermal resistance values corresponding to various locations or regions inside and/or outside the device. In some examples, an electronic device leverages measurements from a plurality of temperature sensors, including, for example, at least two temperature sensors (e.g., 2, 3, or 4 temperature sensors), to measure and/or estimate ambient temperature.

FIGS. 1A-1G illustrate exemplary systems with heat flux and/or temperature sensors configured for measuring or estimating temperatures within and/or outside the system according to some examples of the disclosure. As described herein, thermopile temperature sensors measure a temperature differential (temperature gradient measurement) corresponding to a difference or gradient in temperature between two locations within the electronic device. In some examples, systems provided with thermopile temperature sensors use temperature gradient measurements to estimate heat flux within the device. In some examples, the systems described herein can use measurements from thermopile temperature sensors to estimate external temperatures (e.g., ambient air temperature, skin temperature, etc.).

FIG. 1A illustrates an exemplary mobile telephone 136 that includes a touch screen 124 and can include a thermopile temperature sensing system according to some examples of the disclosure. FIG. 1B illustrates an example digital media player 140 that includes a touch screen 126 and can include a thermopile temperature sensing system according to some examples of the disclosure. FIG. 1C illustrates an example personal computer 144 that includes a touch screen 128 and a track pad 146, and can include a thermopile temperature sensing system according to some examples of the disclosure. FIG. 1D illustrates an example tablet computing device 148 that includes a touch screen 130 and can include a thermopile temperature sensing system according to some examples of the disclosure. In some examples, the thermopile temperature sensing system within mobile telephone 136, digital media player 140, personal computer 144 or tablet computing device 148 can be used to measure temperatures associated with touch screens 124, 126, 128 or 130, or with track pad 146 (e.g., temperatures inside these devices, temperatures outside these device, temperatures of surfaces contacting or in proximity to the touch screen or track pad of these devices, etc.).

Figure 1F:
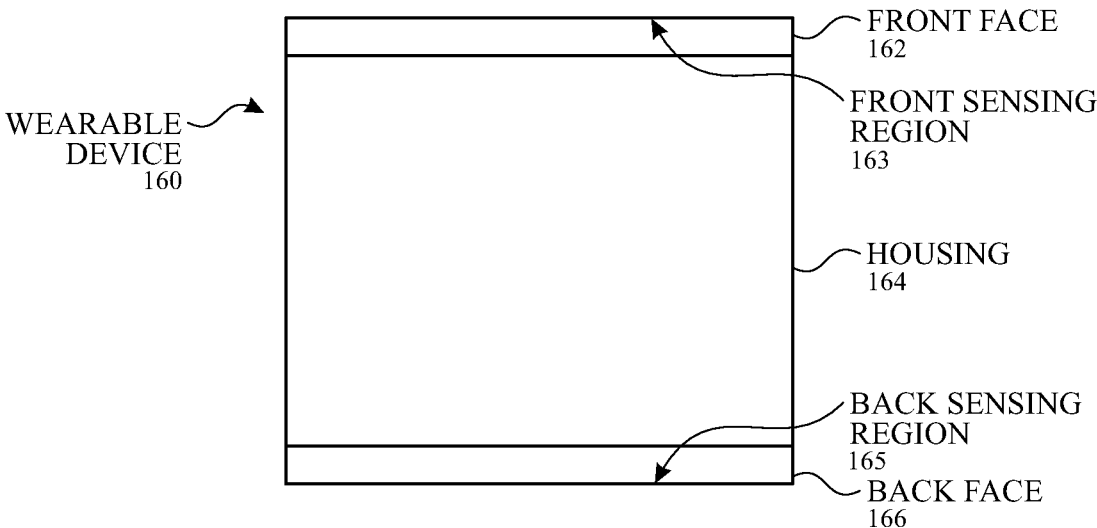

FIG. 1E illustrates an example wearable device 150 (e.g., a watch) that includes a touch screen 152 and can include a thermopile temperature sensing system according to some examples of the disclosure. In some examples, the thermopile temperature sensing system within wearable device 150 can be configured to measure temperatures associated with touch screen 152. Wearable device 150 can be coupled to a user via strap 154 or any other suitable fastener. FIG. 1F illustrates another example wearable device 160 (or alternatively can be viewed as a side view of wearable device 150), that can include a thermopile temperature sensing system according to some examples of the disclosure. Wearable device 160 can include a front face 162, a housing 164 and a back face 166. The front face 162 is sometimes referred to herein as the "front crystal" of wearable device 160 and the back face 166 is sometimes referred to herein as the "back crystal" of wearable device 160. However, it should be understood that the front face 162 and back face 166 generally refer to a substrate such as glass, plastic, or crystal. For example, the front face 162 and back face 166 (also referred to as a rear face) can protect internal components of wearable device 160, but also allow for optical transmission from a display screen (e.g., touch screen) and/or optical sensors. In some examples, the thermopile temperature sensing system within wearable device 160 can be used to measure temperatures associated with a touch screen located at front face 162. In such examples, the thermopile temperature sensing system can be configured to measure the temperature at a location or region 163 inside wearable device 160 (e.g., optionally closer to the front face 162 than a location of an absolute temperature sensor). Alternatively, or additionally, the thermopile temperature sensing system can be used to estimate the temperature outside of wearable device 160, such as the temperature of air contacting front face 162, or the temperature of other objects at least partially in contact with, or overlapping, front face 162. In some examples, the thermopile temperature sensing system within wearable device 160 can used to measure temperatures associated with an optical system located at back face 166. In such examples, the thermopile temperature sensing system can be configured to measure the temperature at a location or region 165 inside wearable device 160 (e.g., optionally closer to the back face 166 than a location of an absolute temperature sensor). Alternatively, or additionally, the thermopile temperature sensing system can be used to estimate the temperature outside of wearable device 160, such as the temperature of air contacting back face 166, or the temperature of other objects at least partially in contact with, or overlapping, back face 166 (e.g., skin temperature at the wrist). Finally, the thermopile temperature sensing system can be used to estimate the temperature at any location within wearable device 160, as well as the temperature of objects outside wearable device 160 (e.g., the air surrounding wearable device 160, or objects at least partially in contact with front face 162, rear face 166, or housing 164).

Figure 1G:
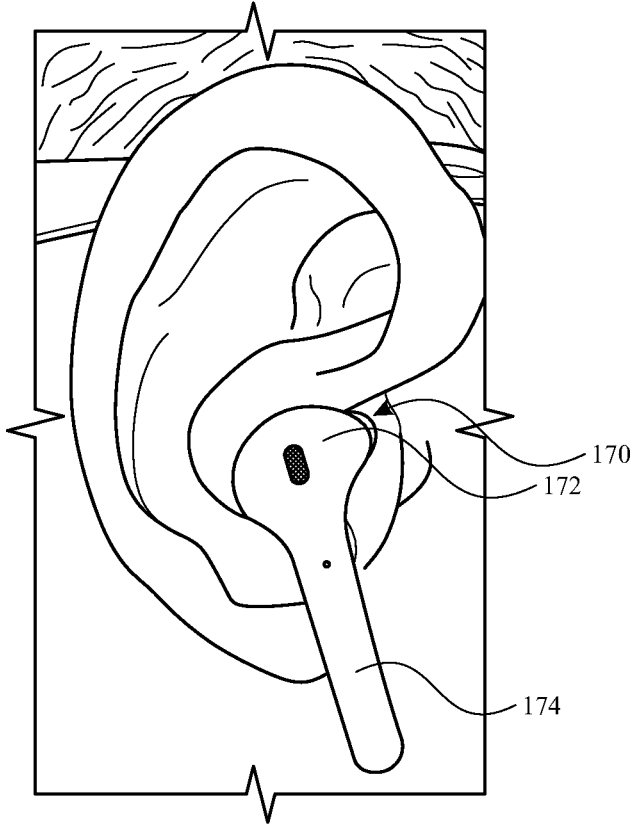

FIG. 1G illustrates another example wearable device, in-ear headphones 170, that can include thermopile temperature sensing system according to some examples of the disclosure. In some examples, the thermopile temperature sensing system within in-ear headphones 170 is used to measure temperatures of components within in-ear headphones 170, such as temperatures associated with circuitry within in earbud 172 or protrusion 174. Alternatively, or additionally, the thermopile temperature sensing system can be used to estimate the temperature outside of in-ear headphones 170, such as the temperature of air contacting earbud 172, or protrusion 174, and the temperature of other objects at least partially in contact with, or overlapping, earbud 172, or protrusion 174 (e.g., ear/body temperature).

It should be understood that the example devices illustrated in FIGS. 1A-1G are provided by way of example, and other types of devices can include a thermopile temperature sensing system for detecting temperatures within or outside the devices. For example, the devices can include devices worn on or placed into contact with the face, the head, or the fingers of a user (or at another location on a user's body. The devices can include over-ear headphones, glasses, head bands, chest straps, wrist straps, rings, etc. For example, glasses worn on a user's face can include a thermopile temperature system to estimate skin temperature at a user's temples, forehead or nose, among other possibilities. In some examples, the glasses can include one or more absolute temperature sensor and one or more thermopiles terminating at or near locations of interest for temperature measurement (e.g., one thermopile can be used to estimate the temperature at a left temple and a second thermopile can be used to estimate temperature at a right temple). In a similar manner, a head band, chest strap or ring can include one or more absolute temperature sensors and/or thermopiles to measure skin temperature at a location of contact with the user's body. In some examples, the thermopile temperature sensing system can be used in a thermostat device (e.g., a wall mounted thermostat) or can be incorporated into a device to add a thermostat capability (e.g., incorporating the thermopile temperature sensing system in a computer, tablet, media player, smart phone, smart speaker, etc. Additionally, although some of the devices illustrated in FIGS. 1A-1G explicitly refer to touch screens, it is understood that the thermopile temperature sensing system described herein does not require a touch screen.

As described herein, thermopile temperature sensing systems can be incorporated into the systems (e.g., illustrated in FIGS. 1A-1G) to add internal and/or external temperature sensing capabilities to electronic devices. In particular, the use of a thermopile as described herein can enable more accurate estimates because thermopiles can reduce the impact of thermal aggressors (e.g., heat sources within a device, such as heat generating components within the device) and can also reduce the overall drift or other error in a temperature estimate (e.g., process, voltage, and/or temperature variations in the temperature sensors, influence from thermal aggressors, etc.). For example, thermopiles can be viewed as two-ended (or two-sided) devices, that output a temperature difference or gradient measurement corresponding to the difference in temperature of a first end (or side) of the thermopile relative to a second end (or side) of the thermopile. Thermopile temperature sensing systems can therefore be configured such that they measure a temperature gradient or differential between the inner surface of a device, and another location inside the device. As a result, placement of the absolute temperature sensors can be separated from a location or region of temperature measurement. Instead the absolute temperature sensors can be placed in a first location and a thermopile can be used to estimate temperature a second, different location. Thus, the absolute temperature sensor can be integrated into a device away from temperature aggressors and/or provide flexibility for integration of the temperature sensors at a location away from a location or region of interest. Specifically, the thermopiles can have a first end coupled to a first location inside the device (e.g., proximity to the absolute temperature sensor), and can have a second end coupled to a second location inside the device (e.g., at a location or region of interest). Based on the temperature gradient measurement of such a thermopile, the temperature of the second location at the second end of the thermopile can be estimated. Additionally, using an absolute temperature sensor and thermopile temperature sensor to measure heat flux as compared with using a pair of absolute temperature sensors for a heat flux measurement can introduce the drift or other error of one absolute temperature sensor, rather than the drift or other error of two absolute temperature sensors. Moreover, integrating a thermopile into an electronic device may provide for temperature estimation at a location of the device in which integration of an absolute temperature sensor can be difficult or impossible to due space constraints, particularly in devices that can be densely filled with circuitry and therefore cannot easily accommodate additional sensing devices.

Furthermore, the temperature of objects (e.g., air, a user, etc.) can be estimated at the second location or contacting or in proximity to a location outside the device, opposite a corresponding second location inside the device. In some examples, the thermopile temperature sensing systems estimate external temperature continuously during the operation of a device. For example, a system including the thermopile temperature sensing system described herein can be used to measure a user's body temperature and/or track a user's body temperature when authorized to do so by a user. In particular, wearable electronic devices in proximity with a user's body throughout a day and/or or night can provide for seamlessly measuring body temperature. In some examples, the type of body temperature estimate may be change depending on use conditions, such as time of day or user physiological characteristics. For example, when a user is vasoconstricted (e.g., limbs and extremities receive less blood flow), a temperature measurement of a user's skin at the wrist using a wrist-worn electronic device may not accurately reflect the user's core body temperature. In some examples, a wearable electronic devices are worn on a user's wrist (or other limbs or extremities), can be used to estimate physiological temperature values at night, when a user can be less likely to be vasoconstricted. Other wearable electronic devices that can be worn around the chest, on the head, over the eyes, or even positioned within an opening of the body, can be used to estimate physiological temperature values at any time. In some examples, a back face of a wearable electronic device can be used to estimate body temperature (e.g., by estimating wrist temperature) when the user can be in a vasodilation condition (e.g., such as at night when a user sleeps), but a user can measure temperature at a region of the body different at or closer to core body temperature using a front face of the electronic device to enable measurements even during vasoconstriction. For example, a user may bring the front face of a wearable device into contact with the forehead to measure core body temperature.

Figure 2:
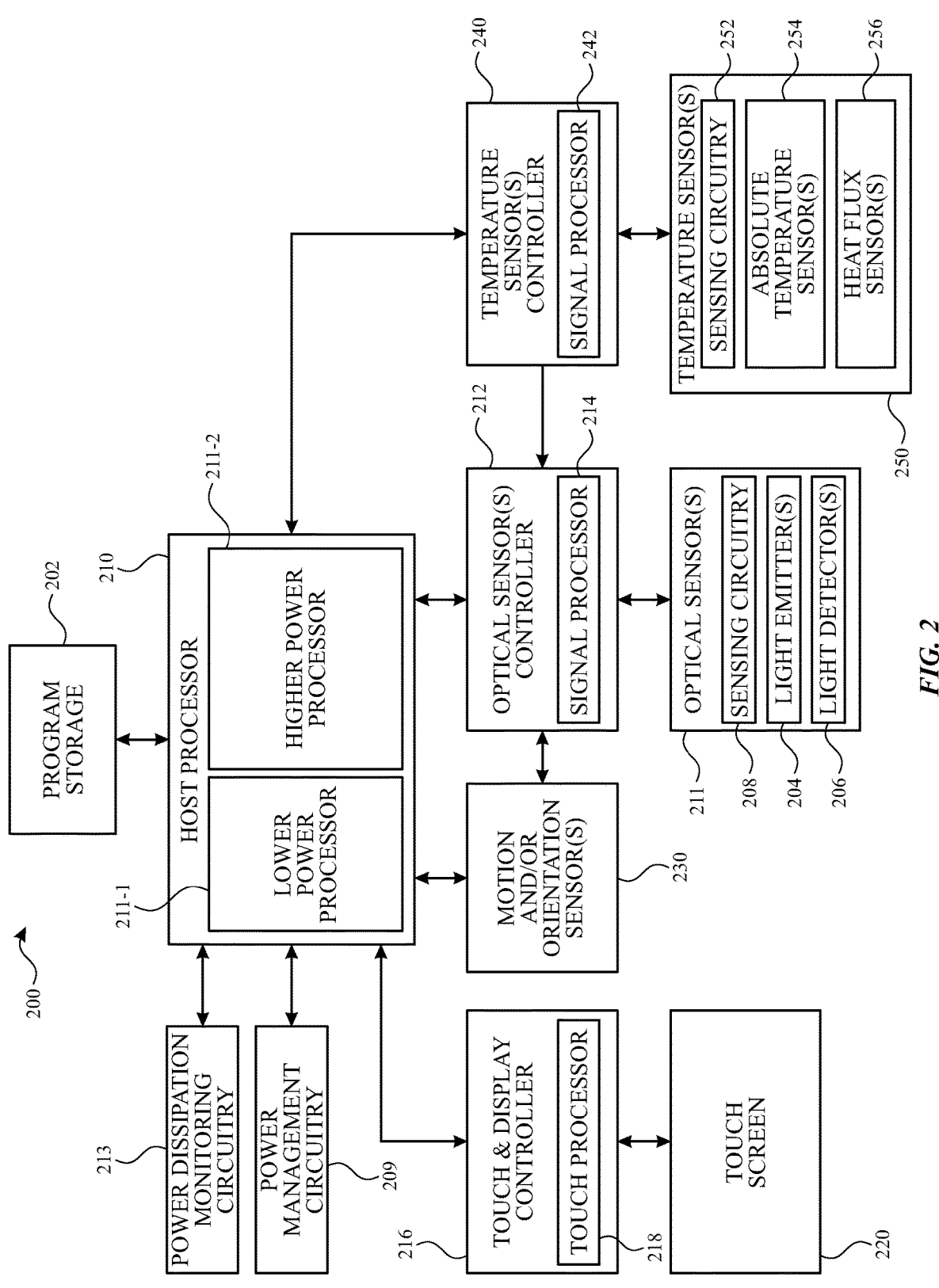
FIG. 2 illustrates a block diagram of an exemplary electronic device that includes a temperature sensing system according to some examples of the disclosure.

FIG. 2 illustrates a block diagram of a computing system of an exemplary electronic device that includes a temperature sensing system according to some examples of the disclosure. Although primarily described herein as a wearable device, the computing system may alternatively be implemented partially or fully in a non-wearable device. For example, the sensors and/or processing described herein can be implemented partially or fully in a mobile telephone, media player, tablet computer, personal computer, server, etc. In some examples, the optical sensors (e.g., light emitters and light detectors) and/or temperature sensors (e.g., absolute temperature sensor(s) or heat flux sensors) can be implemented in a wearable device (e.g., a wristwatch) and the processing of the optical and/or temperature data can be performed in a non-wearable device (e.g., a mobile phone). In some examples, the temperature sensors, such as, can be implemented in a wearable device, and the processing of the data can be performed in a non-wearable device. Processing and/or storage of the optical and/or temperature data in a separate device can enable the device including the physiological sensors (e.g., a wristwatch) to be space and power efficient (which can be important features for portable/wearable devices).

Computing system 200 can correspond to mobile telephone 136, media player 140, personal computer 144, tablet computer 148, wearable device 150, wearable device 160, or in-ear headphones 170 above illustrated in FIGS. 1A-1G (or may be implemented in other wearable or non-wearable electronic devices). Computing system 200 can include a processor 210 (or more than one processor) programmed to (configured to) execute instructions and to carry out operations associated with computing system 200. For example, using instructions retrieved from program storage 202, processor 210 can control the reception and manipulation of input and output data between components of computing system 200. Processor 210 can be a single-chip processor (e.g., an application specific integrated circuit) or can be implemented with multiple components/circuits. For example, FIG. 2 illustrates that processor 210 can include a relatively lower power processor 211-1 and a relatively higher power processor 211-2, as described in more detail herein.

In some examples, processor 210 together with an operating system can operate to execute computer code, and produce and/or use data. The computer code and data can reside within a program storage 202 that can be operatively coupled to processor 210. Program storage 202 can generally provide a place to hold data used by computing system 200. Program storage block 202 can be any non-transitory computer-readable storage medium. By way of example, program storage 202 can include Read-Only Memory (ROM), Random-Access Memory (RAM), hard disk drive and/or the like. The computer code and data could also reside on a removable storage medium and loaded or installed onto computing system 200 when needed. Removable storage mediums include, for example, CD-ROM, DVD-ROM, Universal Serial Bus (USB), Secure Digital (SD), Compact Flash (CF), Memory Stick, Multi-Media Card (MMC) and/or a network component.

As described herein, in some examples, host processor 210 can represent multiple processors, such as lower power processor 211-1 and higher power processor 211-2. Lower power processor 211-1 and higher power processor 211-2 can represent separate processing chips, each with independent timing and power requirements. For example, lower power processor 211-1 can operate using a first clock signal and at a first power level that allows processor 211-1 to remain operational ("on") across most or all operating modes of system 200 (e.g., a sleep mode, awake mode, idle mode, etc.). By contrast, higher power processor 211-2 can operate using a second clock signal (e.g., a higher frequency clock), different from the first, and at a second power level, higher than the first. Because of the higher power requirements of higher power processor 211-2, host processor 210 (e.g., an operating system on processor 210) can selectively disable, or power down higher power processor 211-2 or otherwise throttle its power consumption during certain operating modes of system 200 (e.g., a power saving mode, sleep mode, etc.). In some examples, as described herein, the higher power processor 211-1 can be powered down or otherwise throttle its power consumption to enable temperature measurements without error introduced by the power dissipation by higher power processor 211-1.

Lower power processor 211-1 and/or higher power processor can interface with various sensors of system 200 including a touch sensor panel and/or a touch screen 220 (via touch and display controller 216), motion and/or orientation sensor(s) 230, optical sensor(s) 211 (via optical sensor controller 212), and temperature sensor(s) 250 (via temperature sensor controller 240). In some examples, lower power processor 211-1 can operate in a sleep mode or a power-saving mode, while higher power processor 211-2 is powered down. In some examples, lower power processor 211-1 can change an operating mode of system 200 or otherwise cause higher power processor 211-2 to be powered on (e.g., when wake up conditions are detected).

Computing system 200 can also include power management circuitry 209 and/or power dissipation monitoring circuitry 213. Host processor 210 (e.g., lower power processor 211-1 and/or higher power processor 211-2) can be coupled to power management circuitry 209 and/or power dissipation monitoring circuitry 213. Power management circuitry 209 can regulate power delivery from power supply circuitry (e.g., a battery, or other power source of system 200) to various components of system 200 (e.g., sensors, processors, antennas, displays, etc.). As an example, power management circuitry 209 can interrupt or throttle power delivery to components that generate heat within system 200 (e.g., thermal aggressors), especially during temperature measurements that may be sensitive to heat from such components. Power management circuitry 209 can monitor temperatures inside a housing of system 200 and/or temperatures outside the housing (e.g., environmental temperatures, user skin/core temperature). As an example, power management circuitry 209 can monitor these temperatures to detect unsafe operating conditions for system 200, and can selectively interrupt or throttle power delivery to certain heat-generating components to bring system 200 into a safe operating condition. In some examples, power management circuitry 209 provides control signals to inline switches coupled between the power supply circuitry of system and various components of system 200, where the control signals determine an amount of current or power that can be delivered to the respective components. As an example, power management circuitry 209 can provide a first control signal to a switch interposed between a battery power source of system 200 and touch screen 220, such that the first control signal limits the amount of power or current delivered to the touch screen by the battery power source. As another example, power management circuitry 209 can provide a second control signal to a switch interposed between a battery power source of system 200 and antenna circuitry (not shown) of the system, such that the second control signal interrupts power delivery or current flow between the battery power source and the antenna circuitry.

Power dissipation monitoring circuitry 213 can monitor power supply circuitry of system 200 (not shown), and can regulate power delivery from the power supply circuitry to various components of system 200 (e.g., by sending instructions to power management circuitry 209). In some examples, power dissipation monitoring circuitry 213 includes a sensor coupled to the power supply circuitry (e.g., battery) of system 200. The sensor can measure power drawn by components of system 200 from the power supply circuitry (e.g., battery of system 200). In some examples, the power drawing by components of the system can be estimated based on a current draw from the power supply circuitry. In some examples, the power drawn can be estimated on a device basis (e.g., estimated current draw from the battery). In some examples, the power drawn can be estimated on a per-component basis for some (e.g., known thermal aggressors) or all of the components. In some examples, the power dissipation monitoring circuitry 213 includes at least one resistor (e.g., with a resistance greater than 10 MOhm, 20 MOhm, etc.) coupled between with the power supply circuitry or battery of system 200 and components of system 200 that draw power. A current through the resistor can be measured by determining a voltage across the resistor (e.g., periodically or in response to a trigger) and converting the voltage to a resistance (e.g., using Ohms law).

In some examples, computing system 200 (e.g., processor 210, power management circuitry 209, and/or power dissipation monitoring circuitry 213) can include power dissipation models that relate current/power draw from the power supply or battery of system 200 and temperature or heat dissipation within the device. Additionally or alternatively, computing system 200 can include models for estimating the power consumption and/or resulted temperature changes by different components, in different operational modes of system 200 (e.g., power consumption by touch screen 220 in an idle mode, in a low-brightness mode, in a high-brightness mode, etc.). Impacts of the power consumption of certain components, or thermal aggressors of system 200, can be determined using lab characterizations of the components (e.g., a rise time, a fall time, and amplitude measured for each thermal aggressor at various respective power levels). Accordingly, computing system 200 can dynamically model temperatures within the system 200, based on power dissipation models, and one or more current/power draw measurement at the system's power supply circuitry or battery. In some examples, power management circuitry 209 can limit or interrupt the delivery of power to certain components, such as during a measurement interval associated with temperature sensors 250 (e.g., an interval where sensor data is collected from temperature sensors 250), based on information from power dissipation monitoring circuitry 213. As an example, when a power dissipation model indicated that an amount of power being drawn by components of system 200 corresponds to a temperature within the device outside of a range required for accurate and/or reliable operation of temperature sensors 250, power management circuitry 209 to limit or interrupt power to components of system 200 such that the total power drawn by the components can be reduced to a level corresponding to a temperature within the range required for accurate and/or reliable operation of temperature sensors 250. In some examples, power dissipation monitoring circuitry 213 and/or power management circuitry can cause host processor 210 to delay the performance of certain functions or operations to limit or interrupt power to components of system 200. As an example, host processor 210 can postpone operations (or modify operations for reduced power consumption) involving touch screen 220, GPS circuitry (not shown), wireless communication chips (not shown), antennas (not shown), or other components of system 200 that can be thermal aggressors, until after a measurement interval associated with temperature sensors 250 (e.g., an interval during which one or more of the components receives less power).

Additionally or alternatively, characterizations of the components (e.g., a rise time, a fall time, and amplitude measured for each thermal aggressor at various respective power levels) can be used for temperature compensation. For example, host processor 210 can use temperature compensation models to adjust sensor measurements or sensor data according to the temperature within the device or the temperature contribution of thermal aggressors (e.g., heat-generating components of system 200). As an example, the amount of power draw by components of system 200 can be measured by power dissipation monitoring circuitry 213. The measured power draw can be used to correct for heat from thermal aggressors within the device. In some examples, the compensation can be applied when the power draw corresponds to a temperature change outside of a range required for accurate and/or reliable operation of temperature sensors 250. Accordingly, a temperature compensation model (e.g., the temperature change corresponding to the amount of power drawn by the components) can be used (e.g., by temperature sensor controller 240) to adjust sensor data from temperature sensors 250 to account for the elevated temperature within the device caused by thermal aggressors.

Computing system 200 can also include one or more input/output (I/O) controllers that can be operatively coupled to processor 210. I/O controllers can be configured to control interactions with one or more I/O devices (e.g., touch sensor panels, display screens, touch screens, physical buttons, dials, slider switches, joysticks, or keyboards). I/O controllers can operate by exchanging data between processor 210 and the I/O devices that desire to communicate with processor 210. The I/O devices and I/O controller can communicate through a data link. The data link can be a unidirectional or bidirectional link. In some cases, I/O devices can be connected to I/O controllers through wireless connections. A data link can, for example, correspond any wired or wireless connection including, but not limited to, PS/2, Universal Serial Bus (USB), Firewire, Thunderbolt, Wireless Direct, IR, RF, Wi-Fi, Bluetooth or the like.

Computing system 200 can include a temperature sensor controller 240 operatively coupled to processor 210 and to one or more temperature sensors 250. As described herein, in some examples, the temperature sensor controller 240 can be coupled to optical sensor controller 212. The temperature sensors 250 can include one or more absolute temperature sensors 254, one or more heat flux sensors 256, and corresponding sensing circuitry 252 (e.g., analog and/or digital circuitry to measure signals at the sensors 254/256, provide processing (e.g., amplification, filtering, level-shifting), and convert analog signals to digital signals). As an example, the one or more absolute temperature sensors 254 and one or more heat flux sensors 256 can be configured to measure temperature at various locations within system 200, including at least one location or region inside the wearable device different than a location or region in which an absolute temperature sensor is disposed for system 200. These temperatures and/or heat flux measurements can be used to measure temperature characteristics of the device under various modes of operation (e.g., to estimate when temperatures within a device are approaching unsafe or unsustainable levels), to estimate ambient temperatures outside the device, or to estimate a physiological signal associated with a user (e.g., a body temperature of the user)). Measured raw data from the absolute temperature sensors 254, heat flux sensors 256, and sensing circuitry 252 can be transferred to processor 210 (via temperature sensor controller 240), and processor 210 can perform the signal processing described herein to estimate internal or external temperatures and/or to estimate physiological signals (e.g., body temperature associated with the user). Processor 210 and/or temperature sensor controller 240 can operate temperature sensors 250 to measure temperature values associated with system 200, and to estimate temperature values associated with the environment external to the system. In some examples, temperature sensor controller 240 can include signal processor 242 to sample, filter, and/or convert (from analog to digital) signals generated by various temperature sensors 250, which can be positioned at different locations within a housing for system 200. Signal processor 242 can be a digital signal processing circuit such as a digital signal processor (DSP). The analog data measured by the temperature sensors 250 can be converted into digital data by an analog to digital converter (ADC). In some examples, and the digital data from the temperature sensors can be stored for processing in a buffer (e.g., a FIFO) or other volatile or non-volatile memory (not shown) in temperature sensor controller 240. In some examples, data from the temperature sensors are used as inputs to a heat model for the device, and used to estimate temperatures external to the housing of system 200 (e.g., temperature of an object or user that contacts a portion of the device or an ambient temperature). In some examples, processor 210 and/or temperature sensor controller 240 can store the raw data and/or processed information in memory (e.g., ROM or RAM) for historical tracking or for future diagnostic purposes.

To accurately model the environment outside of system 200, in some examples, absolute temperature sensors 254 and heat flux sensors 256 can be used in conjunction. In certain examples, temperature sensor controller 240 can use measurements from multiple separate absolute temperature sensors 254, ideally located at well-characterized locations within the housing of system 200, to estimate heat flux through the device (e.g., without one or more dedicated heat flux sensors). In some examples, absolute temperature sensors can include a negative temperature coefficient (NTC) temperature sensor, a resistance temperature detector (RTD), or a diode based temperature sensor. A heat flux sensor 256, such as a thermopile temperature sensor, includes multiple thermocouples coupled in series. Each thermocouple can include two (or more) different conductive materials, characterized by or otherwise associated with different respective Seebeck coefficients. A first end of a heat flux sensor 256 can include a first set of junctions between the two different conductive materials, and a second end of the heat flux sensor 256 can include a second set of junctions between the two different conductive materials. When these two ends of a heat flux sensor 256 can be positioned at respective first and second locations within system 200, the heat flux sensor 256 can generate a voltage signal proportional to a temperature gradient or a temperature difference between the first and second locations within system 200. When one end of a heat flux sensor 256 is positioned close to, or mechanically coupled to a location or region within a housing for system 200, temperature sensor controller 240 can use the temperature gradient generated by the heat flux sensor to estimate the temperature of objects that contact an outer surface location of system 200 that can correspond to where one end of the heat flux sensor 256 can be positioned inside the device.

Computing system 200 can include an optical sensor controller 212 operatively coupled to processor 210 and to one or more optical sensors 211. The optical sensor(s) can include light emitter(s) 204, light detector(s) 206 and corresponding sensing circuitry 208 (e.g., analog circuitry to drive emitters and measure signals at the detector, provide processing (e.g., amplification, filtering), and convert analog signals to digital signals). As an example, light emitters 204 and light detectors 206 can be configured to generate and emit light into a user's skin and detect returning light (e.g., reflected and/or scattered) to measure a physiological signal (e.g., a photoplethysmogram, or PPG signal). The absorption and/or return of light at different wavelengths can also be used to determine a characteristic of the user (e.g., oxygen saturation, heart rate) and/or about the contact condition between the light emitters 204/light detectors 206 and the user's skin. Measured raw data from the light emitters 204, light detectors 206 and sensing circuitry 208 can be transferred to processor 210, and processor 210 can perform the signal processing described herein to estimate a characteristic (e.g., oxygen saturation, heart rate, etc.) of the user from the physiological signals. Processor 210 and/or optical sensor controller 212 can operate light emitters 204, light detectors 206 and/or sensing circuitry 208 to measure data from the optical sensor. In some examples, optical sensor controller 212 can include timing generation for light emitters 204, light detectors 206 and/or signal processor 214 to sample, filter and/or convert (from analog to digital) signals measured from light at different wavelengths. Optical sensor controller 212 can process the data in signal processor 214 and report outputs (e.g., PPG signal, relative modulation ratio, perfusion index, heart rate, on-wrist/off-wrist state, etc.) to the processor 210. Signal processor 214 can be a digital signal processing circuit such as a digital signal processor (DSP). The analog data measured by the optical sensor(s) 211 can be converted into digital data by an analog to digital converter (ADC), and the digital data from the physiological signals can be stored for processing in a buffer (e.g., a FIFO) or other volatile or non-volatile memory (not shown) in optical sensor controller 212. In some examples, some light emitters and/or light detectors can be activated, while other light emitters and/or light detectors can be deactivated (by power management circuitry 209) to conserve power, for example, or for time-multiplexing (e.g., to avoid interference between channels). In some examples, processor 210 and/or optical sensor controller 212 can store the raw data and/or processed information in memory (e.g., ROM or RAM) for historical tracking or for future diagnostic purposes.

In some examples, some light emitters and/or light detectors have operation characteristics that vary based on the temperature of the light emitters and/or light detectors. As an example, some light emitters may output light at a wavelength that varies based on the temperature of the light emitter. In some examples, optical sensor controller 212 and/or processor 210 (higher power processor 211-2 and/or lower power processor 211-1) can receive temperature information associated with the light emitter (e.g., from temperature sensor controller 240), and adjust the wavelength of the optical sensor and/or processing of signals associated with the light emitter and/or a corresponding light detector based on the received temperature information. For example, an estimation of a physiological characteristic (e.g., oxygen saturation, heart rate) may be sensitive to wavelengths of light used to measure optical signals. In some examples, the optical sensor controller 212 and/or processor 210 can use the received temperature information to estimate a wavelength of light generated by the optical sensor and compensate the estimation of the physiological characteristic based on the estimated wavelength of light.

Computing system 200 can also include one or more motion and/or orientation sensors 230, such as an accelerometer, a gyroscope, an inertia-measurement unit (IMU), etc. In some examples, the motion and/or orientation sensors 230 can include a multi-channel accelerometer (e.g., a 3-axis accelerometer).

Computing system 200 can also include, in some examples, a touch and display controller 216 operatively coupled to processor 210 and to touch screen 220. Touch screen 220 can be configured to display visual output in a graphical user interface (GUI), for example. The visual output can include text, graphics, video, and any combination thereof. In some examples, the visual output can include a text or graphical representation of the physiological signal (e.g., a PPG waveform) or a characteristic of the physiological signal (e.g., oxygen saturation, heart rate, etc.) Touch screen can be any type of display including a liquid crystal display (LCD), a light emitting polymer display (LPD), an electroluminescent display (ELD), a field emission display (FED), a light emitting diode (LED) display, an organic light emitting diode (OLED) display, or the like. Processor 210 can send raw display data to touch and display controller 216, and touch and display controller 216 can send signals to touch screen 220. Data can include voltage levels for a plurality of display pixels in touch screen 220 to project an image. In some examples, processor 210 can be configured to process the raw data and send the signals to touch screen 220 directly. Touch and display controller 216 can also detect and track touches or near touches (and any movement or release of the touch) on touch screen 220. For example, touch processor 218 can process data representative of touch or near touches on touch screen 220 (e.g., location and magnitude) and identify touch or proximity gestures (e.g., tap, double tap, swipe, pinch, reverse-pinch, etc.). Processor 210 can convert the detected touch input/gestures into interaction with graphical objects, such as one or more user-interface objects, displayed on touch screen 220 or perform other functions (e.g., to initiate a wake of the device or power on one or more components).

In some examples, touch and display controller 216 can be configured to send raw touch data to processor 210, and processor 210 can process the raw touch data. In some examples, touch and display controller 216 can process raw touch data itself (e.g., in touch processor 218). The processed touch data (touch input) can be transferred from touch processor 218 to processor 210 to perform the function corresponding to the touch input. In some examples, a separate touch sensor panel and display screen can be used, rather than a touch screen, with corresponding touch controller and display controller.

In some examples, the touch sensing of touch screen 220 can be provided by capacitive touch sensing circuitry (e.g., based on mutual capacitance and/or self-capacitance). For example, touch screen 220 can include touch electrodes arranged as a matrix of small, individual plates of conductive material or as drive lines and sense lines, or in another pattern. The electrodes can be formed from a transparent conductive medium such as ITO or ATO, although other partially or fully transparent and non-transparent materials (e.g., copper) can also be used. In some examples, the electrodes can be formed from other materials including conductive polymers, metal mesh, graphene, nanowires (e.g., silver nanowires) or nanotubes (e.g., carbon nanotubes). The electrodes can be configurable for mutual capacitance or self-capacitance sensing or a combination of mutual and self-capacitance sensing. For example, in one mode of operation, electrodes can be configured to sense mutual capacitance between electrodes; in a different mode of operation, electrodes can be configured to sense self-capacitance of electrodes. During self-capacitance operation, a touch electrode can be stimulated with an AC waveform, and the self-capacitance to ground of the touch electrode can be measured. As an object approaches the touch electrode, the self-capacitance to ground of the touch electrode can change (e.g., increase). This change in the self-capacitance of the touch electrode can be detected and measured by the touch sensing system to determine the positions of one or more objects when they touch, or come in proximity to without touching, the touch screen. During mutual capacitance operation, a first touch electrode can be stimulated with an AC waveform, and the mutual capacitance between the first touch electrode and a second touch electrode can be measured. As an object approaches the overlapping or adjacent region of the first and second touch electrodes, the mutual capacitance therebetween can change (e.g., decrease). This change in the mutual capacitance can be detected and measured by the touch sensing system to determine the positions of one or more objects when they touch, or come in proximity to without touching, the touch screen. In some examples, some of the electrodes can be configured to sense mutual capacitance therebetween and some of the electrodes can be configured to sense self-capacitance thereof.

Note that one or more of the functions described herein, including estimating a temperature internal or external to an electronic device according to some examples of the disclosure, can be performed by firmware stored in memory (or in program storage 202) and executed by temperature sensor controller 240, optical sensor controller 212, touch and display controller 216 or processor 210. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
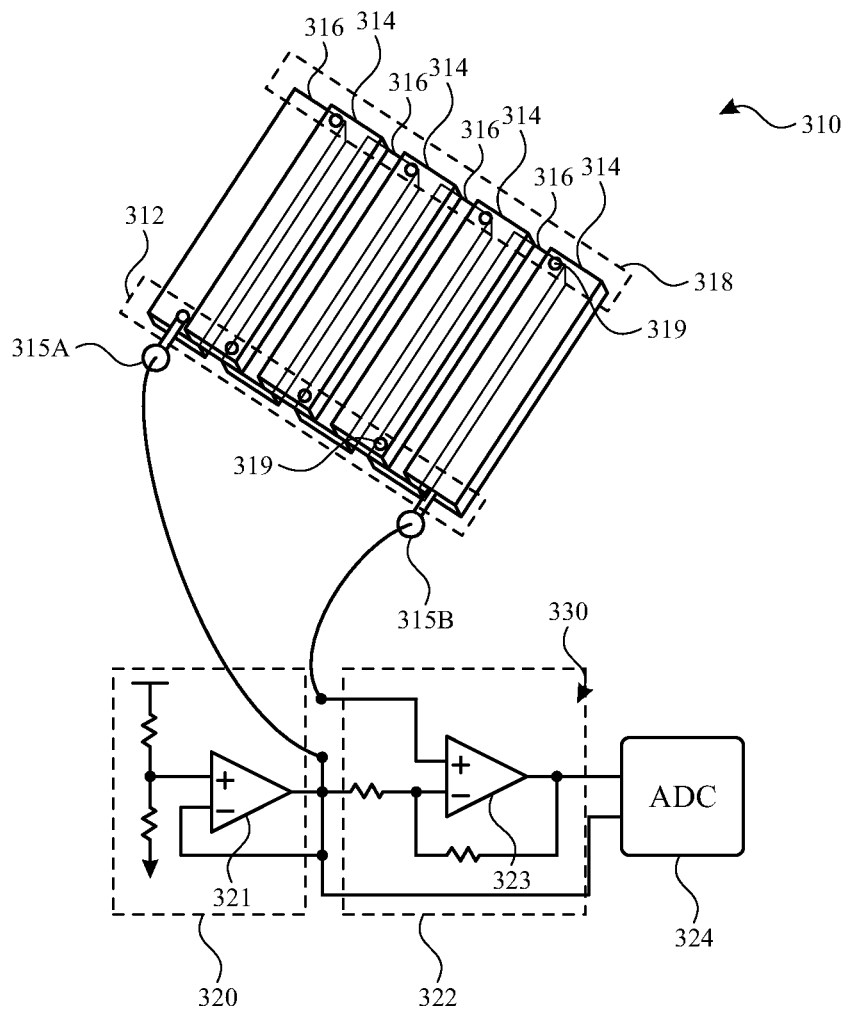
FIG. 3 illustrates a schematic view for an exemplary configuration of a thermopile device and a thermopile measurement circuit according to some examples of the disclosure.

FIG. 3 illustrates a schematic view for an exemplary configuration of a thermopile device and a thermopile measurement circuit according to some examples of the disclosure. Thermopile sensing system includes a thermopile 310, and a thermopile measurement circuit (sensing circuitry) 330, which can be implemented with an electronic device (e.g., the devices illustrated in FIGS. 1A-1G).

Thermopile 310 can correspond to a heat flux sensor 256, and sensing circuitry 330 can include components from sensing circuitry 252 and/or signal processor 242. Thermopile 310 can include a collection of thermocouples connected in series, each thermocouple including conductive segments of two different conductors. In general, any two different conductors (or more than two conductors) can be used in a thermopile, provided that they have different associated Seebeck coefficients suitable to generate the desired temperature gradient. As an example, conductive paths 314 of thermopile 310 can be formed from a first conductive material such as copper (Cu), which has a first Seebeck coefficient, and conductive paths 316 of thermopile 310 can be formed from a second conductive material such as copper-nickel alloy (CuNi, sometimes referred to as "constantan" for short, though the alloy may contain a different ratio of materials than 55% copper-45% nickel), which has a second Seebeck coefficient that is different from the first Seebeck coefficient. These specific materials used in conductive paths 314 and 316 are exemplary, and any conductors with suitable different Seebeck coefficients can be used in thermopile 310. Additionally, it is understood that although primarily described herein as using two different conductors with two different Seebeck coefficients that thermopiles can be implemented with more than two conductors with additional Seebeck coefficients (e.g., three conductors, four conductors, etc.). In some examples, the different materials can be selected to balance the positive and negative Seebeck effects for the two or more conductors used.

Conductive paths 314 can be coupled to conductive paths 316 in series at a two junctions. As described herein, the two junctions are often referred to as hot junction 318 and cold junction 312, but it is understood that more generally these two junction can be referred to as a first junction and a second junction). As an example, a first path of conductive paths 314 can extend from cold junction 312 to hot junction 318, and can be coupled to a first path of conductive paths 316 at hot junction 318 (e.g., by a via 319, or another connector). The first path of conductive paths 314 and the first path of conductive paths 316 can collectively form a first thermocouple. The first path of conductive paths 316 can then extend from hot junction 318 to cold junction 312, and can be coupled to a second path of conductive paths 314 at cold junction 312 (e.g., by a via 319, or another connector). The second path of conductive paths 314 can then extend from cold junction 312 to hot junction 318, and can be coupled to a second path of conductive paths 316 at hot junction 318 (e.g., by a via 319, or another connector). The second path of conductive paths 314 and the second path of conductive paths 316 collectively form a second thermocouple that can be coupled in series with the first thermocouple. Additional series thermocouples can be formed using conductive paths 314 and 316 in a similar manner.

In some examples, conductive paths 314 can be formed on a different layer than conductive paths 316 (e.g., in a flexible printed circuit, or FPC), and can be coupled to each other using vias 319. For example, as shown conductive paths 314 and conductive paths 316 can be formed on different layers (e.g., separated by a dielectric layer). As described herein, in some examples, conductive paths 314 and conductive paths can be implemented in a flexible printed circuit. In some examples, conductive paths 314 and conductive paths can be implemented in a rigid printed circuit board. In other examples, conductive paths 314 can be formed in the same layer as conductive paths 316, separated by a distance, and connected using connectors (e.g., a conductive pattern connecting conductive paths 314 to conductive paths 316). In examples where paths 314 and 316 can be formed on different layers, a respective conductive path of conductive paths 314 can partially overlap one or more conductive paths of conductive paths 316 and/or a respective conductive path of conductive paths 316 can partially overlap one or more conductive paths of conductive paths 314 (e.g., as shown in FIG. 3). For example, based on the example provided above, the first path of conductive paths 316 can partially overlap the first path of conductive paths 314 to enable a first via 319 therebetween, and the first path of conductive paths 316 can partially overlap the second path of conductive paths 314 (e.g., at an opposite junction) to enable a second via 319 therebetween. Additionally, as described herein in more detail (e.g., with respect to FIGS. 6A-10), in some examples, the thermopile can be implemented using vias through a printed circuit board, with the vias having different Seebeck coefficients.

Thermopile 310 can generate an output voltage between its two terminals 315A and 315B at cold junction 312, corresponding to a temperature differential or gradient between the two junctions (e.g., between hot junction 318 and cold junction 312), thereby measuring heat flux through its two ends (e.g., the hot and cold junctions) when the thermal resistance is known. In contrast to an arrangement where heat flux is estimated based on a differential between temperature readings from two different absolute temperature sensors 254 whose position may be constrained within the electronic device (e.g., the temperature sensor integration may be difficult given space constraints and may be limited to mounting on specific PCB s within the device at a distance from the location or region of interest), thermopile 310 can have its hot junction 318 positioned directly at or closer to a temperature sensing surface (e.g., locations or regions 163/165, of FIG. 1F), which can improve coupling to the sensing surface of interest, as well as repeatability of the heat flux measurements. Further, because thermopile 310 directly measures temperature gradient, drift error that can be doubled by the use of two absolute temperature sensors, which can provide more accurate heat flux or temperature gradient measurement.

The use of a thermopile can also simplify manufacturing and increase yield. For example, absolute temperature sensors can require extensive characterization and calibration (e.g., at manufacturing), to produce accurate temperature readings within system 200. Thermopile 310, however, may not require factory calibration or may require less factory calibration and characterization to produce accurate readings as compared with an absolute temperature sensor, especially when used in conjunction with another absolute temperature sensor for heat flux measurements. Thermopile 310 can have a higher accuracy than absolute temperature sensors 254 (e.g., an order of magnitude improvement). As an example, thermopile 310 may be accurate to +/−0.01 degrees Celsius of temperature difference (ΔT), whereas a factory-calibrated and characterized absolute temperature sensor 254 may be accurate to +/−0.1 degrees Celsius. As described herein, heat flux sensor 256 including thermopile 310 can measure a temperature difference between two junctions (e.g., cold junction 312 and hot junction 318), and one of the junctions (e.g., cold junction 312) can be located adjacent to and can be electrically connected to an absolute temperature sensor 254.

Based on both an absolute temperature measurement of sensor 254 located at cold junction 312, and the temperature difference or gradient measurement produced by thermopile 310, temperature sensor controller 240 can estimate a temperature value at hot junction 318. Specifically, the temperature at hot junction 318 can be the temperature measured by sensor 254 located at the cold junction 312, plus the temperature difference or gradient measurement between hot junction 318 and cold junction 312, generated by thermopile 310. In this manner, a thermopile 310 can be positioned with its hot junction 318 at a surface or location of interest, and temperature sensor controller 240 can measure temperature at the location of interest using the temperature differential/gradient value generated by thermopile 310 and an absolute temperature sensor 254 located at or near cold junction 312. An advantage of such an arrangement over arrangements relying on absolute temperature sensors, is enabling a thermopile can be formed with a hot junction that is in direct contact, or more closely coupled to a particular device surface (e.g., closer to front face 162 or rear face 166 than an absolute temperature sensor) or component within the device (e.g., a light emitter 204 whose light emissions vary as a function of temperature). Using a thermopile 310 enables temperature measurements at locations of interest that may be otherwise impossible or impractical to collect using an absolute temperature sensor (e.g., because the absolute temperature sensor cannot be mounted or otherwise integrated as close within the device). As described herein, a thermopile can also provide advantages over a thermocouple. For example, one advantage of a thermopile can be a relatively high differential voltage across the series thermocouple, which can provide a better signal-to-noise ratio and also can provide flexibility in selecting circuitry to sense the differential voltage. Another advantage of the thermopile can be that the differential can be averaged over an area of the thermopile rather than measuring a specific location, which can smooth out localized temperature anomalies.

Thermopile 310 can be connected to sensing circuitry 330, which can include a first stage 320, a second stage 322, and an analog-to-digital converter (ADC) 324. First stage 320 can include an amplifier 321 such as an operational amplifier (op-amp). In some examples, the op-amp can have a positive input terminal biased at a particular voltage level (e.g., using a resistor divider between power and ground or between a high and a low voltage), and a negative input that can coupled connected an output of the op-amp. The output of the op-amp can be a bias voltage applied to a first terminal 315A of thermopile 310 and coupled to the second stage 322 via an input resistance of the second stage 322. In some examples, first stage 320 can be referred to as a bias amplifier because it generates a bias voltage for the thermopile 310 and for the second stage 322. Second stage 322 can include another amplifier 323 (e.g., an op-amp), with an input resistance and a feedback resistance. A positive terminal of the op-amp of second stage 322 can be connected to a second terminal 315B of thermopile 310. ADC 324 can be coupled to outputs of first stage 320 and second stage 322. For example, the output of the first stage can be used as a reference voltage and the output of the second stage can be used as an input voltage for the ADC. ADC 324 can be configured to generate a digital value corresponding to the voltage output by thermopile 310 (a differential operation that removes the reference bias voltage from the output). In some examples, second stage 322 can be referred to as a differential amplifier because it amplifies a differential voltage between the two terminals 315A-315B of thermopile 310 (e.g., where the gain of the amplifier can be a function of the feedback resistance). As mentioned above, the voltage output by thermopile 310, which includes multiple series-connected thermocouples, each optionally formed from conductive paths of metals with different Seebeck coefficients (e.g., Cu, and CuNi), can be proportional to a temperature difference between cold junction 312 and hot junction 318. The digital conversion of the voltage output by first stage 320 and second stage 322, can be based on the voltage generated by thermopile 310, and can be used by processing circuitry to estimate the temperature at hot junction 318, based on an absolute temperature sensor measurement at or around cold junction 312 (e.g., the temperature at hot junction 318 is the temperature at cold junction 312, plus the temperature difference between hot junction 318 and cold junction 312 generated by thermopile 310).

Figure 4A:
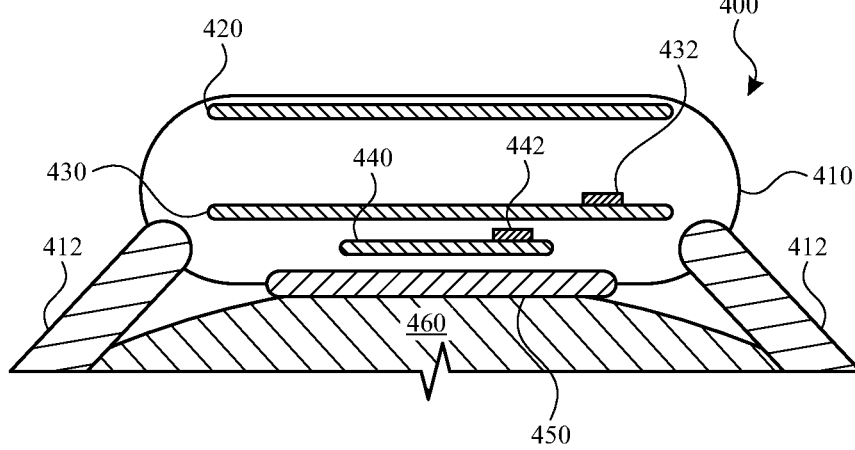
FIG. 4A illustrates a cross-sectional side view of an exemplary electronic device including one or more printed circuit boards and temperature sensing circuitry according to some examples of the disclosure.

FIG. 4A illustrates a cross-sectional side view of an exemplary electronic device including one or more printed circuit boards and temperature sensing circuitry according to some examples of the disclosure. Wearable device 400 can correspond to a device 150 of FIG. 1E and/or 160 of FIG. 1F (or more generally can correspond to any of the electronic devices illustrated by FIGS. 1A-1G). Device 400 can include a housing 410 secured to user 460 via a strap 412 or any other suitable fastener (e.g., corresponding to strap 154 and housing 164). In some examples, device 400 can be secured to a user 460 (e.g., exposed skin on the user's body). Device 400 can correspond to a watch, a fitness tracker, or any other device (e.g., optionally used to measure physiological signals associated with user 460). Device 400 can attach to user 460 around the wrist, head, over the eyes, or on any exposed surface of the body that is suitable for measuring physiological signals associated with the user.

Figure 18:
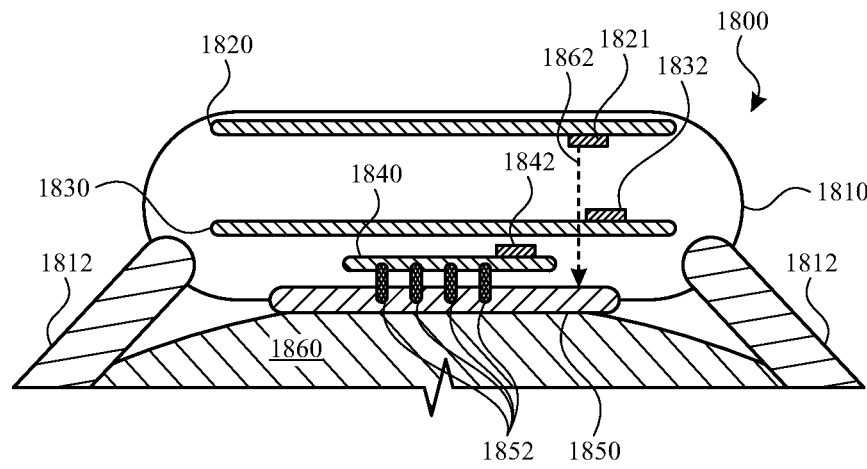
FIG. 18 illustrates a cross-sectional side view of an exemplary electronic device including one or more printed circuit boards and temperature sensing circuitry according to some examples of the disclosure.

Multiple printed circuit boards (PCBs) 420, 430, and 440 are illustrated inside housing 410. For example, PCB 420 can be located inside device 400, at a front face (sometimes referred to as a "front crystal"). In some example, PCB 420 can be used to implement a touch sensor panel, display or touch screen (e.g., touch screen 220) disposed below the front face. PCB 430 can be located inside device 400, between PCB 420 and 440. In some examples, PCB 430 can include host processor 210, program storage 202, and optionally touch and display controller 216, optical sensor controller 212 and/or temperature sensor controller 240. In some examples, PCB 430 can also include a discrete absolute temperature sensor 432 (e.g., similar to absolute temperature sensor 254 of FIG. 2). PCB 440 can be located inside device 400, below PCB 430 at or in proximity to a back face 450 (sometimes referred to as a "back crystal. In some examples, PCB 440 can additionally or alternatively include a discrete absolute temperature sensor 442. In some examples, absolute temperature sensor 442 can be separated from back face 450 by PCB 440, and PCB 440 can be separated from housing 410 (e.g., without direct contact with housing 410 due to the existence of one or more intervening layers or an air gap). For example, PCB 440 can be separated from the inner surface of back face 450, and sometimes a barrier and one or more adhesive layers (not shown) can be positioned between PCB 440 and back face 450. PCB 440 can include optical sensors 211 configured to emit light and detect light through back face 450 (e.g., light emitters and detectors mounted on the opposite side of PCB 440 as sensor 442). It should be understood that the number of PCBs, the number of temperature sensors, and placement of PCBs and distribution of components between the PCBs shown in FIG. 4A is representative and non-limiting. For example, fewer or more PCBs can be used, fewer temperature sensors can be used (e.g., omitting either absolute temperature sensor 432 or absolute temperature sensor 442), more temperature sensors can be used than in the illustrated exemplary device (e.g., as shown in FIG. 18), or the components of system 200 can be distributed differently across the one or more PCBs.

In some examples, heat flux through device housing 410 can be calculated using discrete absolute temperature sensors 432 and 442. As an example, the temperature measured by sensor 442 can be subtracted from the temperature measured by sensor 432 to determine a temperature difference between the absolute temperature sensors mounted to PCB 430 and PCB 440. This temperature difference can then be used to calculate heat flux through the device, as well as estimating a temperature outside of the device (e.g., ambient air temperature at the back crystal or body temperature at back crystal 450). However, accuracy of such an arrangement can rely on a high thermal resistance between the pair of absolute temperature sensors 432 and 442, and further relies on an assumption of no thermal aggressors or heat sources between sensors 432 and 442. Further, because of the distances that separate sensors 432 and 442 from the front face of device 400 and the back face 450, the temperature estimates of these surfaces based on sensors 432 and 442 are prone to errors caused by sensor drift (e.g., process, voltage, temperature or strain variations in absolute temperature sensors 432/442), thermal aggressors, and inaccurate device characterizations, leading to unreliable or unrepeatable temperature estimates for surfaces of device 400, or the environment outside device 400 (e.g., temperature estimates of user 460). Ideally, to measure temperature at back face 450, an absolute temperature sensor would be coupled, or placed adjacent to back face 450. However, such an arrangement may not feasible or the integration challenges may be difficult, due to space considerations for the absolute temperature sensor and/or challenges in routing power and other signal connections from a printed circuit board to the absolute temperature sensors.

Figure 4B:
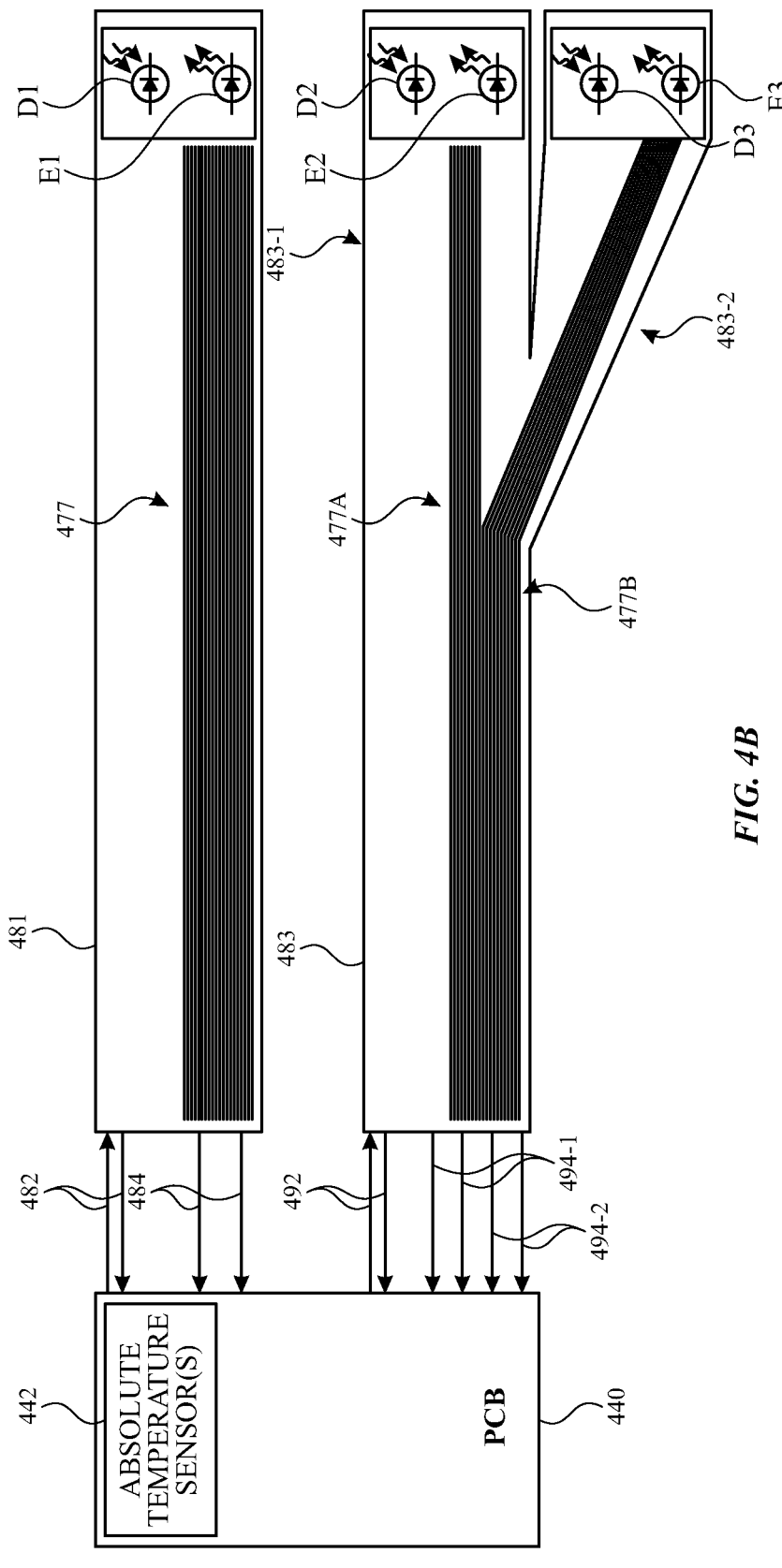
FIG. 4B illustrates a schematic view for an exemplary configuration that includes multiple thermopile devices according to some examples of the disclosure.

FIG. 4B illustrates a schematic view for an exemplary configuration that includes multiple thermopile devices coupled according to some examples of the disclosure. Each of the multiple thermopiles can be used to measure a temperature differential to enable temperature estimates at different locations within or outside a device. The configuration of FIG. 4B includes one or more emitter and detector pairs (e.g., corresponding to light emitters 204 and light detectors 206) and PCB 440. PCB 440 can represent a printed circuit board including optical sensing circuitry (e.g., corresponding to sensing circuitry 252) and one or more absolute temperature sensor(s) 442. In some examples, the various emitter/detector pairs $E_i/D_i$ illustrated in FIG. 4B can be at a different location than PCB 440 and absolute temperature sensor 442. Additionally, each of the various emitter/detector pairs $E_i/D_i$ can be disposed in a different location, and temperature can vary locally such that different emitters/detector pairs may experience different temperatures within the device. In some examples, emitter/detector pairs $E_i/D_i$ can be separated from the absolute temperature sensor 442 by the PCB 440. For example, emitter/detector pairs $E_i/D_i$ can be mounted to a bottom side of PCB 440 and absolute temperature sensor 442 can be mounted to a top side of PCB 440. However, to simplify the following discussion, it is assumed that emitter/detector pairs $E_i/D_i$ can be located at various locations within the device that may have a different local temperature than measured by the absolute temperature sensor 442.

As described herein, emitters $E_i$ can correspond to light emitters 204, and can optionally include light emitting diodes (LEDs). LEDs, or other light emitters 204, can produce a very narrow band of visible or non-visible light, with an associated centroid wavelength of that band. The centroid wavelength of an LED can change, or drift, based on a temperature of the LED (e.g., thermal drift). Due to space constraints, there may not be adequate space adjacent to emitters $E_i$ to provide an absolute temperature sensor 442 to locally measure its temperature. Without an accurate temperature measurement of emitters $E_i$, thermal drift can introduce errors in measurements by the optical sensors (e.g., measurements of physiological signals or estimates of physiological conditions). In some examples, thermopiles can be used to locally measure temperature at an emitter, and the locally measured temperature can be used to compensate for their temperature-dependent centroid wavelength drift, and avoid inaccurate or unreliable optical sensor data or downstream estimates of physiological signals. In some examples, the wavelength of light emitted by the emitter can be estimated based on the temperature and the optical sensing circuitry can tune the driving of the emitter so that the light can be emitted in the correct narrow band. In some examples, the wavelength of light emitted by the emitter can be estimated based on the temperature and the optical sensing system (e.g., signal processor 214) can compensate for the change in wavelength to better estimate a physiological signal or condition.

To improve the accuracy and reliability of optical devices on device 400, printed circuits 481 and 483 that include respective thermopile devices can measure temperature associated with emitters $E_i$ for different emitter/detector pairs. For examples, a first end of printed circuit 481 can be coupled to PCB 440 and can be coupled to absolute temperature sensor 442 on PCB 440. In some examples, the first end of printed circuit 481 can be bonded to PCB 440 in proximity to absolute temperature sensor 442 (e.g., co-located with absolute temperature sensor 442). A thermopile device 477 of printed circuit 481 (represented by multiple horizontal lines, representing series-coupled thermocouples of the thermopile), can span a length of the printed circuit 481 between absolute temperature sensor 442 and emitter E1. The thermopile device 477 can be used to measure a temperature differential between its first end (e.g., at absolute temperature sensor 442) and its second end (e.g., at or in proximity to emitter E1) using from a differential signal across signal lines 484 (e.g., corresponding to first and second terminals 315A and 315B, of FIG. 3). Emitter E1 can receive drive and calibration signals from the system (e.g., processor 210, optical sensor controller 212) and/or transmit optical signals from detector D1 over unidirectional or bi-directional lines 482 of circuit 481. In some examples, printed circuit 481 can be a flexible printed circuit with a first end bonded to PCB 440. The flexible printed circuit 481 can then flexes such that its second end reaches emitter E1. In some examples, emitter E1 and detector D1 can be implemented on the flexible printed circuit 481. In some examples, printed circuit 481 can represent a rigid PCB or can be integrated within PCB 440 (e.g., when emitter E1 is located on the underside of PCB 440).

As shown in FIG. 4B, in some examples, a second printed circuit 483 can be used to estimate temperature to one or more additional emitter/detector pairs $E_i/D_i$. For example, FIG. 4B shows printed circuit 483 including thermopiles that can be used to estimate a temperature at emitter/detector pair E2/D2 and/or at emitter/detector pair E3/D3. A first end of printed circuit 483 can be coupled to absolute temperature sensor 442/PCB 440 in a similar manner as described for printed circuit 481. Printed circuit 483 can split into multiple tabs 483-1 and 483-2 at a point along its length. A first thermopile device 477A of printed circuit 483 (represented by multiple horizontal lines, representing series-coupled thermocouples of the thermopile) can span a length of the printed circuit 483 to an end of tab 483-1 (e.g., between absolute temperature sensor 442 and emitter E2). The first thermopile device 477A can be used to measure a temperature differential between its first end (e.g., at absolute temperature sensor 442) and its second end at tab 483-1 (e.g., at emitter E2). A differential signal can be measured from lines 494-1. A second thermopile device 477B of printed circuit 483 can span a length of the printed circuit 483 to an end of tab 483-1 (e.g., between absolute temperature sensor 442 and emitter E3). The second thermopile device 477B can be used to measure a temperature differential between its first end (e.g., at absolute temperature sensor 442) and its second end at tab 483-2 (e.g., at emitter E3). A differential signal can be measured from lines 494-2

Emitters E2 and E3 can receive drive and/or calibration signals from the system (e.g., processor 210, optical sensor controller 212) and/or transmit optical signals from detectors D2 and D3 (e.g., to optical sensor controller 212) over unidirectional or bi-directional lines 492 of circuit 483. In some examples, printed circuit 483 can be a flexible printed circuit, that has a first end at PCB 440, and flexes such that one of its tab ends reaches emitter E2, and another of its tab ends reaches emitter E3. In some examples, the emitters E2/E3 and detectors D2/D3 can be implemented on tabs 483-1 and 483-2 of a flexible circuit.⁻

It is understood that multiple thermopiles can be implemented using one or more printed circuits. In some examples, each printed circuit can include one thermopile (e.g., like printed circuit 481 with thermopile 477). In some examples, multiple thermopiles can be implemented on one printed circuit (e.g., like printed circuit 483 with tabs 483-1 and 483-2 including thermopiles 477A-477B). It is understood that although FIG. 4B references PCB 440 and absolute temperature sensor(s) 442, that the temperature sensing system can be implemented at other location within device 400.

As described herein, in some examples, physiological characteristics or signals can be estimated based on light detected by one or more detectors $D_i$, based on the estimated wavelength of light emitted by one or more emitters $E_i$. Host processor 210 or temperature sensor controller 240, for example, can measure or estimate temperature at one or more emitters $E_i$, to estimate a centroid wavelength of light emitted by each respective emitter $E_i$. Based on the temperature estimate/measurement at a particular emitter $E_i$, the system can adjust a driving parameter associated with the particular emitter $E_i$ to compensate for any potential drift in the centroid wavelength of the particular emitter, and thereby improve the accuracy and reliability of physiological characteristics or signals based on light detected by one or more detectors $D_i$. Alternatively, or additionally, the system can compensate an estimation of the physiological characteristic or signal based on the estimated centroid wavelength of light emitted by each respective emitter $E_i$.

It should be noted that the wavelength estimation techniques disclosed herein can be applied to any LED/PD (e.g., light emitting diode/photodetector components (e.g., any of the optical sensors 211 and/or any of the components therein (e.g., the light emitter(s) 204), sensing circuitry 208, or the light detector(s) 206) that are located at any location in the device (e.g., at the crown of a wearable device, at the front crystal module (FCM) (e.g., front crystal) or at the back crystal module (BCM) or back crystal).

As described herein, heat flux can be modeled to enable an estimate of a temperature outside of the device using temperatures inside the device. FIG. 5A illustrates a simplified schematic view of a heat flux model for an electronic device, such as the device of FIG. 4A, relative to a user's body according to some examples of the disclosure. As described above in connection with device 400, two absolute temperature sensors 432 and 442 can be positioned at different locations inside the device (e.g., on separate PCBs 430 and 440, respectively). Model 500 shows two separate nodes, corresponding to $T_2$ and $T_1$, representing absolute temperatures at absolute temperature sensors 432 and 442 inside device 400, respectively. Additionally, model 500 shows a resistance $R_{1-2}$ between the $T_2$ and $T_1$ nodes. $R_{1-2}$ can represent the thermal resistance between the $T_2$ and $T_1$ nodes, or the thermal resistance between absolute temperature sensors 432 and 442. Notably, model 500 assumes no additional heat sources or thermal aggressors are disposed between sensors 432 and 442. An additional resistance $R_{AMB}$ between the $T_2$ node and the $T_{AMBIENT}$ node can represent the thermal resistance between sensor 432 and the area outside device 400 (e.g., the ambient air temperature outside/above device 400). In the simplified model of FIG. 5A, $R_{AMB}$ can represent the combined thermal resistance of any components, including PCB 420 and portions of housing 410, that intervene between absolute temperature sensor 432 and the ambient air above and outside the front face of device 400. Another resistance, $R_{WRIST}$, between the $T_1$ node and the $T_{WRIST}$ node can represent the thermal resistance between sensor 442 and user 460, specifically the user's wrist for a wrist-worn wearable device. In the simplified model of FIG. 5A, $R_{WRIST}$ can represent the combined thermal resistance of any components, including PCB 440 and back face 450, that intervene between sensor 442 and user 460.

Using Fourier's Law, Heat Flux can be Expressed Using the Following Expression:

$$Q = -\frac{1}{R}(\Delta T)$$

where Q can represent heat flux between two nodes, $\Delta T$ can represent a temperature gradient or difference between two nodes and R can represent the thermal resistance between the nodes (1/R can represent the bulk thermal conductivity). Using two absolute temperature sensors 432 and 442, which generate respectively temperature measurements $T_2$ and $T_1$, the temperature at the wrist of user 460 (sometimes represented by $T_{WRIST}$ or $T_w$) can be expressed using the following expression:

$$T_w = T_1 + \frac{R_{WRIST}}{R_{1-2}}(T_1 - T_2)$$

The above expression provides a model by which a user's wrist temperature can be estimated, using the $T_2$ and $T_i$ temperature measurements generated by absolute temperature sensors 432 and 442, along with values for $R_{WRIST}$ and $R_{1-2}$ that can be characterized or otherwise determined at design and/or factory calibration of device 400 (e.g., during manufacturing). Due to the simplification of the model, the expression above assumes constant heat flux through each of the PCBs 430 and 440 on which absolute temperature sensors 432 and 442 can be positioned, and further assumes no additional heat sources in between absolute temperature sensors 432 and 442. However, these assumptions may not always be valid during the operation of device 400, which may lead to inaccurate or unreliable wrist temperature measurements for user 460 using the above expression derived from model 500. Further, the wrist temperature $T_w$ in model 500 often corresponds to the surface skin temperature, which may depart for core body temperature during vasoconstriction. Although the above expressions are focused on estimating temperature of a user's body, it should be understood that the expression can be modified to estimate ambient temperature instead.

FIG. 5B illustrates a linear model circuit equivalent of the components within device 400 (or within device 1800 discussed in detailed later below) that can be used to estimate a core temperature of a wrist of a user 460 (or a user 1860), using absolute sensor measurements from inside device 400 or device 1800. In some examples, core body temperature can be estimated by a sum of core temperature of a wrist and the heat flux through the user's arm multiplied by the thermal resistance through the arm. During vasodilation (e.g., during sleep) the thermal resistance through the arm can approach zero such that the core wrist temperature can be a close approximation of core body temperature. As described above, two absolute temperature sensors 432 and 442 can be positioned at different locations inside device 400

(e.g., on separate PCBs 430 and 440, respectively). Model 550 shows two separate nodes, corresponding to $T_2$ and $T_1$, representing temperature at absolute temperature sensors 432 and 442 inside device 400, respectively. Additionally, model 550 shows a resistance $R_{1-2}$ between the $T_2$ and $T_1$ nodes. $R_{1-2}$ can represent the thermal resistance between the $T_2$ and $T_1$ nodes, or the thermal resistance between absolute temperature sensors 432 and 442. Notably, model 550, similar to model 500, assumes no additional heat sources or thermal aggressors between sensors 432 and 442 and also assumes steady state (e.g., the back face of the device and the user' skin are at steady state). Model 550 includes resistance $R_{2-FC}$ between the $T_2$ node and the $T_{FC}$ node that can represent the thermal resistance between absolute temperature sensor 432 and the front crystal of device 400 (e.g., corresponding to the region within device 400 between PCB 420 and the front crystal (e.g., the temperature at a location or region adjacent to PCB 420). $R_{2-FC}$ can represent the combined thermal resistance of any components, including PCB 420 and portions of housing 410, that intervene between sensor 432 and the front face or front crystal of device 400 (including additional components not illustrated in FIG. 4A). Resistance $R_{FC-A}$ between the $T_{FC}$ node and the $T_A$ node can represent the thermal resistance between the front crystal of device 400 and the ambient air outside the front face of device 400. $R_{FC-A}$ can represent the combined thermal resistance of the interface between the front face or front crystal of device 400 and the ambient air above device 400.

Model 550 also includes resistance $R_{1-BC}$ between the $T_1$ and $T_{BC}$ nodes that can represent the thermal resistance between absolute temperature sensor 442 and the back face 450. $R_{1-BC}$ can represent the combined thermal resistance of any components, including PCB 440, between absolute temperature sensor 442 and back face 450 (including additional components not illustrated in FIG. 4A). Resistance $R_{CONT}$ between the $T_{BC}$ node and a $T_s$ node (corresponding to skin temperature of user 460) can represent the thermal resistance of the back face 450. $R_{S-A}$ in parallel with the series connected $R_{CONT}$, $R_{1-BC}$, $R_{1-2}$, $R_{2-FC}$, and $R_{FC-A}$. $R_{S-A}$ can represent the thermal resistance of air between the user's skin and the air above device 400. Finally, $R_{PHYS}$ between the $T_S$ node and a $T_C$ node (corresponding to a corrected skin temperature that can minimize the effect of heat exchange between the skin (e.g., wrist) and the ambient temperature) can represent a physiological thermal resistance associated with user 460.

$\Phi_{BC}$ shown in model 550 can correspond to a heat flux correction factor for the impact of ambient air temperature on skin temperature. A temperature heat flux correction, $\Phi_{BC}R_0$, can be expressed using the following expression:

$$\phi_{BC}*R_0 = h_0*(T_1-T_2)+h_1$$

where $h_0$ can represent a multiplier parameter from characterization of device 400 and $h_1$ can represent a self-heating parameter from characterization of device 400 and/or a calibration offset from characterization of device 400. The estimated temperature of back crystal can be expressed using the following expression:

$$T_{BC}=T_1+\alpha_0*(T_1-T_2)+\alpha_1$$

where $a_0$ can represent to a multiplier parameter from characterization of device 400 and $h_1$ can represent a self-heating parameter from characterization of device 400 and/or a calibration offset from characterization of device 400. It should be noted that $a_1$ and $h_1$ can be functions or constants. For example, different values of $a_1$ and $h_1$ can be used for different power modes of the device 400, such as the power modes discussed later in this present disclosure. Specific values for $a_0$ and $h_0$ can be determined based on the $R_{1-BC}$, $R_{1-2}$ resistance values described above and a physiological constant, $R_0$. In some examples $R_0$ can be determined through lab validations (e.g., empirical measurements based on a representative sample of users). In some examples, the multiplier parameters $a_0$ and $h_0$ can be expressed using the following expressions:

$$a_0 = \frac{R_{1-BC}}{R_{1-2}}, \; h_0 = \frac{R_0}{R_{1-2}}$$

Specific values for $a_1$ and $h_1$ can represent the impact of self-heating of device 400 on temperature measurements inside the device. In other words, $a_1$ and $h_1$ can represent or model the contribution of thermal aggressors (and other heat sources) to temperature measurements inside device 400, which in turn can impact estimates of temperatures outside device 400. In some examples, it is desirable to minimize $a_0$ to be close to zero. In some examples, $a_0$ is minimized by increasing (and/or maximizing) $R_{1-2}$, such as by increasing a distance between $T_1$ and $T_2$ and/or by inserting a thermally resistive material between $T_1$ and $T_2$, such as a foam or another thermally resistive substrate. In some examples, $a_0$ is minimized by decreasing (and/or minimizing) $R_{1-BC}$, such as by decreasing a distance between $T_1$ and $R_{BC}$.

Based on values determined empirically (e.g., through measurement, lab validation, characterization in factory, etc.) for the various resistances and parameters mentioned above, a device 400 can be capable of estimating corrected skin temperature of the user, or $T_C$ using the following expression:

$$T_C \approx T_{BC} + \phi_{BC}R_0, \text{where } R_0 = \alpha R_{phys} + R_{contact}$$

where $R_{phys}$ (e.g., $R_{PHYS}$) can represent a physiological thermal resistance associated with the user, a can represent a ratio of heat flow in the tissue of the user over heat flow in the device, which is optionally related to a ratio of the heat flow that is lost around the device (e.g., from the skin to the ambient air), and $R_{contact}$ (e.g., $R_{CONT}$) can represent the contact resistance.

In some examples, such as the example of FIG. 4A, device 400 estimates $T_{BC}$ based on temperature measurements $T_1$ and $T_2$, generated by two separate absolute temperature sensors, such as sensors 432 and 442 in FIG. 4A. However, as described herein, each of the absolute temperature sensors can have an associated error or drift, caused by variations in the sensor manufacturing process, variations in a supply voltage provided to the sensor, or variations in the operating temperature of the sensor. In some examples, as described herein, the error or drift can be reduced by measuring $T_{BC}$ using a thermopile 310 with one end coupled to or otherwise configured measure the temperature at the back crystal of device 400 (e.g., attached to back face 450). Specifically, a hot junction 318 of thermopile 310 can be secured directly to back face 450 with adhesives (e.g., a patterned adhesive layer or conductive epoxy), and a cold junction 312 can be coupled to an absolute temperature sensor 254 (e.g., absolute sensor 432 or 442). In such examples, absolute temperature sensor 254 can generate a temperature measurement at its own location within device 400, and thermopile 310 can generate a temperature differential or gradient measurement between its hot junction 318 (e.g., secured to back face 450) and its cold junction 312 (e.g., co-located with absolute temperature sensor 254).

Temperature sensor controller 240 (or host processor 210) of FIG. 2 can calculate the temperature at back face 450 by summing the absolute temperature measurement from absolute temperature sensor 254 and the temperature gradient measurement from thermopile 310 (e.g., a temperature difference between the hot junction and the cold junction of the thermopile).

Device 400 can utilize either of models 500 or 550 for estimating wrist temperature, (or alternatively ambient temperature). Model 550, however, may rely on fewer assumptions about the absence of self-heating elements within device 400 such as thermal aggressors. Additionally or alternatively, models 500 or 550 can also be used for devices including multiple absolute temperature sensors or a single absolute temperature sensor in combination with a thermopile 310 (as described herein). In general, model 550 can be utilized and/or modified for other arrangements as well, such as where a thermopile 310 is coupled to other surfaces of housing 410 (e.g., a front face of the device 400 above PCB 420 or to PCB 420, to directly measure $T_{FC}$). When estimating wrist temperature of a user 460 or estimating core temperature of the user's body, device 400 can maintain some user-specific parameters that vary from user to user. In some examples, different users can have different physiological resistance values, such as $R_{CONT}$ and $R_{PHYS}$, and device 400 can be calibrated by a user, or during manufacture, to rely upon values for physiological resistance that correspond to a particular user. It should be noted that the models 500 and 550 can correspond to the estimation of core body temperature mentioned in block 1416 of FIG. 14 discussed below; also, another model (e.g., a similar model that is modified with different resistor values (e.g., thermal resistance values) (and/or more or fewer, different resistors) based on the location of the temperature sensors, thermopile, noise aggressors (e.g., internal thermal noise aggressor components of the device), etc. can be used and solved to estimate other temperatures, such as one or more of the temperatures described above with reference to the model 550. Although primarily described in the context of a thermopile (flexible printed circuit or rigid PCB), the techniques described herein are modifiable and/or applicable to an electronic device including multiple absolute temperature sensors without a thermopile (e.g., as described with reference to the model of FIG. 19).

Figure 6B:
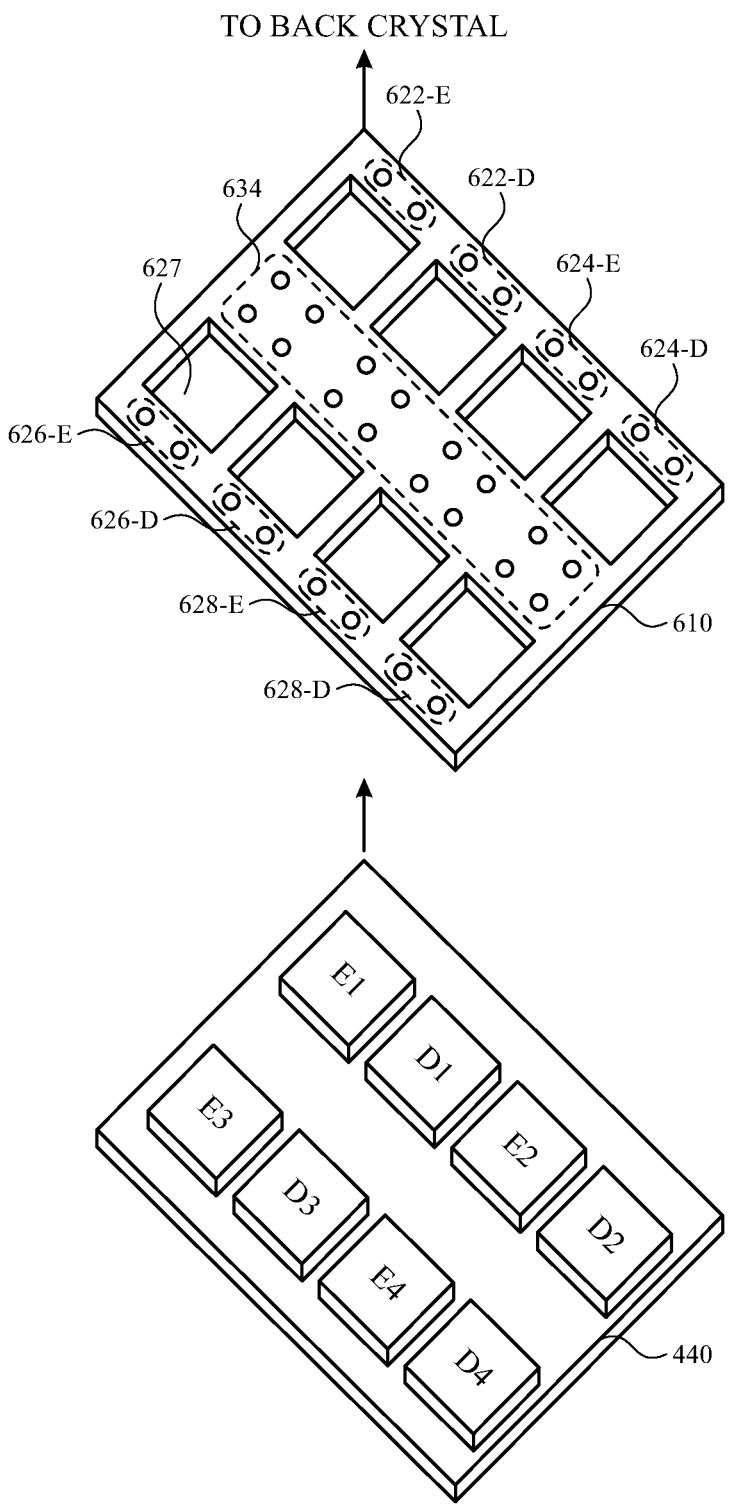
FIG. 6B illustrates an exploded view of a portion of an exemplary electronic device including one or more printed circuit boards and an integrated thermopile according to some examples of the disclosure.

FIG. 6A illustrates a cross-sectional side view of an exemplary electronic device with temperature sensing circuitry and/or heat flux sensing circuitry integrated with a printed circuit board according to some examples of the disclosure. Device 600 can correspond to device 400 of FIG. 4A, with the exception of a barrier 610 between PCB 440 and back face 450. Barrier 610 can be a rigid, multi-layer PCB that can include an integrated thermopile (e.g., similar to thermopile 310 of FIG. 3). In particular, an integrated or embedded thermopile within barrier 610 can be formed using vias, such as through-hole vias, blind vias, or buried vias as described with reference to FIGS. 7A-10. PCB 440 can have a bottom surface that faces barrier 610 and back face 450, illustrated in FIG. 6B. Barrier 610 can have a top surface that abuts, is adjacent to, or is attached to the bottom surface of PCB 440, sometimes using a patterned adhesive layer. Barrier 610 can also have a bottom surface that abuts, is adjacent to, or is attached to back face 450, sometimes using a patterned adhesive layer. Interposed between PCB 440 and back face 450 in this way, barrier 610 can include an embedded thermopile with a first junction (e.g., hot junction) formed at the bottom surface of barrier 610, and with a second junction (e.g., cold junction) formed between the bottom surface and the top surface of barrier 610.

In some examples, an embedded thermopile can be formed within barrier 610 using through-hole vias. In such examples, the embedded thermopile can have a hot junction at the bottom surface of barrier 610 that contacts the back face 450, and a cold junction at the top surface of barrier 610 that either contacts PCB 440, or is otherwise coupled to PCB 440. Absolute temperature sensor 442 located on PCB 440 can measure a temperature at a top surface of PCB 440. The temperature at the back face 450 ($T_{BC}$) can be estimated by adding the temperature differential or gradient measurement generated by the embedded thermopile of barrier 610 to an absolute temperature measurement generated by sensor 442. In other examples, an embedded thermopile can be formed within barrier 610 using blind vias. In such examples, the embedded thermopile can have a hot junction at the bottom surface of barrier 610 that contacts the back face 450, and a cold junction below the top surface of barrier 610 that does not extend to PCB 440. A thermopile formed using blind vias may not span the entire thickness of barrier 610, but still produces a temperature differential or gradient measurement that temperature sensor controller 240 can use to estimate the temperature at back face 450 ($T_{BC}$). In yet other examples, an embedded thermopile is formed within barrier 610 using buried vias. In such examples, the embedded thermopile has a hot junction above the bottom surface of barrier 610 that does not contact the back face 450, and a cold junction below the top surface of barrier 610 that does not extend to PCB 440. A thermopile formed using buried vias may not span the entire thickness of barrier 610, but still produces a temperature differential or gradient measurement that temperature sensor controller 240 can use to estimate the temperature at back face 450 ($T_{BC}$).

In some examples, the thermopile can be integrated with both PCB 440 and barrier 610. In some examples, the embedded thermopile can have a cold junction at a top surface of PCB 440 and a hot junction at a bottom surface of barrier 610, with through-hole vias used to implement the thermopile through both PCB 440 and barrier 610. In some examples, the thermopile can be integrated some, all or different combinations of the layers described herein for PCB 440 and/or barrier 610.

In general, barrier 610 can have a relatively high thermal resistance by virtue of being a thick, rigid PCB. In some examples, the thermal resistance can be between 1-5 Kelvin/Watt for a PCB of 100 square millimeters that is 0.3-1 mm thick. It is understood that thermal resistance can be greater or less than the range above dependent on the area, thickness and materials of the PCB. In some examples, the thickness of barrier 610 can be greater than 300 microns. In some examples, the thickness of barrier 610 can be greater than 1 millimeter. In some examples, the thickness of the barrier can be less than 300 microns (e.g., 100-300 microns). Because of the high thermal resistance of barrier 610, and the reliable sensitivity of its embedded thermopile, barrier 610 may not require the same individual calibration and characterization required by absolute temperature sensors, such as absolute temperature sensor 442. Any number of thermopiles can be embedded within barrier 610. In some examples, a single thermopile can be used to measure a temperature gradient for a region. In some examples, multiple thermopiles can be used to independently measure a temperature gradient a different locations. In this way, one or multiple temperature gradient or differential measurements corresponding to the region of barrier 610 or different sub-regions of barrier 610 can be generated, and used by temperature sensor controller 240 to measure the temperature of various circuit components, such as circuit components mounted on the bottom surface of PCB 440 that are adjacent to barrier 610.

FIG. 6B illustrates an exploded view of a portion of an exemplary electronic device including one or more printed circuit boards and an integrated thermopile according to some examples of the disclosure. FIG. 6B can show a relationship of various sensing assemblies to a back face of the electronic device. Specifically, FIG. 6B shows the bottom surfaces of PCB 440 and barrier 610 (with the direction inverted in FIG. 6B relative to the direction of PCB 440 and barrier 610 in FIG. 6A). As illustrated, multiple emitter-detector pairs (labeled $E_i/D_i$) can be mounted at the bottom surface of PCB 440. These emitter-detector pairs can correspond to light emitters 204 and light detectors 206, and can be used to measure physiological signals, as described above in connection with FIG. 2. Although described as pairs, it should be understood that multiple light paths can be formed between a respective emitter and multiple detectors or between multiple emitters and a respective detector. Additionally, it is understood that the number and/or arrangement of emitters and detectors in FIG. 6B is an example, and can be varied. In some examples, the wavelength of light emitted by light emitters 204 can vary as a function of temperature, which can impact an estimation of a physiological characteristic based on the detected light by light detectors 206. Accordingly, in some examples, estimating the temperature at the light emitters 204 or in the region included the light emitters can provide an estimation of the wavelength of the light emitter(s). This estimation of wavelength can be used for calibrating the emitted wavelength or compensating to results of light measurement or physiological characteristic estimation, which can improve the accuracy of physiological signals derived from such measurements.

Barrier 610 is illustrated with cutouts 627 corresponding to the locations of emitters (also referred to herein as light emitters or photoemitters) and detectors (also referred to herein as light detectors or photodetectors) mounted at the bottom surface of PCB 440. When assembled, cutouts 627 in barrier 610 allow for light to be emitted by the emitters and to be detected by the detectors. Additionally, barrier 610 can prevent or reduce cross-talk between light emitters and light detectors. In this context, barrier 610 is also referred to herein as an optical spacer. Vias of the thermopile can be represented by the unshaded circles adjacent to cutouts 627 in barrier 610. The visible surface of these vias on the bottom surface of barrier 610 can correspond to the hot junction of a thermopile embedded within barrier 610. As an example, vias 622-E and 622-D can correspond to two thermopiles for measuring the temperature at emitter E1 and at detector D1, respectively, and can optionally generate independent temperature differential or gradient measurements associated with each of the components. Alternatively, vias 622-E and 622-D can together correspond to a single thermopile for the emitter-detector pair E1/D1, and can generate a single temperature differential or gradient measurement associated with the two adjacent components. In particular, the thermopile(s) corresponding to vias 622-E and 622-D can generate a temperature differential or gradient measurement between the bottom surface of barrier 610 (e.g., the hot junction) and another surface within barrier 610 that can include the top surface of barrier 610 (e.g., when through-hole vias are used to form the thermopile).

The remaining vias illustrated in FIG. 6B can be substantially similar to vias 622-E and 622-D, and can similarly correspond to respective components mounted on PCB 440.

As an example, vias 624-E can correspond to emitter E2, vias 624-D can correspond to detector D2, vias 626-E can correspond to emitter E3, vias 626-D can correspond to detector D3, vias 628-E can correspond to emitter E4, and vias 624-D can correspond to detector D4. Any combination of vias illustrated in FIG. 6B can be coupled together to increase the number of thermocouples within a thermopile, thereby improving the thermopile sensitivity, but potentially reducing the number of potential independent measurements. Vias 634 in a region between cutouts 627 can be optional be formed within barrier 610 (e.g., between the rows of cutouts corresponding to emitter-detector pairs $E_i/D_i$ on PCB 440).

In some examples, all of the vias illustrated in FIG. 6B are coupled to one another, forming a single thermopile embedded across different regions of barrier 610 to measure the temperature differential across the barrier 610. When vias are coupled to one another to form a single thermopile, their corresponding hot and cold junctions can be formed at the same respective layers within barrier 610, to ensure that any output of the single thermopile corresponds to a temperature gradient or differential across a common distance/thickness within barrier 610. The cold junction of a thermopile embedded within barrier 610 can be accessible at the top surface of barrier 610 (not shown) can have two terminals, similar to the description of FIG. 3. When considered in combination with an absolute temperature measurement at or near the location of the cold junction (e.g., an output of sensor 442 on PCB 440), the temperature differential or gradient measurement generated by the thermopile within barrier 610 can be used to directly measure the temperature at the optical sensor (e.g., to estimate wavelength) and/or to directly measure the temperature at back face 450 ($T_{BC}$), which can improves the accuracy of estimates of wrist or core body temperature associated with user 460.

Figure 7A:
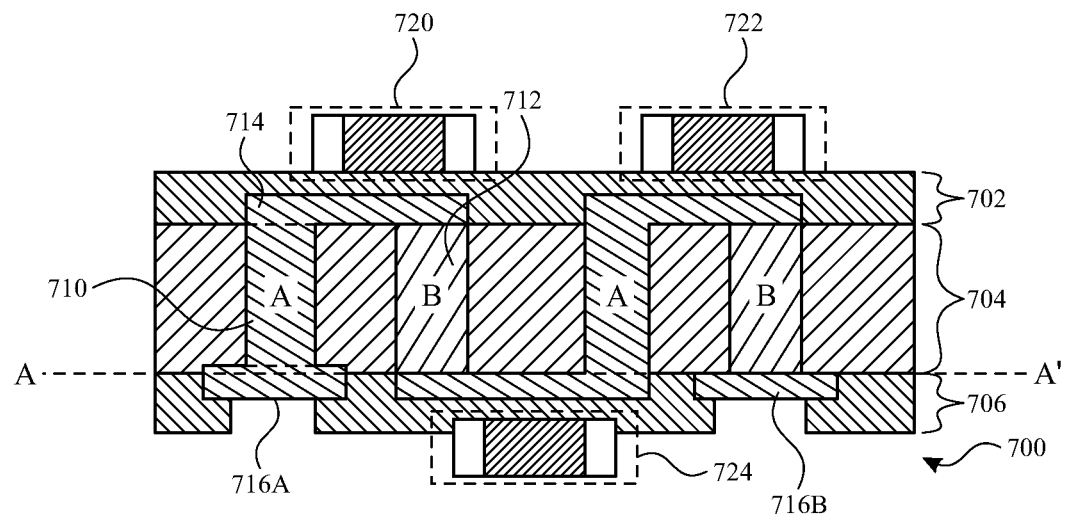
FIG. 7A illustrates a cross-sectional side view of an exemplary two-layer rigid printed circuit board with an integrated thermopile, and optional circuit components mounted on top and/or bottom surfaces of the printed circuit board according to some examples of the disclosure.

FIG. 7A illustrates a cross-sectional side view of an exemplary two-layer rigid printed circuit board with an integrated thermopile, and optional circuit components mounted on top and/or bottom surfaces of the PCB according to some examples of the disclosure. Barrier PCB 700 (e.g., optionally corresponding to barrier 610, but representative of any suitable rigid PCB in the device) can be a two layer rigid board, with a core layer 704 between a top soldermask layer 702 and a bottom soldermask layer 706. As described above in connection with thermopile 310 of FIG. 3, a thermopile can include a collection of series-connected thermocouples. Each thermocouple can correspond to a junction between a first material with a first associated Seebeck coefficient, and a second material with a second associated Seebeck coefficient that is different from the first Seebeck coefficient. In FIG. 7A, a first material with a first Seebeck coefficient can be represented with the letter "A," and a second material with a second Seebeck coefficient can be represented with the letter "B." For illustrative purposes, material A can be or include copper (Cu) (e.g., an epoxy or resin with copper particles), and metal B can be or include a copper-nickel (CuNi) alloy such as constantan (e.g., an epoxy or resin with copper and nickel particles or with constantan particles).

Conductive paths corresponding to the two different metals A and B, can correspond to conductive paths 314 and 316 of FIG. 3, respectively. To manufacture the embedded thermopile shown inside barrier PCB 700, via holes can be formed through core layer 704, and filled with vias 710 and 712 (e.g., with material A and material B, respectively. Various PCB processing methods, using with various materials (e.g., high volume production processes) can be used to create the vias. Deposition methods for forming the different layers include printing, dispensing material into holes/vias, and vacuum printing.

For illustrative purposes, via 710 can be filled with copper, copper particles suspended in epoxy, or copper-coated particles suspended in epoxy (e.g., according to a "via fill" manufacturing process). Similarly, via 712 can be filled with constantan, constantan particles suspended in epoxy, or constantan-coated particles suspended in epoxy. The two vias can be then connected using patterning at a copper layer of barrier PCB 700, such as copper connector 714 formed within the soldermask layer 702, above core layer 704. Connecting vias 710 and 712 using connector 714 forms a thermocouple, when the metal filled in via 710 has a different Seebeck coefficient than the metal filled in via 712. Since vias 710 and 712 span the thickness of core layer 704, a thermopile formed from the series combination of such vias measures heat flux, or the temperature differential/gradient, across the thickness of core layer 704. As shown to the right of via 712, another pair of vias similar to vias 710/712 are formed, and connected in series to via 712 (e.g., using a copper connector below core layer 704). In this way, each pair of connected vias with dissimilar conductors (e.g., metals) forms a thermocouple, and connecting such pairs of connected vias forms a thermopile embedded within barrier PCB 700.

A hot junction of the thermopile embedded within barrier PCB 700 can be located at the conductive layer on one side of core 704 (e.g., co-located with soldermask layer 702), and a cold junction of the thermopile embedded within barrier PCB 700 can be located at the conductive layer on the opposite side of core 704 (e.g., co-located soldermask layer 706). Viewed in this manner, terminal 716A can illustrate a copper contact for a cold junction of the thermopile embedded within barrier PCB 700 and terminal 716B can illustrate a copper contact for a hot junction of the thermopile embedded within barrier PCB 700. As shown in FIG. 7A, optionally circuit components 720, 722, and 724 can be surface-mounted on top and bottom surfaces of barrier PCB 700, along with the thermopile embedded within core layer 704. In other words, the integration of the thermopile with the PCB as shown in FIG. 7A can still allow for other components to be mounted on the PCB.

Figure 7B:
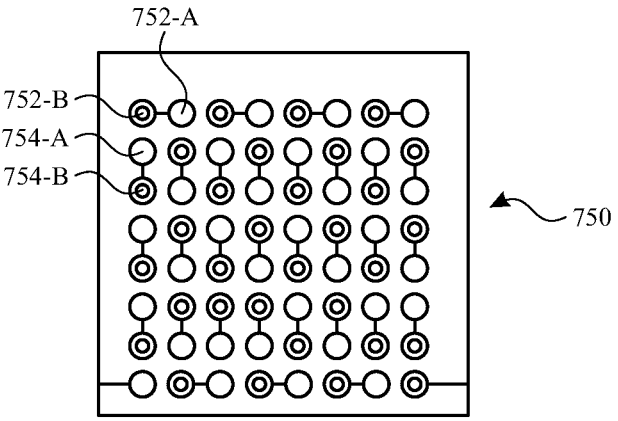
FIG. 7B illustrates a plan view of the exemplary rigid printed circuit board with an integrated thermopile according to some examples of the disclosure.

FIG. 7B illustrates a plan view of the exemplary rigid PCB with an integrated thermopile of FIG. 7A, specifically corresponding to a cross-section at the A-A' line of FIG. 7A. As shown in FIG. 7A, the A-A' line corresponds to a boundary between core layer 704 and soldermask layer 706. In other examples, the illustration of FIG. 7B can correspond to a cross section at the boundary of soldermask layer 702 and core layer 704. View 750 illustrates circular elements arranged in array that correspond to vias comprising various materials. As an example, via 752-A can include copper, while via 752-B can include constantan. As shown in FIG. 7B, via 752-A and via 752-B can be connected, thereby forming a thermocouple. Similarly, via 754-A can include copper, while via 754-B can include constantan, and the two vias can be connected to form another thermocouple. A first thermocouple, formed from vias 752-A and 752-B, can be connected to a second thermocouple, formed from vias 754-A and 754-B, to form a thermopile. The first thermocouple and the second thermocouple can be connected on a opposite side of the care material in a layer not visible in view 750 (e.g., using a copper connector 714). In this way, view 750 can illustrate a single thermopile, when all the shown connected via pairs are interconnected on another layer, in series. Alternatively, view 750 can illustrate multiple thermopiles, when different, independent subsets of the connected via pairs are interconnected on another layer, in series.

Although FIGS. 7A and 7B illustrate and relate to a two-layer barrier PCB 700, a thermopile can be embedded, or formed within a barrier PCB with more than two layers (e.g., an arbitrary number of layers). Specifically, two layers can be the minimum number required to form a thermopile, and certain PCBs with more than two layers can also be provided with an embedded or integrated thermopile.

Figure 8:
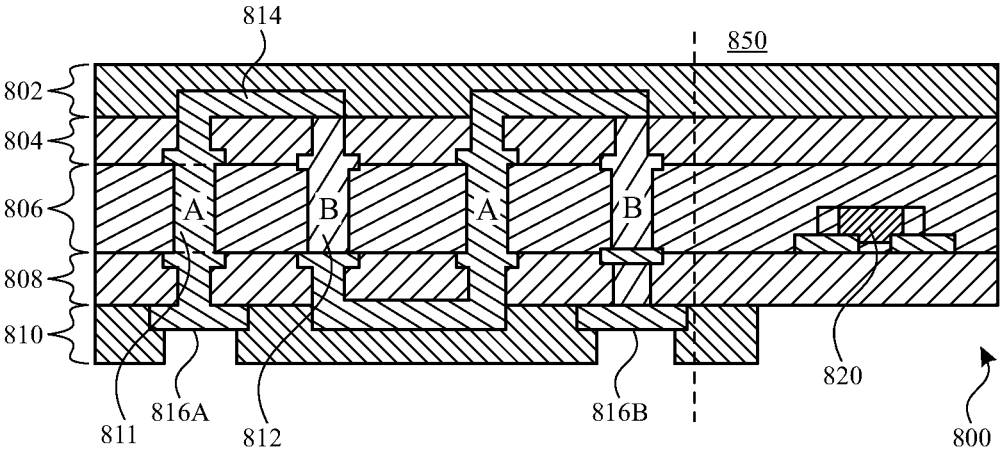
FIG. 8 illustrates a cross-sectional side view of an exemplary four-layer rigid printed circuit board with an integrated thermopile spanning four layers according to some examples of the disclosure.

FIG. 8 illustrates a cross-sectional side view of an exemplary four-layer rigid PCB with an integrated thermopile spanning four PCB layers according to some examples of the disclosure. Barrier PCB 800 can be a four-layer PCB with a soldermask layer formed on a top surface 802, and a soldermask layer formed on and a bottom surface 810. The four layer PCB can include a first core layer 804, a second core layer 806, and third core layer 808. The first core layer 804 can be disposed below top surface 802 of the soldermask layer, the second core layer 806 can be disposed below the first core layer 804, and the third core layer 808 can be disposed below the second core layer 806. In some examples, the first core layer 804, the second core layer 806 and/or the third core layer 808 can be formed from the same material. Patterned conductive layers can be disposed on surfaces of the core layers.

A first conductive material/first metal (e.g., copper) with a first Seebeck coefficient can be represented with the letter "A," and a second conductive material/second metal (e.g., constantan) with a second Seebeck coefficient can be represented with the letter "B." Conductive paths corresponding to the two different metals A and B, can correspond to conductive paths 314 and 316 of FIG. 3, respectively. To manufacture the embedded thermopile shown inside barrier PCB 800, via holes can be formed from soldermask layer 810 through to soldermask layer 802 (e.g., a through via). Once formed, the vias holes can be filled with vias 811 and 812 including metal A and metal B, respectively (e.g., as described with reference to FIG. 7A).

For illustrative purposes, via 811 can include copper, copper particles suspended in epoxy, or copper-coated particles suspended in epoxy (e.g., according to a "via fill" manufacturing process). Similarly, via 812 can include constantan, constantan particles suspended in epoxy, or constantan-coated particles suspended in epoxy. The two vias can then connected using patterning at a copper layer of barrier PCB 800, such as copper connector 814 formed within the soldermask layer 802, above first core layer 804. Interconnecting or coupling vias 811 and 812 using connector 814 can form a thermocouple, when the metal of via 811 has a different Seebeck coefficient than the metal of via 812. Because vias 811 and 812 can span the thickness of core layers 808, 806, and 804, a thermopile formed from the series combination of such vias can measure heat flux, or the temperature differential/gradient, across the entire thickness of core layers 808, 806, and 804. As shown to the right of via 812, another pair of vias similar to vias 811/812 can be formed, and connected in series to via 812. In this way, each pair of connected vias with dissimilar metals can form a thermocouple, and connecting such pairs of connected vias can form a thermopile embedded within barrier PCB 800.

A hot junction of the thermopile embedded within barrier PCB 800 can be located at the conductive layer on one side of core 804 (e.g., co-located with soldermask layer 802), and a cold junction of the thermopile embedded within barrier PCB 800 can be located at the conductive layer on the opposite side of core 808 (e.g., co-located with soldermask layer 810). Viewed in this manner, terminal 816A can illustrate a copper contact for a cold junction of the thermopile embedded within barrier PCB 800 and terminal 816B can illustrate a copper contact for a hot junction of the thermopile embedded within barrier PCB 800. Although not shown in FIG. 8, circuit components can be surface-mounted on top and bottom surfaces of barrier PCB 800 along with the thermopile embedded within core layers 808, 806, and 804 in a similar manner as described with reference to FIGS. 7A-7B. Further, in some examples, a region 850 (shown to the right of the embedded thermopile) can be unoccupied by any thermocouple/thermopile structures, leaving room for circuit components such as component 820 to be embedded within core layer 806. Relative to the two layer barrier PCB of FIG. 7A, the four layer barrier PCB of FIG. 8 can provide a relatively higher thermal resistance and improved sensitivity.

Figure 9:
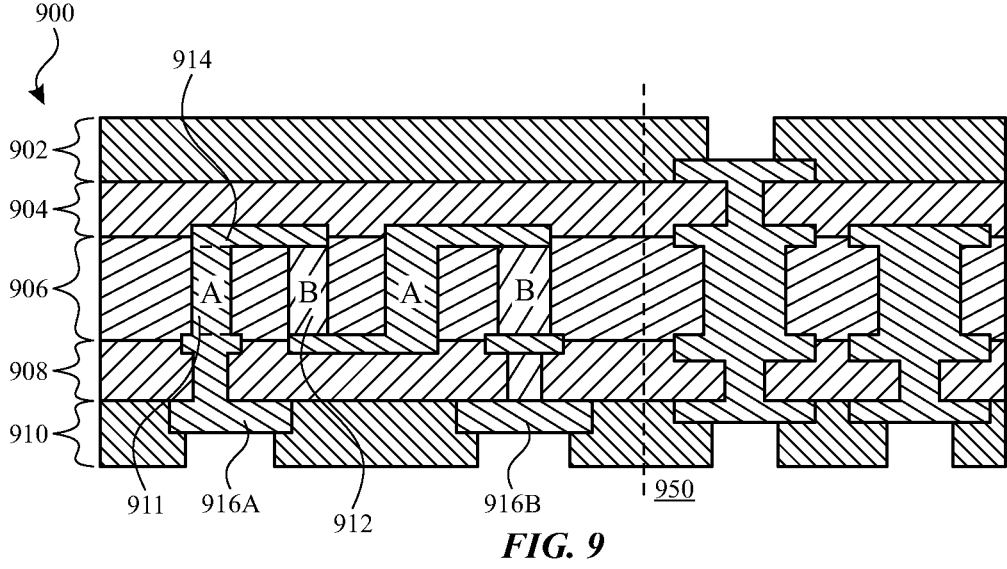
FIG. 9 illustrates a cross-sectional side view of an exemplary four-layer rigid printed circuit board with an integrated thermopile spanning three layers according to some examples of the disclosure.

FIG. 9 illustrates a cross-sectional side view of an exemplary four-layer rigid PCB with an integrated thermopile spanning two PCB layers (and partially spanning three layers) according to some examples of the disclosure. Barrier PCB 900 can be a four-layer PCB with a soldermask layer formed on a top surface 902 and on a bottom surface 910. The four layer PCB can include a first core layer 904, a second core layer 906, and third core layer 908. The first core layer 904 can be disposed below top surface 902 of the soldermask layer, the second core layer 906 can be disposed below the first core layer 904, and the third core layer 908 can be disposed below the second core layer 906. In some examples, the first core layer 904, the second core layer 906, and/or the third core layer 908 can be formed from the same material. Patterned conductive layers can be disposed on surfaces of the core layers.

A first conductive material/first metal (e.g., copper) with a first Seebeck coefficient can be represented with the letter "A," and a second conductive material/second metal (e.g., constantan) with a second Seebeck coefficient can be represented with the letter "B." Conductive paths corresponding to the two different metals A and B, can correspond to conductive paths 314 and 316 of FIG. 3, respectively. To manufacture the embedded thermopile shown inside barrier PCB 900, vias holes can be formed from soldermask layer 910 through to second core layer 906 (e.g., blind via and buried vias). Once formed, the via holes can be filled with vias 911 and 912 including metal A and metal B, respectively (e.g., as described with reference to FIG. 7A).

For illustrative purposes, via 911 can include copper, copper particles suspended in epoxy, or copper-coated particles suspended in epoxy (e.g., according to a "via fill" manufacturing process). Similarly, via 912 can include constantan, constantan particles suspended in epoxy, or constantan-coated particles suspended in epoxy. The two vias can then connected using patterning at a copper layer of barrier PCB 900, such as copper connector 914 formed within the soldermask layer 902, above second core layer 906. Interconnecting or coupling vias 911 and 912 using connector 914 can form a thermocouple, when the metal of via 911 has a different Seebeck coefficient than the metal of via 912. Because vias 911 and 912 can span the thickness of core layers 908 and/or 906 (e.g., primarily core layer 906 for buried vias), a thermopile formed from the series combination of such vias can measure heat flux, or the temperature differential/gradient, across the thickness of core layers 908, and 906, but not across the entire barrier PCB 900. As shown to the right of via 912, another pair of vias similar to vias 911/912 can be formed, and connected in series to via 912. In this way, each pair of connected vias with dissimilar metals can form a thermocouple, and connecting such pairs of connected vias can form a thermopile embedded within barrier PCB 900.

A hot junction of the thermopile embedded within barrier PCB 900 can be located at the conductive layer on one side of core 904 (e.g., co-located with second core layer 904), and a cold junction of the thermopile embedded within barrier PCB 900 can be located at the conductive layer on the opposite side of core 908 (e.g., co-located with solder-mask layer 910). Viewed in this manner, terminal 916A can illustrate a copper contact for a cold junction of the thermopile embedded within barrier PCB 900 and terminal 916B can illustrate a copper contact for a hot junction of the thermopile embedded within barrier PCB 900. Although not shown in FIG. 9, circuit components can be surface-mounted on top and bottom surfaces of barrier PCB 900 along with the thermopile embedded within core layers 906 and 908 in a similar manner as described with reference to FIGS. 7A-7B. Further, in some examples, a region 950 (shown to the right of the embedded thermopile) can be unoccupied by any thermocouple/thermopile structures, leaving room for circuit components (not shown) to be embedded within core layer 906, or other through-hole vias and blind vias (pictured) can be used for other purposes (e.g., routing signals, etc.). Relative to the two layer barrier PCB of FIG. 7A, the four layer barrier PCB of FIG. 9 can provide a relatively higher thermal resistance, and improved sensitivity.

Figure 10:
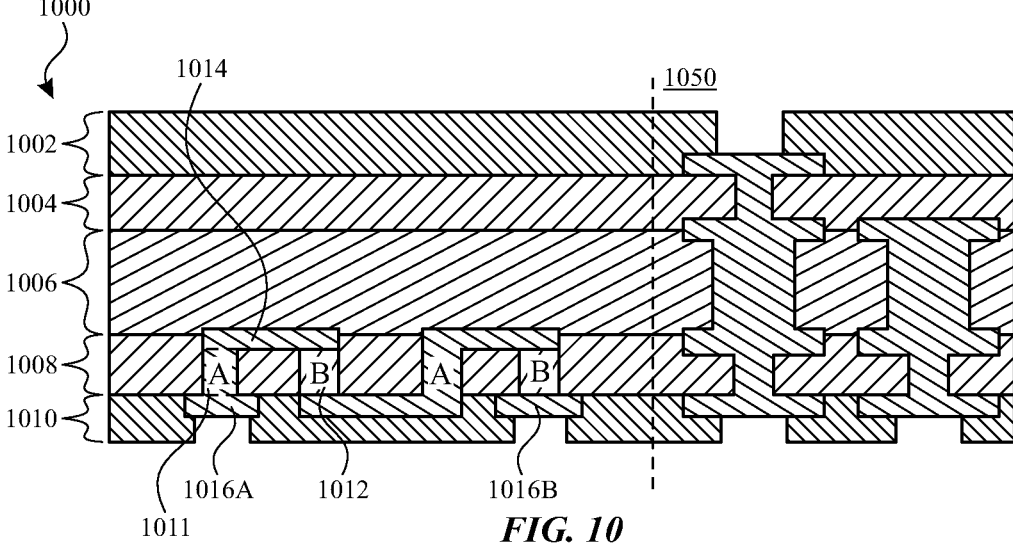
FIG. 10 illustrates a cross-sectional side view of an exemplary four-layer rigid printed circuit board with an integrated thermopile spanning two layers according to some examples of the disclosure.

FIG. 10 illustrates a cross-sectional side view of an exemplary four-layer rigid PCB with an integrated thermopile spanning two PCB layers according to some examples of the disclosure. Barrier PCB 1000 can be a four-layer PCB with a soldermask layer formed on a top surface 1002, and a soldermask layer formed on a bottom surface 1010. The four layer PCB can include a first core layer 1004, a second core layer 1006, and third core layer 1008. The first core layer 1004 can be disposed below top surface 1002 of the soldermask layer, the second core layer 1006 can be disposed below the first core layer 1004, and the third core layer 1008 can be disposed below the second core layer 1006. In some examples, the first core layer 1004, the second core layer 1006, and/or the third core layer 1008 can be formed from the same material. Patterned conductive layers can be disposed on surfaces of the core layers.

A first conductive material/first metal (e.g., copper) with a first Seebeck coefficient can be represented with the letter "A," and a second conductive material/second metal (e.g., constantan) with a second Seebeck coefficient can be represented with the letter "B." Conductive paths corresponding to the two different metals A and B, can correspond to conductive paths 314 and 316 of FIG. 3, respectively. To manufacture the embedded thermopile shown inside barrier PCB 1000, via holes can be formed from soldermask layer 1010 through to third core layer 1008 (e.g., a blind via). Once formed, the via holes can be filed with vias 1011 and 1012 including metal A and metal B, respectively (e.g., as described with reference to FIG. 7A).

For illustrative purposes, via 1011 can include copper, copper particles suspended in epoxy, or copper-coated particles suspended in epoxy (e.g., according to a "via fill" manufacturing process). Similarly, via 1012 can include constantan, constantan particles suspended in epoxy, or constantan-coated particles suspended in epoxy. The two vias can then connected using patterning at a copper layer of barrier PCB 1000, such as copper connector 1014 formed within the soldermask layer 1002, above third core layer 1008. Interconnecting or coupling vias 1011 and 1012 using connector 1014 can form a thermocouple, when the metal of via 1011 has a different Seebeck coefficient than the metal of via 1012. Because vias 1011 and 1012 can span the thickness of core layers 1008, a thermopile formed from the series combination of such vias can measure heat flux, or the temperature differential/gradient, across the thickness of core layers 1008, but not across the entire barrier PCB 1000. As shown to the right of via 1012, another pair of vias similar to vias 1011/1012 can be formed, and connected in series to via 1012. In this way, each pair of connected vias with dissimilar metals can form a thermocouple, and connecting such pairs of connected vias can form a thermopile embedded within barrier PCB 1000.

A hot junction of the thermopile embedded within barrier PCB 1000 can be located at the conductive layer on one side of core 1008 (e.g., co-located with soldermask layer 1002), and a cold junction of the thermopile embedded within barrier PCB 1000 can be located at the conductive layer on the opposite side of core 1008 (e.g., co-located with second core layer 1006 or more specifically, at the boundary of layers 1006 and 1008). Viewed in this manner, terminal 1016A can illustrate a copper contact for a cold junction of the thermopile embedded within barrier PCB 1000 and terminal 1016B can illustrate a copper contact for a hot junction of the thermopile embedded within barrier PCB 1000. Although not shown in FIG. 10, circuit components can be surface-mounted on top and bottom surfaces of barrier PCB 1000 along with the thermopile embedded within core layer 1008 in a similar manner as described with reference to FIGS. 7A-7B. Further, in some examples, a region 1050 (shown to the right of the embedded thermopile) can be unoccupied by any thermocouple/thermopile structures, leaving room for circuit components (not shown) to be mounted and connected within core layer 1006, or through-hole vias and other blind vias (pictured) can be used for other purposes (e.g., routing signals, etc.).

Figure 11:
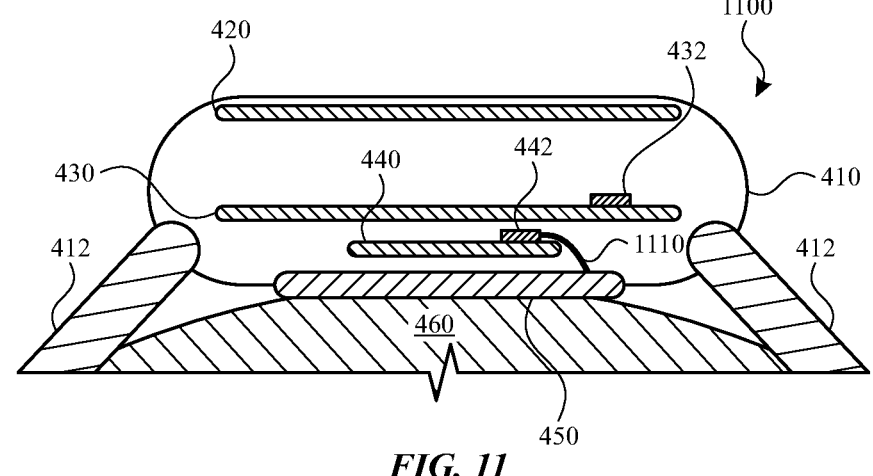
FIG. 11 illustrates a cross-sectional side view of an exemplary electronic device with temperature sensing circuitry and/or heat sensing circuitry integrated with a flexible circuit according to some examples of the disclosure.

FIG. 11 illustrates a cross-sectional side view of an exemplary electronic device with temperature sensing circuitry and/or heat sensing circuitry integrated with a flexible circuit according to some examples of the disclosure. Device 1100 is substantially similar to device 400 of FIG. 4A, with the exception of a flexible printed circuit (FPC) 1110 that can extend from a top surface of PCB 440 to back face 450. FPC 1110 can be a flexible, multi-layer printed circuit, that can include a thermopile similar to thermopile 310 of FIG. 3, embedded within a portion of its layers. In particular, an embedded thermopile within FPC 1110 can be formed using conductive paths printed on the layers of the FPC, with the conductive paths being connected using vias. In some examples, the conductive paths printed on the layers of FPC 1110 can extend across its entire (or substantially the entire) length (e.g., conductive paths can extend from PCB 440 to back face 450). PCB 440 can have a top surface, onto which an absolute temperature sensor 442 can be surface-mounted. Preferably, a thermopile embedded within FPC 1110 can have a cold junction at a first end that can be coupled to the top surface of PCB 440 and sensor 442. A thermopile embedded within FPC 1110 can have a hot junction that can abuts, can be adjacent to, or can be attached to back face 450, sometimes using a conductive epoxy that improves the thermal coupling between the thermopile hot junction and back face 450. In such a configuration, a thermopile embedded within FPC 1110 can measure a temperature differential or gradient between back face 450 (coupled to its hot junction), and PCB 440 (coupled to its cold junction). When absolute temperature sensor 442 and a cold junction of the thermopile embedded within FPC 1110 are co-located, the sum of an absolute temperature measurement generated at absolute temperature sensor 442 and the temperature differential measured by the thermopile can estimate the temperature at back face 450 ($T_{BC}$).

In general, embedding a thermopile within FPC 1110 can allow for direct temperature sensing/measurement at surfaces or regions inside device 400 that are not practical to measure or estimate using an absolute temperature sensor 254. As mentioned above in connection with FIG. 2, absolute temperature sensors can require supply power and other connections provided on a PCB, and therefore cannot be well-integrated to certain surfaces, such as the inner surface of back face 450). Moreover, a thermopile embedded within FPC 1110 can measure heat flux across its entire length (or substantially across its entire length), which can lead to temperature measurements at various surfaces that have greater accuracy and repeatability, compared to estimating those surface temperatures using multiple absolute temperature sensors. Depending on the number of conductive paths (sometimes referred to as "turns") of a thermopile within FPC 1110, the thermopile can have better sensitivity than an absolute temperature sensor.

Although FPC 1110 with an embedded thermopile is illustrated as extending from sensor 442 to back face 450, the cold and hot junctions of the embedded thermopile can be coupled between any two locations inside device 400 (e.g., from PCB 430 to the back face 450, from PCB 430 to PCB 440, from PCB 430 to PCB 420, etc.). In some examples, the embedded thermopile within FPC 1110 can have a cold junction coupled to a PCB including an absolute temperature sensor (e.g., one of absolute temperature sensors 432/442) and a hot junction coupled to any other location inside device 400 (e.g., back face 450, PCB 420, a sidewall inner surface of housing 410, etc.). In some examples, a hot junction of the embedded thermopile within FPC 1110 can be coupled to or in proximity to a circuit component, such as a light emitter 204 that emits light with a wavelength that varies as a function of temperature. In some examples, FPC 1110 and its embedded thermopile is coupled between absolute temperature sensors 432 and 442. In some examples, FPC 1110 and its embedded thermopile can be coupled between absolute temperature sensor 432 and PCB 420. In some examples, FPC 1110 and its embedded thermopile can be coupled between absolute temperature sensor 442 and PCB 420. In some examples, FPC 1110 and its embedded thermopile can be coupled between one of absolute temperature sensors 432/442 and the front face, or front crystal, of device 400. In some examples, FPC 1110 and its embedded thermopile can be coupled between absolute temperature sensor 442 and an inner surface of the device (at the same height within device 400 as PCB 440).

As described above in connection with thermopile 310 of FIG. 3, FPC 1110 can include a thermopile that includes multiple conductive paths or traces. The thermopile of FPC 1110 can be formed across at least two layers of FPC 1110, with a first layer for conductive paths of a first conductive material/first metal, with a first Seebeck coefficient (e.g., conductive paths 314), and with a second layer for conductive paths of a second conductive material/second metal, with a second Seebeck coefficient that is different from the first Seebeck coefficient (e.g., conductive paths 316). The first metal can be copper (Cu), and the second metal can be a copper-nickel (CuNi) alloy/constantan. In some examples, a conductive path of the first metal, formed in a first layer of FPC 1110, can partially overlap up to two conductive paths of the second metal, formed in the second layer of FPC 1110.

Conductive paths of different metals can be connected across different layers using vias.

Copper conductive paths can be coupled to constantan conductive paths, at a hot junction of FPC 1110 (e.g., the portion of FPC 1110 co-located with absolute temperature sensor 442), and at a cold junction (e.g., the portion of FPC 1110 secured to back face 450). As an example, a first copper path in a first layer can extend from a cold junction of FPC 1110 to its hot junction, and can be coupled to a first constantan path at the hot junction (e.g., by a via, or another inter-layer connector). The first copper path and the first constantan path can collectively form a first thermocouple. The first constantan path can then extend from the hot junction of FPC 1110 to its cold junction, and can be coupled to a second copper path at the cold junction (e.g., by a via, or another connector). The second copper path can then extend from the cold junction of FPC 1110 to its hot junction, and can be coupled to a second constantan path at the hot junction (e.g., by a via, or another connector). The second copper path and the second constantan path can collectively form a second thermocouple that can be coupled in series with the first thermocouple. In accordance with the arrangement of this example, the first constantan path can partially overlap one or more of the first and second copper paths used to form the thermopile embedded within FPC 1110.

FIG. 12A illustrates a cross-sectional side view of an exemplary flexible circuit with an inner layer used for signal propagation and outer ground layers that protect the inner layer according to some examples of the disclosure. FPC 1200 can include a first outer layer 1210 including copper flood or patterning (e.g., a shield layer, a ground/fixed potential layer, etc.) and a second outer layer 1230 including copper flood or patterning (e.g., a shield layer, a ground/fixed potential layer, etc.). An inner layer 1220 can include copper patterning for signal routing (e.g., signal paths). Connections between the layers 1210 and 1230 can be formed using a via 1240, or any other suitable inter-layer connector available on FPC 1200. FPC 1200 illustrates signal lines in layer 1220 to convey data signals, or any other suitable type of signal from one end of FPC 1200 to the other (ends of FPC 1200 are not illustrated in FIG. 12A, which is a cross-sectional side view). In some examples, integrating a thermopile into a FPC that already exists within device 400 can reduce design complexity and to conserve space within the device. However, as shown in FIG. 12A, all the layers of FPC 1200 can be copper layers, whereas a thermopile requires layers corresponding to two different conductive martials/metals, with different respective Seebeck coefficients.

FIG. 12B illustrates a cross-sectional side view of a modified FPC 1250 with an integrated thermopile based on the exemplary flexible circuit of FIG. 12A according to some examples of the disclosure. In some examples, one of the outer layers (e.g., outer layer 1210) in FIG. 12A can be formed of a different material/metal, such as constantan, or copper-nickel (CuNi) alloy outer layer 1212. Though copper may have a lower resistance (e.g., per unit area) than constantan, an outer layer 1212 formed from constantan can be used to provide a ground plane, or shielding layer for the inner layer 1220.

The thermopile can be implemented in the thermopile routing region 1290 adjacent to via 1240, in FPC 1250 (e.g., adjacent to existing patterned or flooded traces in layers 1210, 1220, and 1230. Thermopile routing region 1290 can include conductive paths patterned from the constantan outer layer 1212 and the copper inner layer 1220. As an example, a first copper path within inner layer 1220 can extend from a cold junction of FPC 1250 to its hot junction, and can be coupled to a first constantan path within outer layer 1212 at the hot junction (e.g., by a via, or another inter-layer connector). The first copper path and the first constantan path can collectively form a first thermocouple. The first constantan path within outer layer 1212 can then extend from the hot junction of FPC 1250 to its cold junction, and can be coupled to a second copper path within inner layer 1220 at the cold junction (e.g., by a via, or another connector). The second copper path within inner layer 1220 can then extends from the cold junction of FPC 1250 to its hot junction, and can be coupled to a second constantan path within outer layer 1212 at the hot junction (e.g., by a via, or another connector). The second copper path and the second constantan path can collectively form a second thermocouple that can be coupled in series with the first thermocouple. In accordance with the arrangement of this example, the first constantan path within the outer layer 1212 can partially overlap one or more of the first and second copper paths within the inner layer 1220 used to form the thermopile embedded within FPC 1250.

The arrangement shown in FIG. 12B illustrates a three-layer FPC 1250 to maintain flexibility of the FPC. However, it should be understood, that in some examples, a fourth constantan layer can be added to the FPC of FPC 1250, and a thermopile can be integrated with the FPC using conductive paths patterned in the constantan layer and conductive paths patterned in the layers 1210, 1220 and/or 1230.

FIG. 13A illustrates a cross-sectional side view of an exemplary flexible circuit with a first segment using an inner layer for data signal propagation and a second segment using an outer layer (or outer layers) for power signal propagation according to some examples of the disclosure. FPC 1300 can include first outer layer segments 1310-1 and 1310-2 including copper flood or patterning (e.g., a shield layer/a ground layer, a power propagation layer, etc.) and second outer layer segments 1330-1 and 1330-2 including copper flood or patterning (e.g., a shield layer/a ground layer, a power propagation layer, etc.). Inner layer segments 1320-1 and 1320-2 can including copper patterning for signal routing (e.g., signal paths). Though outer layer segments 1310-1 and 1310-2 are formed on the same layer, they can be electrically isolated or otherwise electrically separated as represented by a gap between segments 1310-1 and 1310-2. Similarly, outer layer segments 1330-1 and 1330-2 can be formed on the same layer, but can be electrically isolated or otherwise electrically separated as represented by a gap between segments segment 1330-1 and 1330-2). It should be understood however, that FPC 1300 can have a contiguous dielectric layer between the conductive layers shown.

Connections between the layers 1310-1, 1320-1, and/or 1330-1 can be formed using one or more vias (e.g., vias 1340), or any other suitable inter-layer connector available on FPC 1300, in a similar manner as described for FPC 1200. FPC 1300 illustrates signal lines used to convey data signals in layer 1320-1 and 1320-2 from one end of FPC 1300 to the other (ends of FPC 1300 are not illustrated in FIG. 13A, which is a cross-sectional side view). FPC 1300 also illustrates a power signal lines in layer 1310-2 and/or 1330-2 from one end of FPC 1300 to the other (ends of FPC 1300 are not illustrated in FIG. 13A, which is a cross-sectional side view). In some examples, integrating a thermopile into a FPC that already exists within device 400 can reduce design complexity and to conserve space within the device. However, as shown in FIG. 13A, all the layers of FPC 1300 can be copper layers, whereas a thermopile requires layers corresponding to two different conductive materials/metals, with different respective Seebeck coefficients.

FIG. 13B illustrates a cross-sectional side view of a modified FPC 1350 with an integrated thermopile based on the exemplary flexible circuit of FIG. 13A according to some examples of the disclosure. In some examples, because one or more of outer layers 1310-2 and 1330-2 can route power signals, these layers cannot be replaced with constantan, or copper-nickel (CuNi) alloy outer layer, without incurring a significant increase in power dissipation caused by the higher resistance of constantan (relative to copper). Thus, in some examples, integration of the thermopile into the FPC can be achieved by replacing inner layer 1320-1 and 1320-2 of copper with inner layer 1322 of constantan instead.

The thermopile can be implemented in the thermopile routing region 1390 adjacent to via 1341, in FPC 1350 (e.g., adjacent to existing patterned or flooded traces in layers 1310-2, 1320-2, and 1330-2 of the second connector of FPC 1300. Thermopile routing region 1390 can include conductive paths patterned from the constantan inner layer 1322 and the copper outer layer 1310-1/1310-2. As an example, a first copper path within the copper outer layer can extend from a cold junction of FPC 1350 to its hot junction, and can be coupled to a first constantan path within inner layer 1322 at the hot junction (e.g., by a via, or another inter-layer connector). The first copper path and the first constantan path can collectively form a first thermocouple. The first constantan path within inner layer 1322 can then extends from the hot junction of FPC 1350 to its cold junction, and can be coupled to a second copper path within the outer layer at the cold junction (e.g., by a via, or another connector). The second copper path within the outer layer can then extend from the cold junction of FPC 1350 to its hot junction, and can be coupled to a second constantan path within inner layer 1322 at the hot junction (e.g., by a via, or another connector). The second copper path and the second constantan path can collectively form a second thermocouple that can be coupled in series with the first thermocouple. In accordance with the arrangement of this example, the first constantan path within the inner layer 1322 can partially overlap one or more of the first and second copper paths within the outer copper layer used to form the thermopile embedded within FPC 1350.

Figure 14:
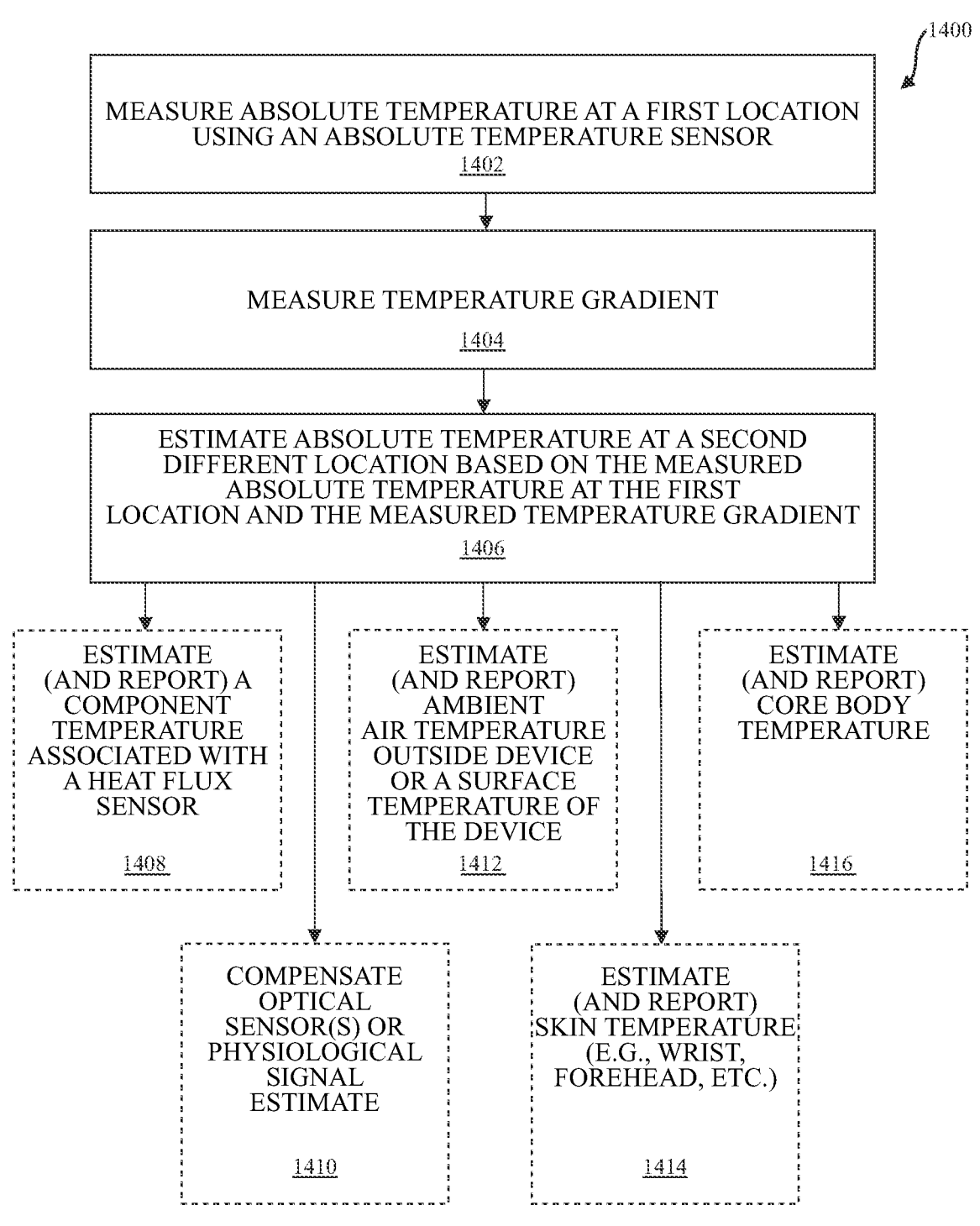
FIG. 14 illustrates an example process of estimating a temperature inside and/or outside a device according to some examples of the disclosure.

FIG. 14 illustrates an example process of estimating a temperature (e.g., using an absolute temperature sensor and a heat flux sensor) inside and outside a device according to some examples of the disclosure. At 1402, the system (e.g., computing system 200) can measure absolute temperature using an absolute temperature sensor (e.g., absolute temperature sensor 254, 432, 442) located inside of a device housing of the system. As an example, an absolute temperature sensor 442 can measure absolute temperature at a first location within device 400. Absolute temperature sensors be implemented using a negative temperature coefficient (NTC) temperature sensor, a resistance temperature detector (RTD), or a diode based temperature sensor. A temperature measurement from an absolute temperature sensor can correspond to a temperature at a first location (e.g., corresponding to a location of the absolute temperature sensor and/or to the local area around the sensor).

At 1404, the system can measure a temperature gradient. In some examples, the temperature gradient can be between a first location (e.g., corresponding to the absolute temperature sensor) and second, different location within the device. In some examples, the system measures the temperature gradient (temperature differential) using a thermopile or other heat flux sensor 256, as described herein.

At 1406, the system can estimate absolute temperature at the second, different location based on the absolute temperature measured by an absolute temperature sensor and the temperature gradient/differential measured by a heat flux sensor 256 (e.g., a thermopile 310 as shown FIG. 3). In some examples, the second location can be within the device, but separated from the first location by the thermopile. In some examples, the system can calculate the sum of the absolute temperature measurement at the first location and the temperature gradient measurement to estimate an absolute temperature at a second location (e.g., at an end the thermopile or other heat flux sensor). In some examples, such as the example of FIG. 6A, a thermopile can be embedded within the rigid PCB of barrier 610 (and/or PCB 440). A first end of the thermopile/barrier can be coupled to an underside of PCB 440, and a second end of the thermopile/barrier can be coupled to back face 450. In some such examples, the system (e.g., host processor 210 or temperature sensor controller 240) can estimate an absolute temperature at back face 450 by adding a temperature gradient/differential measured by the thermopile embedded within the rigid PCB of barrier 610, to an absolute temperature measurement generated at absolute temperature sensor 442. In some examples, a thermopile can be implemented using a flexible printed circuit 1110 having a first end coupled to absolute temperature sensor 442/PCB 440, and a second end coupled to back face 450. In some such examples, the system (e.g., host processor 210 or temperature sensor controller 240) can estimate an absolute temperature at back face 450 by adding a temperature gradient/differential measured by the thermopile embedded within FPC 610, to an absolute temperature measurement generated at absolute temperature sensor 442.

In some examples, such as the example of FIG. 4B, multiple thermopiles can be used with one or more absolute temperature sensors to estimate temperatures at multiple locations within the device in a similar manner.

At 1408, the system can optionally estimate a component temperature associated with a heat flux sensor 256. As an example, when heat flux sensor 256 is a thermopile with an end coupled to a location at or near a component of the system, the system (e.g., temperature sensor controller 240, host processor 210) can estimate the temperature of the particular component based on the estimated absolute temperature at the end of the thermopile (e.g., the absolute temperature estimated at 1406). In some examples, a device can be characterized to estimate a temperature of a component based on the estimated temperature at the second location. Based on the component temperature estimated at 1408, the system (e.g., power management circuitry 209) can make determinations about its operating conditions, such as determining whether any particular component temperature exceeds a predefined upper temperature boundary associated with impaired or unsafe component operation. In some examples, the system can report component temperatures, or conditions determined to be associated with component temperatures, to a user. In some examples, the components of the system can include one or more processors, wireless communication circuitry, global positioning system, optical emitters, etc.

Additionally or alternatively, at 1410, the system can compensate an optical sensor or compensate an estimate of one or more physiological signals based on the absolute temperature estimated at 1406. As an example, light emitters 204 can optionally include LEDs that can produce a very narrow band of visible or non-visible light, with an associated centroid wavelength of that band. The centroid wavelength of an LED can change, or drift based on a temperature of the LED. When the absolute temperature estimated at 1406 corresponds to a temperature associated with a particular light emitter 204, a compensation model (not shown) can be used to determine the centroid wavelength of the particular light emitter, which can be provided as a parameter to the compensation model. In some examples, the compensation can change the stimulation applied to an emitter so that the light emitted falls within the desired narrow band of light. In some examples, the estimated wavelength can be provided to processing circuitry used to estimate physiological signals based on sensor data from the light detector 206 associated with the particular light emitter 204 to compensate for the effects of the thermal drift of the emitter on the estimate. It should be noted that the wavelength estimation techniques disclosed herein can be applied to any LED/PD (e.g., light emitting diode/photodetector or photodiode components that are located at any location in the device.

Additionally or alternatively, at 1412, the system can estimate ambient air temperature outside the device (e.g., outside housing 410) and/or estimate a surface temperature of the device, such as a temperature on the front crystal or front face of the device. In some examples, the absolute temperature at the second location estimated at 1406 corresponds to a temperature at front face 162 of a device 160, as shown in FIG. 1F. In other examples, the absolute temperature estimated at 1406 corresponds to a temperature at the top surface of PCB 420, located at the front face of housing 410 of FIG. 4A. A heat flux model, such as model 500 or 550 illustrated in FIGS. 5A and 5B, can be used in conjunction with the temperature estimated at 1406 (corresponding to $T_2$ in model 500, and $T_{FC}$ in model 550), to estimate an ambient air temperature outside of the device ($T_A$, or $T_{AMBIENT}$), sometimes referred to as an environmental temperature. In some examples, the estimated ambient air temperature outside of the device can be reported to the user (e.g., displayed on a display).

Additionally or alternatively, at 1414, the system can estimate skin temperature, such as the temperature of skin at a user's wrist, forehead, temples, or any other body surface that contacts a housing of the system. In some examples, the absolute temperature estimated at 1406 corresponds to a location within the housing that contacts the user's body at its outer surface. As an example, the absolute temperature estimated at 1406 can correspond to back face 450, which can have an outer surface that contacts a wrist of user 460 (as shown in FIG. 4A). As another example, the absolute temperature estimated at 1406 can correspond to a front face of device 400 (e.g., adjacent to PCB 420), which can have an outer surface that can be pressed against the forehead of user 460 or another person (e.g., by moving the device so that its front face is pressed against the forehead). In some examples, temperature sensor controller 240 uses the temperature estimated at 1406 as an input to a heat flux model, such as model 500 or 500 illustrated in FIGS. 5A and 5B, to estimate skin temperature associated with user 460 ($T_{WRIST}$, $T_S$, or $T_C$ corresponding to corrected skin temperature). In some examples, the estimated skin temperature associated with user 460 can be tracked and/or reported to the user (e.g., displayed on a display).

Additionally or alternatively, at 1416, the system can estimate core body associated with user 460. In some examples, the absolute temperature estimated at 1406 can correspond to wrist temperature measured at a back face of the device, and can be used to estimate body temperature when the user is in a vasodilation condition (e.g., at night when a user sleeps). In other examples, the absolute temperature estimated at 1406 can correspond to forehead or temple temperature, and can be used to measure temperature at a different region of the body at or closer to core body temperature using a front face, or strap of the device to enable measurements at the forehead or temples, even during vasoconstriction. For example, a user may bring the front face of a wearable device into contact with the forehead to estimate core body temperature, or secure a strap of the wearable device around the head to estimate core body temperature. In some examples, the estimated core body temperature can be tracked and/or reported to the user (e.g., displayed on the display). Generally, at 1416, the system can estimate core body temperature associated with a user, based on skin temperatures, such as those estimated at 1414. Accordingly, 1416 can optionally be performed using the estimated skin temperature from 1414 as a parameter input to a heat flux model (e.g., models 500 or 550 from FIGS. 5A and 5B), to estimate a user's core body temperature.

Figure 15:
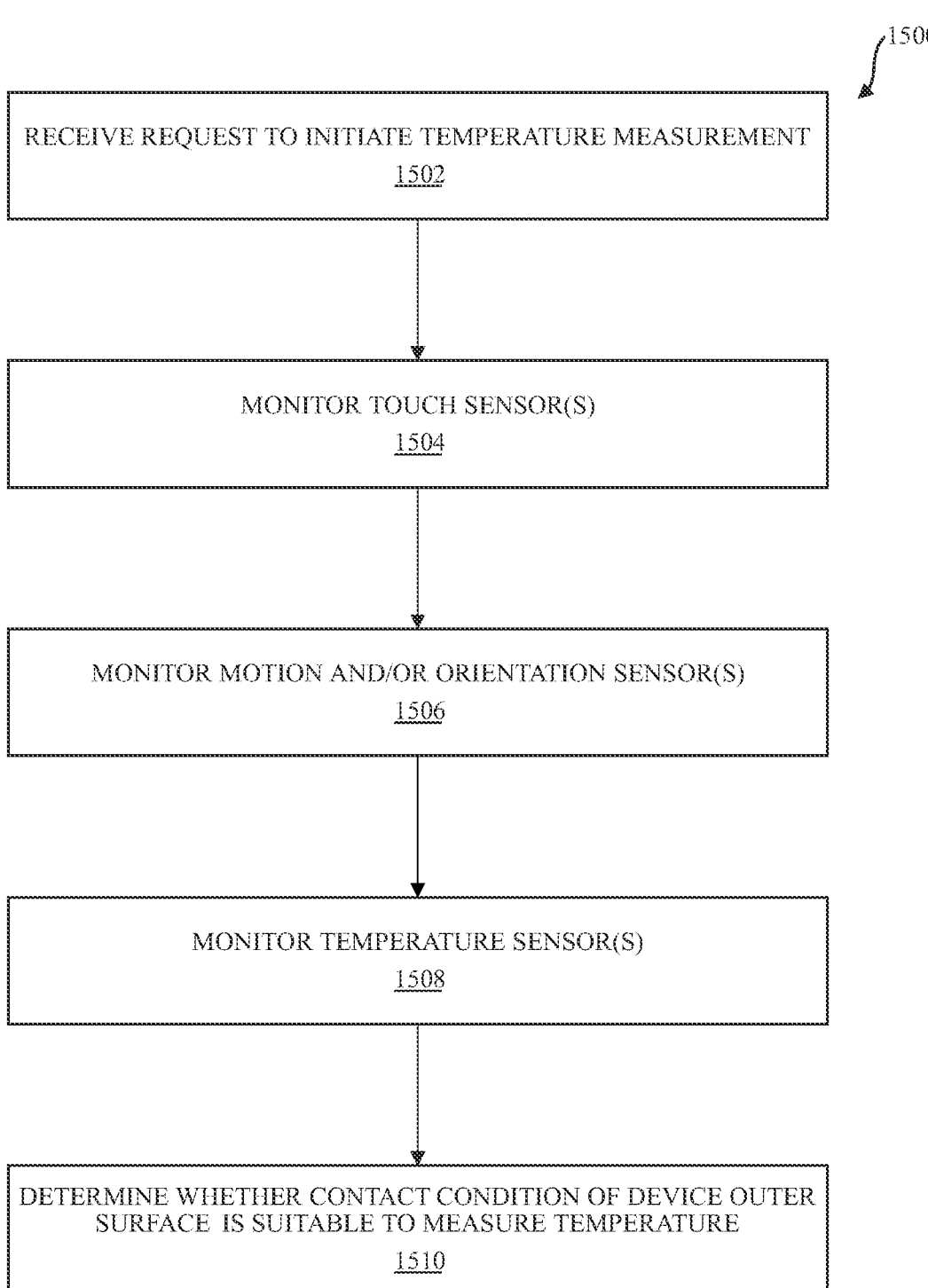
FIG. 15 illustrates an example process of operating a device for temperature sensing operations according to some examples of the disclosure.

FIG. 15 illustrates an example process of operating a device for temperature sensing operations according to some examples of the disclosure. For example, process 1500 can determine that an electronic device used for temperature sensing operations correspond to conditions suitable for a qualifying temperature sensing measurement. For example, the conditions for a valid temperature sensing measurement can include sufficient contact between an outer surface of the device and a user's skin and/or an absence of motion (e.g., a stationary user with relatively stationary contact between a front face of a device and a user's forehead). At 1502, the system (e.g., host processor 210) can receive a user request to initiate temperature measurement at an outer surface of the device. In some examples, in response to the user request, the system (e.g., processor 210) can determine whether one or more criteria associated with a contact condition of the device at its outer surface are satisfied. As an example, when the user requests temperature measurement at the wrist (based on temperature measurement at the back face), the system can determine whether criteria associated with a contact condition between the back face and the user's wrist have been satisfied. As another example, when the user requests temperature measurement at the forehead or temples (based on temperature measurement at the front face of a device or at the strap), the system can determine whether criteria associated with a contact condition between the front face and the user's forehead or between the strap and the user's temples have been satisfied. As yet another example, when the user requests temperature measurement of the ambient air surrounding the device, the system can determine whether criteria associated with a contact condition between the front face and the ambient air (e.g., the absence of a contact condition between the front face and any object) have been satisfied. It should be understood that the criteria may be different depending on the type of temperature measurement. For example, contact may be desirable with the skin for a body temperature measurement, but may be undesirable for an ambient air temperature measurement. In some examples, process 1500 can be performed without requiring a user input to request a temperature sensing measurement (e.g., an opportunistic measurement). In some examples, when a user input to request a temperature measurement is used a subset of the sensors and/or relaxed associated criteria can be used to determine the contact condition of the device outer surface is suitable for the temperature measurement.

At 1504, the system (e.g., touch and display controller 216) monitors touch sensors such as touch screen 220, to determine whether sensor data from touch screen 220 indicate that a contact condition of the device corresponding to the requested temperature measurement has been satisfied. As an example, when a user requests forehead temperature measurement at 1502, touch screen 220 can be monitored for data indicative of a user's forehead or temples contacting the touch screen 220. In some examples, the one or more criteria can include a criterion that is satisfied when an object is detected in contact with the touch sensor. In some examples, the one or more criteria include a criterion that is satisfied when an object greater than threshold area of the touch sensor. In some examples, the one or more criteria include a criterion that the object corresponds to human tissue (e.g., excluding floating objects such as water droplets). As another example, when a user requests ambient air temperature measurement, touch screen 220 can be monitored for data indicative of no objects being in contact with the touch screen 220 (e.g., to ensure the front face and touch screen completely contact the ambient air outside the device).

Additionally or alternatively, at 1506, the system (e.g., host processor 210, temperature sensor controller 240) can monitor motion and/or orientation sensors 230. In some examples, the system can use the data from motion and/or orientation sensors 230 to determine that a user is stationary and/or that a contact between the user and the outer surface of the device is stationary (e.g., less than a threshold amount of movement by the user and/or by the device relative to the user). In some examples, motion of the user and/or motion of the device relative to the user's skin can introduce noise (motion artifacts) into the temperature measurement. In some examples, the system can use the data from motion and/or orientation sensors 230 to determine whether a user has performed a gesture to satisfy the contact condition of the requested temperature measurement. The gesture to satisfy the contact condition can include mechanical gestures that indicate a device has been moved to an appropriate location for temperature measurement/estimation. As an example, when a user requests forehead temperature measurement at 1502, motion and/or orientation sensors 230 can be monitored for data indicative of a gesture to bring a wearable device from a first height to a second height associated with the user's forehead or temples and/or to rotate the wrist to bring the front face of the device to the forehead.

Additionally or alternatively, at 1508, the system (e.g., temperature sensor controller 240, power dissipation monitoring circuitry 213, etc.) can monitor temperature sensors 250 and/or power dissipation sensors. In some examples, the monitoring can determine whether sensor data from sensors 250 indicate that a user has positioned the device such that it contacts a surface corresponding to the requested temperature measurement. As an example, sensor data from temperature sensors 250 can be monitored for temperatures within an expected range of temperatures for the requested temperature measurement (e.g., optionally a first expected temperature range for wrist temperature measurement, a second expected temperature range for forehead temperature measurement, a third expected temperature range for ambient air temperature, etc.). In some examples, the one or more criteria can include a criterion that is satisfied when the measured temperature is within an expected range. In some examples, the monitoring can determine the power usage by the device (or a subset of components) and the associated temperature effects on the system or directly measure the temperature of the system. In some examples, when the power usage or the temperature is too high, the system can forgo a temperature measurement or take other action to improve conditions or to suppress the measurement from being reported. In some examples, the one or more criteria can include a criterion that is satisfied when the power usage and/or the internal device temperature are below a power usage and/or temperature threshold.

At 1510, the system can determine whether the outer surface of the device has satisfied one or more criteria associated with a contact condition for the requested temperature measurement. When the one or more criteria are satisfied, the system can estimate the temperature. When the one or more criteria are not satisfied, the system can forgo estimating the temperature (or the system can attempt to improve conditions, compensate the temperature estimate, and/or suppress the estimate from being reported to the user). The system can estimate the temperature using temperature sensors 250 including a thermopile as described herein (and optionally heat flux models as described herein).

Figure 16:
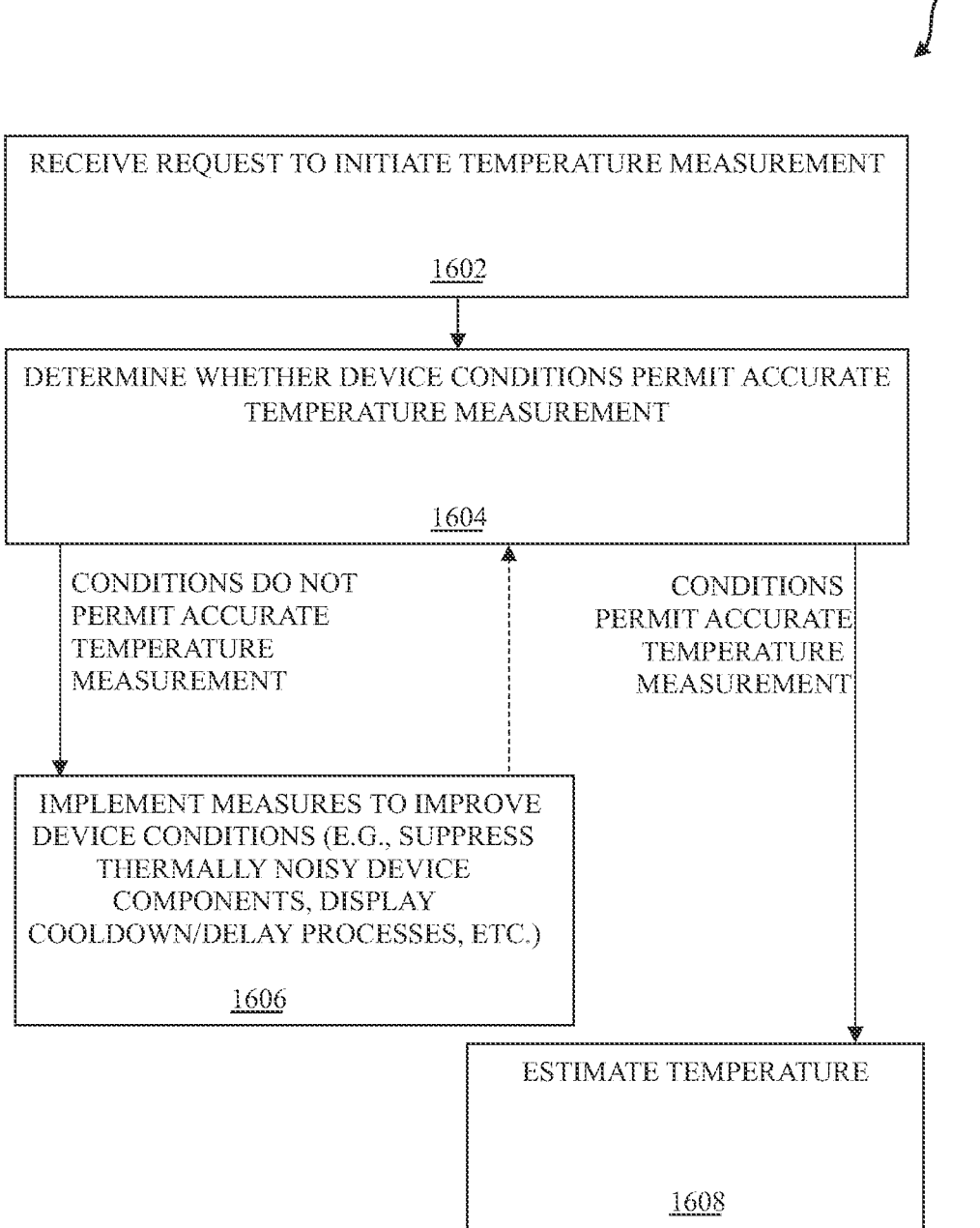
FIG. 16 illustrates another example process of operating a device for temperature sensing operations according to some examples of the disclosure.

FIG. 16 illustrates another example process of operating a device for temperature sensing operations according to some examples of the disclosure. For example, process 1600 can estimate temperature when certain criteria are satisfied (e.g., the criteria relating to those conditions describe with reference to process 1500 and/or the temperature and/or power consumption conditions at the device, as described herein). At 1602, the system can receive a user request to initiate temperature measurement at an outer surface of the device (e.g., wrist, forehead, etc.).

At 1604, the system can determine whether device conditions permit accurate temperature measurement. In some examples, the system can monitor sensors such as touch screen 220, motion and/or orientation sensors 230, optical sensors 211, temperature sensors 250, power dissipation monitoring circuitry 213, etc. In particular, sensor data from these sensors can be monitored to determine whether one or more criteria are satisfied for a temperature measurement. The one or more criteria can include contact conditions between the device and the target of temperature measurement (e.g., ensuring a user and the device is relatively stationary, ensuring good contact between the device and a user's skin, wrist, forehead, temples, or ambient air) and/or the aggressor conditions of the device (e.g., internal device temperature and/or power consumption are above a threshold, thermal aggressive processes are in progress (e.g., GPS tracking, etc.).

When, the system determines that conditions do not permit accurate temperature measurement, the system can forgo temperature measurement or alternatively attempt to improve device conditions. When, the system determines that device conditions permit accurate temperature measurement, the system can estimate temperature as described herein (e.g., with respect to process 1400). In some examples, the system can track and/or report (e.g., display on the display) the estimated temperature to the user.

In some examples, at 1606, the system can implement measures to improve device conditions. In some examples, the system can provide a user with instructions to meet the one or more criteria. For example, the user can be instructed (e.g., via audio, visual, textual cues) to reduce motion and/or improve contact between the outer surface of the device and the user's skin. In some examples, the system (e.g., host processor 210, power management circuitry 209) can suppress or interrupt power delivery to components associated with high heat dissipation, or thermal aggression, especially those components located near temperature sensors 250. As another example, host processor 210 can ask the user to throttle, terminate, or delay system processes that may be thermally aggressive. For example, the system can reduce display intensity, power-down a high power processor, temporarily disable or throttle communications using cellular, Wi-Fi, Bluetooth, or GPS. The system can return to determine whether conditions are met for accurate and reliable temperature sensor measurements at 1604 as or after the system implements the measures to improve device conditions.

Figure 17:
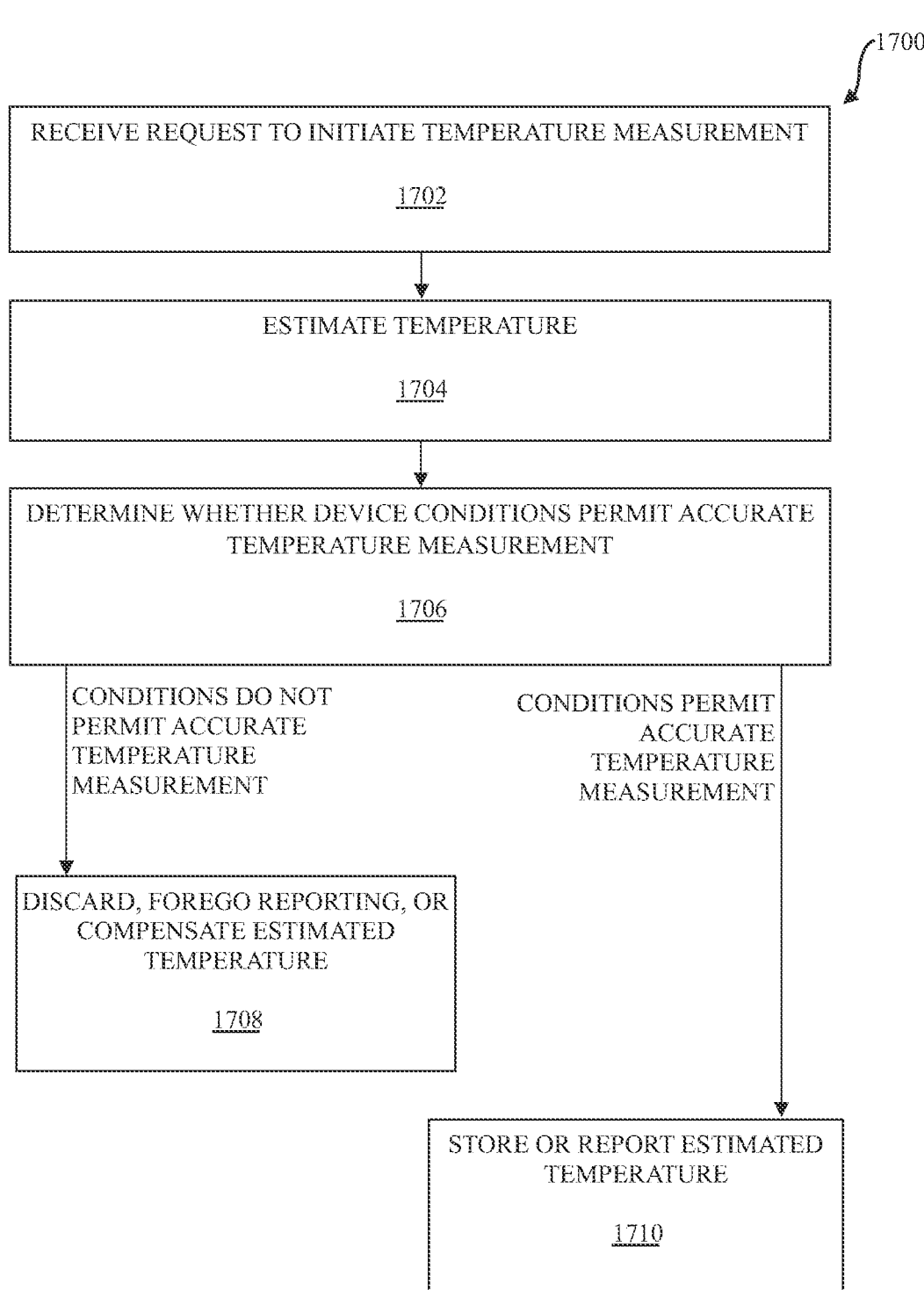
FIG. 17 illustrates another example process of operating a device for temperature sensing operations according to some examples of the disclosure.

FIG. 17 illustrates another example process of operating a device for temperature sensing operations according to some examples of the disclosure. For examples, process 1700 can cause the device to report, store and/or display temperature estimates when one or more criteria are satisfied (e.g., indicative of a quality temperature measurement), whereas the process 1700 can cause the device to suppress or discard (e.g., not report, store and/or display) a temperature estimate when the one or more criteria are not satisfied. At 1702, that system can receive a user request to initiate temperature measurement as described herein similarly at 1502 and 1602 in processes 1500 and 1600. At 1704, the system can (host processor 210 and/or temperature sensor controller 240, etc.) can estimate temperature at or outside an outer surface of the device (e.g., as described with reference to FIG. 14 or FIG. 16 and not repeated here for brevity).

At 1706, the system can determine whether device conditions permit accurate temperature measurement (e.g., in the same or in a similar manner as described with reference to 1510 of process 1500 or 1604 of process 1600, and not repeated here for brevity).

When the system determines that device conditions during the measurement do not permit accurate temperature measurement (e.g., because of motion/poor contact or because of power/temperature conditions on the device), the system can discard the temperature estimate and/or forego reporting the temperature estimated at 1708. Alternatively, using measurements from the power dissipation monitoring circuitry and/or a model to derive the impact of the power consumption of certain components (e.g., thermal aggressors of system 200), the temperature estimate can be compensated to remove the impact of the thermal aggressors.

When the system determines that device conditions did permit accurate temperature measurement, the system can store and/or report (1710) the estimated temperature to a user (e.g., display on the display).

As described herein, in some examples, the system includes two or more absolute temperature sensors to estimate temperature inside or outside the device. FIG. 18 illustrates a cross-sectional side view of an exemplary electronic device including one or more printed circuit boards and temperature sensing circuitry according to some examples of the disclosure. Wearable device 1800 can correspond to the wearable device 400 of FIG. 4A, with additional features. Also, wearable device 1800 can correspond to a device 150 of FIG. 1E and/or 160 of FIG. 1F (or more generally can correspond to any of the electronic devices illustrated by FIGS. 1A-1G). Further, one or more like elements and like features of wearable device 1800 optionally correspond to one or more like elements and like features of wearable device 400 of FIG. 4A, wearable device 600 of FIG. 6A, and/or wearable device 1100 of FIG. 11A. Device 1800 can include a housing 1810 secured to user 1860 via a strap 1812 or any other suitable fastener (e.g., corresponding to strap 154 and housing 164). In some examples, device 1800 can be secured to the user 1860 (e.g., exposed skin on the user's body). Device 1800 can correspond to a watch, a fitness tracker, bracelet, wrist band, or any other device (e.g., optionally used to measure physiological signals associated with user 1860). Device 1800 can attach to user 1860 around the wrist, arm, head, neck, or on any exposed surface of the body that is suitable for measuring physiological signals associated with the user.

Multiple printed circuit boards (PCBs) 1820, 1830, and 1840 are illustrated inside housing 1810. For example, PCB 1820 can be located inside device 1800, at a front face (sometimes referred to as a "front crystal"). In some examples, PCB 1820 can be used to implement a touch sensor panel, display and/or touch screen (e.g., touch screen 220) disposed below the front face. In the illustrated example, an absolute temperature sensor 1821 (e.g., a discrete absolute temperature sensor) is mounted to the PCB 1820. In some examples, the absolute temperature sensor 1821 is mounted on a first side (e.g., bottom side) of the PCB 1820. In some examples, the absolute temperature sensor 1821 is mounted on a second side (e.g., top side) of the PCB 1820. In some examples, the absolute temperature sensor 1821 is mounted on two sides of the PCB 1820 (e.g., a top side and a bottom side) or is embedded within the PCB 1820.

PCB 1830 can be located inside device 1800, between PCB 1820 and 1840. In some examples, PCB 1830 includes host processor 210, program storage 202, touch and display controller 216, optical sensor controller 212 and/or temperature sensor controller 240. In the illustrated example, an absolute temperature sensor 1832 (e.g., similar to absolute temperature sensor 254 of FIG. 2) is mounted to PCB 1830. Although illustrated as mounted to the top side of PCB 1830, absolute temperature sensor 1832 is optionally embedded within the PCB 1830 or mounted to the bottom side or both the top and bottom sides of PCB 1830.

In the illustrated example, PCB 1840 is located inside device 1800, below PCB 1830 at or in proximity to a back face 1850 (sometimes referred to as a "back crystal"). In some examples, PCB 1840 can additionally or alternatively include an absolute temperature sensor 1842 (e.g., a discrete absolute temperature sensor). Although illustrated as mounted to the top side of PCB 1840, absolute temperature sensor 1842 is optionally embedded within the PCB 1840, mounted to the bottom side or both the top and bottom sides of PCB 1840. It should be noted that the absolute temperature sensors discussed with reference to FIG. 18 are optionally discrete absolute temperature sensors and are optionally manufactured by the same entity or different entities.

In some examples, absolute temperature sensor 1842 can be separated from back face 1850 by PCB 1840, and PCB 1840 can be separated from housing 1810 (e.g., without direct contact with housing 1810 due to the existence of one or more intervening layers or an air gap). In the illustrated example, the device 1800 includes conductive segments 1852 (e.g., rods, vias, or another type of conductive segments, including copper or another type of thermally conductive material). Each of the illustrated conductive segments 1852 optionally represent one or more conductive segments, though in various examples, more or fewer conductive segments are included in the electronic device. The conductive segments optionally reduce thermal resistance (increase thermal conductivity) between PCB 1830 and back crystal 1850.

PCB 1840 can include optical sensors 211 configured to emit light and detect light through back face 1850 (e.g., light emitters and detectors mounted on the opposite side of PCB 1840). The number of PCBs, the number of temperature sensors, and placement of PCBs and distribution of components between the PCBs shown in FIG. 18 is representative and non-limiting. For example, fewer or more PCBs can be used, fewer temperature sensors can be used (e.g., omitting either absolute temperature sensor 1832 or absolute temperature sensor 1842), more temperature sensors can be used than in the illustrated exemplary device, or the components of system 200 can be distributed differently across the one or more PCBs. For examples, in some examples, the device 1800 includes the absolute temperature sensors 1821 and 1842, without including the absolute temperature sensor 1832. Although the absolute temperature sensors shown in FIG. 18 are mounted to a corresponding PCB, it is understood that temperature sensors are not limited to being mounted to a PCB. One or more absolute temperature sensors can be integrated into the device (e.g., bonded to the housing, integrated within another component or within a PCB, etc.). Additionally, more than one absolute temperature sensor can be mounted to the same PCB.

In some examples, heat flux through device 1800 can be calculated using one or more of discrete absolute temperature sensors 1821, 1832, 1842 (with or without the use of a thermopile). As an example, the temperature measured by sensor 1842 can be subtracted from the temperature measured by sensor 1832 to determine a temperature difference between the absolute temperature sensors mounted to PCB 1830 and PCB 1840. This temperature difference can then be used to calculate heat flux through the device, as well as estimating a temperature outside of the device (e.g., ambient air temperature at the back crystal or body temperature at back crystal 450).

Figure 19:
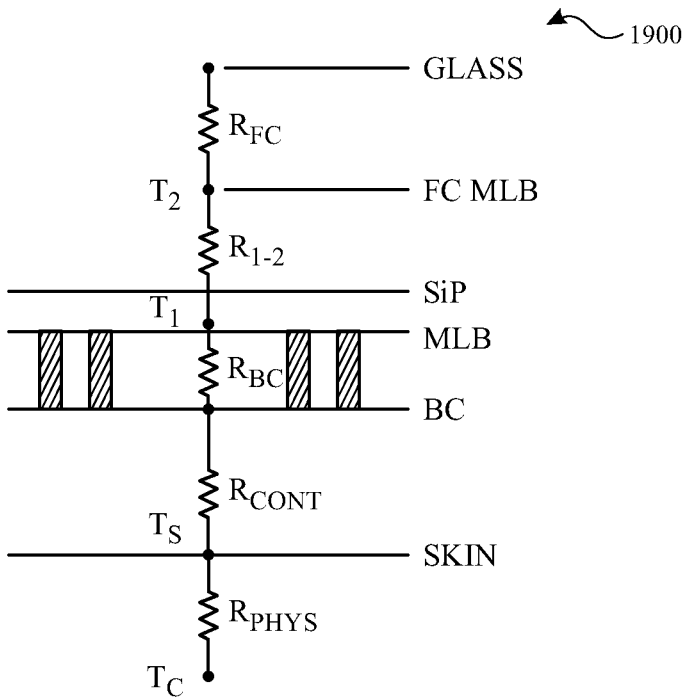
FIG. 19 illustrates simplified schematic view of a heat flux model for an electronic device relative to a user's body according to some examples of the disclosure.

FIG. 19 illustrates simplified schematic view of heat flux models for an electronic device relative to a user's body according to some examples of the disclosure. One or more like elements and like features of model 1900 wearable device 1800 optionally correspond to like one or more elements and like features of model 500 and/or model 550. In the illustrated example, a thermal resistance $R_{FC}$ is in between a glass portion and a FC MLB (front crystal main logical board). In the illustrated example, an absolute temperature sensor that measures temperature $T_2$ is disposed on the FC MLB (e.g., on the PCB 1820 of FIG. 18). In the illustrated example, $R_{1\text{-}2}$ corresponds to a thermal resistance in between a distance between the absolute temperature sensor that measures temperature $T_2$ and the absolute temperature sensor that measures temperature $T_1$, which in the illustrated example, is below system-in-package (SiP) circuitry (e.g., below the PCB 1830 of FIG. 18) and mounted to a main logic board (e.g., the PCB 1840 of FIG. 18).

In addition, the model 1900 includes conductive segments for increasing a thermal conductivity (reducing a thermal resistivity $R_{BC}$) between a printed circuit board (e.g., PCB 1840 and the back crystal (e.g., back crystal 1850). In some examples, the electronic device includes a material (e.g., a substrate or an injected molded plastic material such as a liquid crystal polymer) having a low thermal conductivity (and thus a high resistivity) in between the MLB (e.g., a logic board such as a main logic board) and the BC (back crystal). Such material may reduce undesirable coupling between components of the electronic device such as between the PCB and the back crystal. However, it is desirable to have an ample level of conductivity between the MLB and BC so that $R_{BC}$ (e.g., $R_{1\text{-}BC}$ of FIG. 5B) is reduced, which may likewise reduce $a_0$ described above in the present disclosure with reference to model 550. Reducing error in temperature $T_{BC}$ (e.g., a temperature corresponding the back crystal that optionally contacts the user) may increase thermal coupling to the skin of the user. To increase thermal conductivity (e.g., reduce $R_{BC}$ (e.g., $R_{1\text{-}BC}$ of FIG. 5B)), conductive segments are disposed between a printed circuit board (e.g., PCB 1840 of FIG. 18 and the back crystal (e.g., back crystal 1850 of FIG. 18). In some examples, a method for manufacturing the electronic device includes embedding and/or sprinkling conductive segments (e.g., vias such as copper vias) in the material (e.g., an injected molded plastic material such as a liquid crystal polymer) having a low thermal conductivity (and thus a high resistivity) in between the MLB and the BC. In some examples, the method includes adding a thermal conductive pressure sensitive adhesive (PSA) to adhere to the layers in which the conductive segments are added. In some examples, a method for manufacturing the electronic device includes adding the conductive segments using a process like a laser direct structuring (LDS) process. Another benefit of increasing thermal conductivity between the BC (back crystal) and the MLB that is under the SiP circuitry is that a settling time for internal thermal aggressors may be reduced, due to the coupling of the heat from the internal thermal aggressors (e.g., a power component, a haptic engine, one or more processors, a system-in-chip circuitry, or another internal thermal aggressor of the electronic device) to the skin of the user through the conductive segments (e.g., the skin of the user can serve as a heat sink for the heat generated by the internal thermal aggressors of the electronic device). For example, thermal aggressor noise amplitude, a rise time, and a fall time may be reduced via integration of the conductive segments into the electronic device.

Therefore, according to the above, some examples of the disclosure are directed to an electronic device (e.g., exemplary the electronic device of FIG. 18) that includes a plurality of absolute temperature sensors including a first absolute temperature sensor (e.g., absolute temperature sensor 1842 of FIG. 18) for measuring a first temperature at a first location in the electronic device and a second absolute temperature sensor (e.g., absolute temperature sensor 1821 of FIG. 18) for measuring a second temperature at a second location in the electronic device. The electronic device optionally also includes one or more processors (e.g., host processor 210 of FIG. 2 and/or other controllers or processors of FIG. 2) for estimating a temperature of a user of the electronic device, using the first temperature measured by the first absolute temperature sensor (e.g., $T_1$ as discussed with reference to FIG. 19), the second temperature measured by the second absolute temperature sensor (e.g., $T_2$ as discussed with reference to FIG. 19), a first thermal resistance between the first location in the electronic device the second location in the electronic device (e.g., $R_{1\text{-}2}$ as discussed with reference to FIG. 19) and a second thermal resistance between the electronic device and the user of the electronic device (e.g., $R_{CONT}$ and/or $R_{BC}$ as discussed with reference to FIG. 19).

In some examples, the electronic device further includes a first printed circuit board (e.g., PCB 1820) and a second printed circuit board (e.g., PCB 1840). The first absolute temperature sensor (e.g., absolute temperature sensor 1842) is optionally mounted to the first printed circuit board and the second absolute temperature sensor (e.g., absolute temperature sensor 1821) is optionally mounted to the second printed circuit board. In some examples, the first absolute temperature sensor (e.g., absolute temperature sensor 1842) mounted to the first printed circuit board and the second absolute temperature sensor (e.g., absolute temperature sensor 1821) mounted to the second printed circuit board are vertically aligned in the electronic device (or within a threshold horizontal tolerance from being vertically aligned). In other examples, the first absolute temperature sensor and the second absolute temperature sensor are not vertically aligned. In some examples, a distance between the first absolute temperature sensor and the second absolute temperature sensor in the electronic device is maximized. In other examples, the distance is minimized. In yet other examples, the distance is in between a maximum distance and a minimum allowable distance within the electronic device (e.g., the distance is 3 mm, 5 mm, 6 mm, or another distance). In some examples, the second printed circuit board (e.g., PCB 1820) includes circuitry for a touch operation or a display operation of the electronic device and the first printed circuit board (e.g., PCB 1820) includes circuitry for a physiological sensing operation of a physiological attribute of the user of the electronic device.

In some examples, the electronic device further includes a third printed circuit board (e.g., PCB 1830) between the first printed circuit board and the second printed circuit board. In some examples, system-in-package (SiP) circuitry is mounted to the third printed circuit board and the one or more processors are included in the SiP circuitry. In some examples, the electronic device includes a third absolute temperature sensor (e.g., absolute temperature sensor 1832) that is mounted to the third circuit board or anchored to a housing (e.g., housing 1810) of the electronic device.

In some examples, the second thermal resistance between the electronic device and the user of the electronic device corresponds to a thermal resistance of a contact interface between the electronic device and a skin of the user of the electronic device (e.g., $R_{CONT}$, such as described with reference to the models 550 and 1900) and a thermal resistance of tissue of the user of the electronic device (e.g., $R_{PHYS}$, such as described and/or illustrated with reference to the models 550 and/or 1900).

In some examples, the plurality of absolute temperature sensors of the electronic device further includes a third absolute temperature sensor for measuring a third temperature at a third location in the electronic device (e.g., absolute temperature sensor 1832) and a fourth absolute temperature sensor configured to measure a fourth temperature at a fourth location in the electronic device. In some examples, estimating the temperature of the user of the electronic device further uses the third temperature measured by the third absolute temperature sensor and the fourth temperature measured by the fourth absolute temperature sensor. As such, in some examples, the corrected skin temperature of the user, or $T_C$, (such as described and/or illustrated with reference to the models 550 and/or 1900) is optionally a function of the first temperature measure by the first absolute temperature sensor, the second temperature measured by the second absolute temperature sensor, the third temperature measured by the third absolute temperature sensor, and the fourth temperature measured by the fourth absolute temperature sensor and thermal resistance values that are based on the respective positions of the four absolute temperature sensors relative to the electronic device. As such, thermal resistances values different from the first thermal resistance and the second thermal resistance are optionally used and are based at least on respective positions of the four absolute temperature sensors relative to the electronic device. In some examples, the electronic device includes more than four absolute temperature sensors.

In some examples, the electronic device includes one or more conductive segments (e.g., rods, vias, or another shape of conductive segments) extending from the first printed circuit board toward an external surface of a housing of the electronic device and configured to increase a thermal conductivity (or reduce the thermal resistance) between the second absolute temperature sensor and the external surface of the housing, such as the conductive segments described with reference to FIGS. 18 and 19. In some examples, the one or more conductive rods are configured to contact the housing, pass at least through a portion of the housing, or are exposed on an outer surface of the housing.

In some examples, the first thermal resistance between the first location and the second location (such as $R_{1-2}$ described with reference to the models 550 and 1900) is determined using empirical measurements of one or more devices similar to the electronic device, without including the electronic device, such as via a factory calibration process or testing process. For example, empirical measurements can be made using a particular electronic device model and/or for a group of test users. One or more of the empirically derived thermal resistances can be used for temperature sensing by the electronic device of the same model type without requiring factory calibration of the thermal resistances for the electronic device.

In some examples, the first thermal resistance between the first location and the second location (such as $R_{1-2}$ described with reference to the models 550 and 1900) is determined using empirical measurements of one or more devices, including the electronic device, such as via a factory calibration process or testing process.

In some examples, the second thermal resistance corresponding to the second thermal resistance (such as $R_{CONT}$ and/or $R_{PHYS}$ described with reference to the models 550 and 1900) between the electronic device and the user of the electronic device is determined using empirical measurements that do not include measurement(s) of the user of the electronic device.

In some examples, the first thermal resistance (such as $R_{1-2}$ described with reference to the models 550 and 1900) and/or the second thermal resistance (such as $R_{CONT}$ and/or $R_{PHYS}$ described with reference to the models 550 and 1900) are determined using one or more stock keeping units (SKUs) (e.g., product identifier) of the electronic device or parts of the electronic device. For example, the one or more processors can perform operations for accessing the information corresponding to the one or more SKUs of the electronic device and determining the first thermal resistance (e.g., $R_{1-2}$ as discussed with reference to FIG. 19) based on the one or more SKUs. The information corresponding to the one or more SKUs optionally depend on a size of the electronic device, a material of a housing of the electronic device, a producer of the electronic device and/or parts thereof, and/or other elements of the electronic device and/or parts of thereof. For example, a first example of the device optionally includes a first set of SKU(s) indicating a first set of geometrical dimension(s) and material(s) of the device and a second example of the device optionally includes a second set of SKU(s) indicating a second set of geometrical dimensions and/or materials of the device, optionally different from the first set of geometrical dimensions and/or materials of the device. The thermal resistances derived for the first example of the device are optionally different from the thermal resistances derived for the second example of the device, based at least in part of the first set of SKU(s) and the second set of SKU(s), respectively. In some examples, the one or more thermal resistances can be stored or programmed in registers or other memory circuitry based on the SKU, and these one or more thermal resistances can be accessed for use in temperature sensing described herein.

In some examples, the second thermal resistance (such as $R_{CONT}$ and/or $R_{PHYS}$ described with reference to the models 550 and 1900) is determined during calibration (e.g., by the user and/or field calibration) while contacting the user of the electronic device (e.g., while worn by the user).

In some examples, the electronic device can operate in at least two power modes, including a first power mode and a second power mode, whereby power usage of the electronic device in the second power mode (e.g., which optionally includes operation of the lower power processor 211-1 of FIG. 2) is less than power usage of the electronic device in the first power mode (which optionally includes operation of the higher power processor 211-2 of FIG. 2). In some examples, the one or more processors estimate the temperature of the user while the electronic device is operating in the second power mode. In some examples, the one or more processors estimate the temperature of the user while the electronic device is operating in the first power mode. In some examples, the one or more processors can estimate the temperature of the user while the electronic device is operating in the first power mode and estimate the temperature of the user while the electronic device is operating in the second power mode. In some examples, the use of temperature sensing in different modes is optionally determined based on the suitability of conditions for a qualifying temperature sensing measurement as described with reference to process 1500.

In some examples, a first distance between the second location (e.g., the location at which the absolute temperature sensor 1821 of FIG. 18 measures the second temperature) and the user of the electronic device (e.g., skin of the user 1860) is greater than a threshold distance such as 2 mm, 3 mm, 5 mm, 6 mm, or another threshold distance. In some examples, a second distance (e.g., the distance 1862 of FIG. 18) between the second location (e.g., the location at which the absolute temperature sensor 1821 of FIG. 18 measures the second temperature) and the back crystal of the electronic device (e.g., the back face 1850) or surface of the electronic device configured to contact skin of the user is greater than a threshold distance such as 2 mm, 3 mm, 5 mm, or another threshold distance that is optionally greater than 5 mm. In some examples, a third distance between the first location (e.g., the location at which the absolute temperature sensor 1842 of FIG. 18 measures the second temperature) and the user of the electronic device (e.g., skin of the user 1860) is greater than a threshold distance such as 1 mm, 2 mm, 5 mm, or another threshold distance.

In some examples, a method is performed at an electronic device (e.g., exemplary the electronic device of FIG. 18) including a plurality of absolute temperature sensors including a first absolute temperature sensor (e.g., absolute temperature sensor 1842 of FIG. 18) and a second absolute temperature sensor (e.g., absolute temperature sensor 1821 of FIG. 18). The method includes measuring a first temperature at a first location in the electronic device using the first absolute temperature sensor (e.g., $T_1$ as discussed with reference to FIG. 19), measuring a second temperature at a second location in the electronic device, different from the first location, using the second absolute temperature sensor (e.g., $T_2$ as discussed with reference to FIG. 19), and estimating a temperature of a user of the electronic device, using: the first temperature measured by the first absolute temperature sensor (e.g., $T_1$ as discussed with reference to FIG. 19), the second temperature measured by the second absolute temperature sensor (e.g., $T_2$ as discussed with reference to FIG. 19), a first thermal resistance between the first location in the electronic device and the second location in the electronic device (e.g., $R_{1-2}$ as discussed with reference to FIG. 19), and a second thermal resistance between the electronic device and the user of the electronic device (e.g., $R_{CONT}$ and/or $R_{BC}$ as discussed with reference to FIG. 19). In some examples, the method includes one or more additionally operations described in this present disclosure.

In some examples, a non-transitory computer readable storage medium storing one or more programs, the one or more programs comprising instructions, which when executed by one or more processors of an electronic device (e.g., exemplary the electronic device of FIG. 18) including a plurality of absolute temperature sensors including a first absolute temperature sensor (e.g., absolute temperature sensor 1842 of FIG. 18) and a second absolute temperature sensor (e.g., absolute temperature sensor 1821 of FIG. 18), cause the electronic device to perform the method discussed above. Additionally, in some examples, the method includes one or more additional operations described in the disclosure.

Some examples of the disclosure are directed to a heat flux sensor comprising: a printed circuit board (PCB) comprising a thermopile, wherein the thermopile comprises a plurality of thermocouples in series, and wherein the PCB is rigid; a plurality of vias in the PCB comprising one or more first vias from a first layer of the PCB to a second layer of the PCB comprising a first conductive material with a first Seebeck coefficient and one or more second vias from a first layer of the PCB to the second layer of the PCB comprising a second conductive material with a second Seebeck coefficient, different from the first Seebeck coefficient; a plurality of conductive traces on the first layer of the PCB and on the second layer of the PCB, the plurality of conductive traces interconnecting the plurality of vias; and sensing circuitry coupled to the thermopile and configured to measure a voltage proportional to a temperature gradient between the first layer and the second layer of the PCB. Additionally or alternatively, in some examples, each of the plurality of thermocouples comprises one of the first vias and one of the second vias coupled by one of the plurality of conductive traces. Additionally or alternatively, in some examples, the plurality of vias comprise through-hole vias from the first layer to the second layer. Additionally or alternatively, in some examples, the PCB comprises a third layer and a fourth layer, the third layer and the fourth layer between the first layer and the second layer; and the plurality of vias comprise through-hole vias. Additionally or alternatively, in some examples, the PCB comprises a third layer and a fourth layer, the first layer and the second layer between the third layer and the fourth layer; and the plurality of vias comprise buried vias. Additionally or alternatively, in some examples, the PCB comprises a third layer and a fourth layer, the first layer and the second layer above the third layer and the fourth layer or the first layer and the second layer below the third layer and the fourth layer; and the plurality of vias comprise blind vias. Additionally or alternatively, in some examples, the sensing circuitry comprises: a differential amplifier coupled to the thermopile, wherein a first terminal of the thermopile is coupled to a first input of the differential amplifier and a second terminal of the thermopile is coupled to a second input of the amplifier, different from the first input of the amplifier. Additionally or alternatively, in some examples, the sensing circuitry further comprises: an analog-to-digital converter coupled to an output of the differential amplifier configured to convert the output to a digital signal. Additionally or alternatively, in some examples, the sensing circuitry is mounted on a surface of the PCB. Additionally or alternatively, in some examples, the first Seebeck coefficient is a positive Seebeck coefficient and the second Seebeck coefficient is a negative Seebeck coefficient. Additionally or alternatively, in some examples, the first conductive material is copper and the second conductive material is constantan. Additionally or alternatively, in some examples, the plurality of conductive traces comprises copper. Additionally or alternatively, in some examples, the PCB has a thickness greater than 300 micron. Additionally or alternatively, in some examples, the PCB has a thickness greater than 1 millimeter.

Some examples are directed to an electronic device including an absolute temperature sensor configured to estimate a first temperature; a heat flux sensor comprising: one or more printed circuit boards (PCBs) comprising a thermopile, wherein the thermopile comprises a plurality of thermocouples in series, and wherein the one or more PCBs are rigid; a plurality of vias in the one or more PCBs comprising one or more first vias from a first layer of the one or more PCBs to a second layer of the one or more PCBs comprising a first conductive material with a first Seebeck coefficient and one or more second vias from the first layer of the one or more PCBs to the second layer of the one or more PCBs comprising a second conductive material with a second Seebeck coefficient, different from the first Seebeck coefficient; a plurality of conductive traces on the first layer of the one or more PCB s and on the second layer of the one or more PCBs, the plurality of conductive traces interconnecting the plurality of vias; and sensing circuitry coupled to the thermopile and configured to measure a signal proportional to a temperature gradient, such as an electrical property such as a voltage signal, or another type of signal, between the first layer of the one or more PCBs and the second layer of the one or more PCBs; and processing circuitry coupled to the sensing circuitry and the absolute temperature sensor, the processing circuitry configured to estimate a second temperature using the first temperature and the signal proportional to the temperature gradient. Additionally or alternatively, in some examples, the absolute temperature sensor comprises: a negative temperature coefficient (NTC) temperature sensor, a resistance temperature detector (RTD), or a diode based temperature sensor. Additionally or alternatively, in some examples, the electronic device further includes a housing; wherein the absolute temperature sensor is disposed within the housing and configured to estimate the first temperature at a first location within the housing. Additionally or alternatively, in some examples, the electronic device is a wearable device, and the second temperature is a skin temperature at a point of contact between a user's skin and the wearable device. Additionally or alternatively, in some examples, the second temperature is an ambient temperature external to the electronic device. Additionally or alternatively, in some examples, the first temperature corresponds to a first location within the electronic device and the second temperature corresponds to a second location with the electronic device, the second located different than the first location. Additionally or alternatively, in some examples, the second location is separated from the first location by the one or more PCBs. Additionally or alternatively, in some examples, the electronic device further includes a display comprising the one or more PCBs. Additionally or alternatively, in some examples, the electronic device further includes an optical sensor comprising: one or more photo emitters; and one or more photodetectors; and wherein the one or more PCBs of heat flux sensor comprise a first PCB and a second PCB, wherein the one or more photo emitters and the one or more photodetectors of the optical sensor are disposed on the first PCB and the second PCB comprises an optical spacer between the optical sensor and a back crystal of the electronic device and wherein the second temperature corresponds to the optical sensor. Additionally or alternatively, in some examples, the first PCB and the second PCB are coupled together with an adhesive. Additionally or alternatively, in some examples, the processing circuitry is further configured to estimate a wavelength of at least one of the one or more photo emitters. Additionally or alternatively, in some examples, the processing circuitry is further configured to estimate a physiological characteristic using the optical sensor and the wavelength of the at least one of the one or more photo emitters. Additionally or alternatively, in some examples, the one or more PCBs have a thickness greater than 300 micron. Additionally or alternatively, in some examples, the one or more PCBs have a thickness greater than 1 millimeter.

Some examples are directed to a method comprising: measuring a first temperature at a first location using an absolute temperature sensor; estimating a heat flux through a rigid printed circuit board comprising a plurality of vias comprising one or more first vias comprising a first conductive material with a first Seebeck coefficient and one or more second vias comprising a second conductive material with a second Seebeck coefficient, different from the first Seebeck coefficient, wherein the plurality of vias are interconnected to form a thermopile; and estimating a second temperature at a second location different from the first location. Additionally or alternatively, in some examples, estimating the heat flux through the rigid printed circuit board comprises: measuring a differential voltage across the thermopile; and estimating the heat flux using the differential voltage, a thermal resistance of the rigid printed circuit board, and a thermoelectric sensitivity of the thermopile. Additionally or alternatively, in some examples, the second temperature measures a skin temperature at a point of contact between a user's skin and an electronic device comprising the rigid printed circuit board. Additionally or alternatively, in some examples, the second temperature is an ambient temperature external to an electronic device comprising the rigid printed circuit board. Additionally or alternatively, in some examples, the first temperature corresponds to a first location within an electronic device comprising the rigid printed circuit board and the second temperature corresponds to a second location with the electronic device, the second located separated from the first location by the rigid printed circuit board.

Some examples of the disclosure are directed to a heat flux sensor including a flexible printed circuit board (PCB) including a thermopile, wherein the thermopile comprises a plurality of thermocouples in series, the flexible PCB comprising: a first conductive layer comprising a first conductive material with a first Seebeck coefficient; a second conductive layer comprising a second conductive material with a second Seebeck coefficient, different from the first Seebeck coefficient; and a plurality of vias between the first conductive layer and the second conductive layer; and sensing circuitry coupled to the thermopile and configured to measure a voltage proportional to a temperature gradient between a first end of the flexible PCB and a second end of flexible PCB. Additionally or alternatively, in some examples, the first conductive layer is patterned with a first plurality of conductive traces of the first conductive material and the second conductive layer is patterned with a second plurality of conductive traces of the second conductive material. Additionally or alternatively, in some examples, each of the plurality of thermocouples comprises one of the first plurality of conductive traces and one of the second plurality of conductive traces coupled by one of the plurality of vias. Additionally or alternatively, in some examples, the plurality of vias includes a plurality of first vias and a plurality of second vias, wherein the plurality of first vias are disposed within a first threshold distance of the first end of the flexible PCB and wherein the plurality of second vias are disposed within a second threshold distance of the second end of the flexible PCB. Additionally or alternatively, in some examples, the first threshold distance and the second threshold distance are less than 50 micron. Additionally or alternatively, in some examples, a first conductive trace of the first plurality of conductive traces and second conductive trace of the first plurality of conductive traces each partially overlap with a first conductive trace of the second plurality of conductive traces, such that a first via of the plurality of vias through the flexible PCB electrically couples the first conductive trace of the first plurality of conductive traces to the first conductive trace of the second plurality of conductive traces and a second via of the plurality of vias through the flexible PCB electrically couples the second conductive trace of the first plurality of conductive traces to the first conductive trace of the second plurality of conductive traces. Additionally or alternatively, in some examples, the sensing circuitry comprises: a differential amplifier coupled to the thermopile, wherein a first terminal of the thermopile is coupled to a first input of the differential amplifier and a second terminal of the thermopile is coupled to a second input of the amplifier, different from the first input of the amplifier. Additionally or alternatively, in some examples, the sensing circuitry further comprises: an analog-to-digital converter coupled to an output of the differential amplifier configured to convert the output to a digital signal. Additionally or alternatively, in some examples, the sensing circuitry further comprises: a bias amplifier configured to generate a bias voltage as an output of the bias amplifier, wherein the output of the bias amplifier is coupled to a first input of the differential amplifier and coupled as a reference voltage to the analog-to-digital converter. Additionally or alternatively, in some examples, the sensing circuitry is mounted on a surface of a rigid PCB and the first end of the flexible PCB is coupled to the rigid PCB. Additionally or alternatively, in some examples, the first end of the flexible PCB is bonded to the rigid PCB with a conductive adhesive. Additionally or alternatively, in some examples, the first Seebeck coefficient is a positive Seebeck coefficient and the second Seebeck coefficient is a negative Seebeck coefficient. Additionally or alternatively, in some examples, the first conductive material is copper and the second conductive material is constantan. Additionally or alternatively, in some examples, the flexible PCB includes one or more signal traces or one or more power traces independent of the thermopile, the one or more signal traces or the one or more power traces configured to route one or more signals or one or more power sources from the first end of the flexible PCB to the second end of the flexible PCB. Additionally or alternatively, in some examples, the flexible circuit comprises a third conductive layer comprising the first conductive material, the first conductive layer between the second conductive layer and the third conductive layer; the one or more signal traces are implemented in the first conductive layer using the first conductive material and are shielded by the second conductive material in the second conductive layer and by the first conductive material in the third conductive layer. Additionally or alternatively, in some examples, the flexible circuit comprises a third conductive layer comprising the first conductive material, the second conductive layer between the first conductive layer and the third conductive layer; the one or more signal traces are implemented in the second conductive layer using the second conductive material and are shielded by the first conductive material in the first conductive layer and by the first conductive material in the third conductive layer.

Some examples are directed to an electronic device comprising: a rigid printed circuit board (PCB); an absolute temperature sensor configured to estimate a first temperature and coupled to the rigid PCB; a heat flux sensor comprising: a flexible PCB including a thermopile, wherein the thermopile comprises a plurality of thermocouples in series, the flexible PCB comprising: a first conductive layer comprising a first conductive material with a first Seebeck coefficient; a second conductive layer comprising a second conductive material with a second Seebeck coefficient, different from the first Seebeck coefficient; and a plurality of vias between the first conductive layer and the second conductive layer; and sensing circuitry coupled to the thermopile configured to measure a voltage proportional to a temperature gradient between a first end of the flexible PCB coupled to the rigid PCB and a second end of flexible PCB; and processing circuitry coupled to the sensing circuitry and the absolute temperature sensor, the processing circuitry configured to estimate a second temperature using the first temperature and the signal proportional to the temperature gradient. Additionally or alternatively, in some examples, the absolute temperature sensor comprises: a negative temperature coefficient (NTC) temperature sensor, a resistance temperature detector (RTD), or a diode based temperature sensor. Additionally or alternatively, in some examples, the electronic device further includes a housing; wherein the absolute temperature sensor is disposed within the housing and configured to estimate the first temperature at a first location within the housing. Additionally or alternatively, in some examples, the electronic device is a wearable device, and the second temperature is a skin temperature at a point of contact between a user's skin and the wearable device. Additionally or alternatively, in some examples, the second temperature is an ambient temperature external to the electronic device. Additionally or alternatively, in some examples, the first temperature corresponds to a first location within the electronic device and the second temperature corresponds to a second location with the electronic device, the second located different than the first location. Additionally or alternatively, in some examples, the second location is a back crystal of the electronic device. Additionally or alternatively, in some examples, the second location is a second rigid PCB of the electronic device. Additionally or alternatively, in some examples, the electronic device further includes an optical sensor comprising: one or more photo emitters; and one or more photodetectors; and wherein the first end of the flexible PCB or the second end of the flexible PCB is coupled to the optical sensor. Additionally or alternatively, in some examples, the one or more photo emitters and the one or more photo detectors are coupled to the rigid PCB. Additionally or alternatively, in some examples, the one or more photo emitters and the one or more photodetectors are coupled to a second PCB of the electronic device, the first end of the flexible PCB is coupled to the second rigid PCB, and the second end of the flexible PCB is coupled to the rigid PCB.

Some examples are directed to a method comprising: measuring a first temperature at a first location using an absolute temperature sensor; estimating a heat flux across a flexible printed circuit board comprising a first conductive layer having a first conductive material with a first Seebeck coefficient, a second conductive layer having a second conductive material with a second Seebeck coefficient, different from the first Seebeck coefficient, and a plurality of vias interconnecting segments of the first conductive material and segments of the second conductive material to form a thermopile; and estimating a second temperature at a second location different from the first location. Additionally or alternatively, in some examples, estimating the heat flux across the flexible printed circuit board comprises: measuring a differential voltage across the thermopile; and estimating the heat flux using the differential voltage, a thermal resistance of the flexible printed circuit board, and a thermoelectric sensitivity of the thermopile. Additionally or alternatively, in some examples, the second temperature measures a skin temperature at a point of contact between a user's skin and an electronic device comprising the flexible printed circuit board. Additionally or alternatively, in some examples, the second temperature is an ambient temperature external to an electronic device comprising the flexible printed circuit board.

Some examples of the disclosure are directed to measuring a first temperature at a first location using an absolute temperature sensor; estimating a temperature differential across a flexible printed circuit board (PCB) comprising a thermopile; estimating a second temperature at a second location, different from the first location, corresponding to a first light emitter; and estimating a wavelength of light emitted from the first light emitter based on the second temperature. Additionally or alternatively, in some examples the method further includes adjusting a driving parameter of the first light emitter based on the estimated wavelength of light emitted from the first light emitter. Additionally or alternatively, in some examples adjusting the driving parameter comprises adjusting a drive current applied to the first light emitter. Additionally or alternatively, in some examples the method includes compensating an estimation of a physiological characteristic from light detected by a photodetector based on the estimated wavelength of light emitted from the first light emitter. Additionally or alternatively, in some examples the method includes estimating a second temperature differential across a second flexible printed circuit board (PCB) comprising a second thermopile; estimating a third temperature at a third location, different from the first location and the second location, corresponding to a second light emitter; and estimating a wavelength of light emitted from the second light emitter based on the second temperature. Additionally or alternatively, in some examples the method includes adjusting a driving parameter of the first light emitter based on the estimated wavelength of light emitted from the first light emitter and/or a driving parameter of the second light emitter based on the estimated wavelength of light emitted from the second light emitter; and/or compensating an estimation of a physiological characteristic from light detected by one or more photodetectors based on the estimated wavelength of light emitted from the first light emitter and/or based on the estimated wavelength of light emitted from the second light emitter. Additionally or alternatively, in some examples the flexible PCB further comprises a second thermopile, the method further comprising: estimating a second temperature differential across the flexible PCB using the second thermopile; estimating a third temperature at a third location, different from the first location and the second location, corresponding to a second light emitter; and estimating a wavelength of light emitted from the second light emitter based on the second temperature. Additionally or alternatively, in some examples the method includes adjusting a driving parameter of the first light emitter based on the estimated wavelength of light emitted from the first light emitter and/or a driving parameter of the second light emitter based on the estimated wavelength of light emitted from the second light emitter; and/or compensating an estimation of a physiological characteristic from light detected by one or more photodetectors based on the estimated wavelength of light emitted from the first light emitter and/or based on the estimated wavelength of light emitted from the second light emitter. Additionally or alternatively, in some examples the flexible PCB comprises a first conductive layer having a first conductive material with a first Seebeck coefficient, a second conductive layer having a second conductive material with a second Seebeck coefficient, different from the first Seebeck coefficient, and a plurality of vias interconnecting segments of the first conductive material and segments of the second conductive material to form the thermopile. It should be noted that the wavelength estimation techniques disclosed herein can be applied to any LED/PD (e.g., light emitting diode/photodetector or photodiode components that are located at any location in the device.

Some examples of the disclosure are directed to a first photo emitter; a first photodetector; a first flexible printed circuit board (PCB) including a first thermopile; optical circuitry configured to drive the first photo emitter and measure the first photodetector; an absolute temperature sensor configured to estimate a first temperature; thermopile sensing circuitry coupled to the first thermopile and configured to measure a signal proportional to a temperature gradient, such as an electrical property such as a voltage signal, or another type of signal, between a first end of the first flexible PCB and a second end of first flexible PCB; and processing circuitry coupled to the thermopile sensing circuitry and the absolute temperature sensor, the processing circuitry configured to: estimate a second temperature at the first photo emitter using the first temperature and the signal proportional to the temperature gradient between the first end of the first flexible PCB and the second end of first flexible PCB; and estimate a wavelength of light emitted by the first photo emitter. Additionally or alternatively, in some examples the processing circuitry further configured to: adjust a driving parameter of the first light emitter using the estimated wavelength of light emitted from the first photo emitter. Additionally or alternatively, in some examples adjusting the driving parameter comprises adjusting a drive current applied to the first photo emitter. Additionally or alternatively, in some examples the processing circuitry is further configured to: compensate an estimation of a physiological characteristic from light detected by a photodetector based on the estimated wavelength of light emitted from the first photo emitter. Additionally or alternatively, in some examples the optical circuitry, the absolute temperature sensor, the thermopile sensing circuitry and the processing circuitry are integrated in an integrated circuit. Additionally or alternatively, in some examples the first photo emitter and the first photodetector are disposed on the first flexible PCB at the second end of the first flexible PCB. Additionally or alternatively, in some examples the first flexible PCB comprises routing trace configured to route the first photo emitter and the first photodetector to the optical circuitry. Additionally or alternatively, in some examples the electronic device further includes a second photo emitter; a second photodetector; a second flexible PCB including a second thermopile; wherein: the optical circuitry is further configured to drive the second photo emitter and measure the second photodetector; the thermopile sensing circuitry is coupled to the second thermopile and configured to measure a signal proportional to a temperature gradient, such as an electrical property such as a voltage signal, or another type of signal, between a first end of the second flexible PCB and a second end of the second flexible PCB; and the processing circuitry is further configured to: estimate a third temperature at the second photo emitter using the first temperature and the signal proportional to the temperature gradient between the first end of the second flexible PCB and the second end of the second flexible PCB; and estimate a wavelength of light emitted by the second photo emitter. Additionally or alternatively, in some examples the second photo emitter and the second photodetector are disposed on the second flexible PCB at the second end of the second flexible PCB. Additionally or alternatively, in some examples the electronic device further includes a second photo emitter; a second photodetector; wherein: the first flexible PCB further including a second thermopile; the optical circuitry is further configured to drive the second photo emitter and measure the second photodetector; the thermopile sensing circuitry is coupled to the second thermopile and configured to measure a signal proportional to a temperature gradient, such as an electrical property such as a voltage signal, or another type of signal, between a first end of the first flexible PCB and a second end of first flexible PCB; and the processing circuitry is further configured to: estimate a third temperature at the second photo emitter using the first temperature and the signal proportional to the temperature gradient between the first end of the first flexible PCB and the second end of the first flexible PCB; and estimate a wavelength of light emitted by the second photo emitter. Additionally or alternatively, in some examples the first thermopile comprises a plurality of thermocouples in series, the first flexible PCB comprising: a first conductive layer comprising a first conductive material with a first Seebeck coefficient; a second conductive layer comprising a second conductive material with a second Seebeck coefficient, different from the first Seebeck coefficient; and a plurality of vias between the first conductive layer and the second conductive layer. Additionally or alternatively, in some examples the electronic device is a wearable device.

Some examples are directed to a method comprising: monitoring one or more first sensors; in accordance with a determination that one or more criteria are satisfied, estimating a body temperature of a user, wherein estimating the body temperature of the user comprises: measuring a first temperature at a first location with an electronic device using an absolute temperature sensor; estimating a temperature differential across a flexible printed circuit board (PCB) comprising a thermopile; and estimating a second temperature at a second location, different from the first location; and in accordance with a determination that the one or more criteria are not satisfied, forgoing estimating the body temperature of a user. Additionally or alternatively, in some examples the one or more first sensors comprise a touch sensor and the one or more first criteria includes a criterion that is satisfied when an object touches the touch sensor. Additionally or alternatively, in some examples the one or more first sensors comprise a touch sensor and the one or more first criteria includes a criterion that is satisfied when an object touches greater than threshold area of the touch sensor. Additionally or alternatively, in some examples the one or more first sensors comprise a motion and/or orientation sensor. Additionally or alternatively, in some examples the motion and/or orientation sensor comprises an inertial measurement unit, an accelerometer, or a gyroscope. Additionally or alternatively, in some examples the one or more first criteria include a criterion that is satisfied when the motion and/or orientation sensor indicates less that a threshold amount of motion. Additionally or alternatively, in some examples the one or more first criteria include a criterion that is satisfied when the motion and/or orientation sensor indicates a motion of a wrist of the user to a forehead of the user. Additionally or alternatively, in some examples the one or more first sensors comprise the absolute temperature sensor and/or the thermopile, and wherein the one or more first criteria include an absolute temperature above a first temperature threshold and/or a temperature differential above a second temperature threshold.

Some examples are directed to an electronic device comprising: an absolute temperature sensor configured to estimate a first temperature at a first location within the electronic device; a flexible PCB including a thermopile; sensing circuitry coupled to the thermopile and configured to measure a voltage proportional to a temperature gradient across the thermopile; and processing circuitry coupled to the sensing circuitry and the absolute temperature sensor, the processing circuitry configured to: monitoring one or more first sensors; in accordance with a determination that one or more criteria are satisfied, estimating a body temperature of a user, wherein estimating the body temperature of the user comprises: measuring the first temperature at the first location using the absolute temperature sensor; estimating a temperature differential across the thermopile; and estimating a second temperature at a second location, different from the first location; and in accordance with a determination that the one or more criteria are not satisfied, forgoing estimating the body temperature of a user.

Some examples of the disclosure are directed to a method comprising: monitoring one or more first sensors; in accordance with a determination that one or more criteria are satisfied, estimating a body temperature of a user, wherein estimating the body temperature of the user comprises: measuring a first temperature at a first location with an electronic device using an absolute temperature sensor; estimating a temperature differential across a flexible printed circuit board (PCB) comprising a thermopile; and estimating a second temperature at a second location, different from the first location; and in accordance with a determination that the one or more criteria are not satisfied, forgoing estimating the body temperature of a user.

Additionally or alternatively, in some examples the one or more first sensors comprise a touch sensor and the one or more criteria includes a criterion that is satisfied when an object touches the touch sensor. Additionally or alternatively, in some examples the one or more first sensors comprise a touch sensor and the one or more criteria includes a criterion that is satisfied when an object contacts greater than a threshold area of the touch sensor. Additionally or alternatively, in some examples the one or more first sensors comprise a motion and/or orientation sensor. Additionally or alternatively, in some examples the motion and/or orientation sensor comprises an inertial measurement unit, an accelerometer, or a gyroscope. Additionally or alternatively, in some examples the one or more criteria include a criterion that is satisfied when the motion and/or orientation sensor indicates less than a threshold amount of motion. Additionally or alternatively, in some examples the one or more criteria include a criterion that is satisfied when the motion and/or orientation sensor indicates a motion of a wrist of the user to a forehead of the user. Additionally or alternatively, in some examples the one or more first sensors comprise the absolute temperature sensor and/or the thermopile, and wherein the one or more criteria include an absolute temperature above a first temperature threshold and/or a temperature differential above a second temperature threshold.

Some examples of the disclosure are directed toward an electronic device comprising: an absolute temperature sensor configured to estimate a first temperature at a first location within the electronic device; a flexible PCB including a thermopile; sensing circuitry coupled to the thermopile and configured to measure a voltage proportional to a temperature gradient across the thermopile; and processing circuitry coupled to the sensing circuitry and the absolute temperature sensor, the processing circuitry configured for: monitoring one or more first sensors; in accordance with a determination that one or more criteria are satisfied, estimating a body temperature of a user, wherein estimating the body temperature of the user comprises: measuring the first temperature at the first location using the absolute temperature sensor; estimating a temperature differential across the thermopile; and estimating a second temperature at a second location, different from the first location; and in accordance with a determination that the one or more criteria are not satisfied, forgoing estimating the body temperature of a user.

Some examples of the disclosure are directed toward a method comprising: receiving, at a device, a request to initiate a temperature measurement; in accordance with a determination that one or more criteria are satisfied, initiating the temperature measurement; and in accordance with a determination that the one or more criteria are not satisfied: implementing, at the device, one or more measures to satisfy the one or more criteria, and after implementing the one or measures, initiating the temperature measurement.

Additionally or alternatively, in some examples the one or more criteria include a criterion based on operating conditions associated with the device, the method further comprising: in accordance with the determination that the one or more criteria are satisfied: monitoring the operating conditions associated with the device, in response to initiating the temperature measurement; and compensating the temperature measurement based on the operating conditions. Additionally or alternatively, in some examples compensating the temperature measurement based on the operating conditions comprises: generating an adjusted temperature measurement by applying a temperature compensation model based on the operating conditions, to the temperature measurement. Additionally or alternatively, in some examples the temperature compensation model is based on a power draw associated with the device conditions, the method further comprising: displaying the adjusted temperature measurement. Additionally or alternatively, in some examples implementing the one or more measures comprises: instructing a user to adjust an orientation of the device relative to the user's skin. Additionally or alternatively, in some examples implementing the one or more measures comprises: instructing a user to reduce motion of the device. Additionally or alternatively, in some examples implementing the one or more measures comprises: instructing a user to modify interactions with the device, to minimize usage of device components associated with heat dissipation. Additionally or alternatively, in some examples implementing the one or more measures comprises: suppressing, at the device, power delivery to device components associated with heat dissipation. Additionally or alternatively, in some examples the device components associated with heat dissipation comprise a processor, a display, an antenna, cellular communication circuitry, Wi-Fi circuitry, Bluetooth circuitry, or GPS circuitry. Additionally or alternatively, in some examples the method further comprises: completing the temperature measurement; and restoring power delivery to device components associated with heat dissipation, in response to completing the temperature measurement. Additionally or alternatively, in some examples implementing the one or more measures comprises: changing an operational mode of the device to a lower-power mode associated with lower heat dissipation.

Some examples are directed to an electronic device comprising any of the heat flux sensors described above.

Some examples of the disclosure are directed to a non-transitory computer readable storage medium storing instructions, which when executed by an electronic device including processing circuitry, cause the device to perform any of the methods described above.

The present disclosure contemplates that the entities responsible for the collection, analysis, disclosure, transfer, storage, or other use of such personal data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should require receipt of the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. The policies and practices may be adapted depending on the geographic region and/or the particular type and nature of personal data being collected and used.

Despite the foregoing, the present disclosure also contemplates examples in which users selectively block the collection of, use of, or access to, personal data, including physiological information. For example, a user may be able to disable hardware and/or software elements that collect physiological information. Further, the present disclosure contemplates that hardware and/or software elements can be provided to prevent or block access to personal data that has already been collected. Specifically, users can select to remove, disable, or restrict access to certain health-related applications collecting users' personal health or fitness data.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An electronic device comprising:
an absolute temperature sensor configured to estimate a first temperature;
a back crystal;
an optical sensor comprising one or more photoemitters and one or more photodetectors; and
a heat flux sensor comprising:
a printed circuit board (PCB) comprising an optical spacer between the optical sensor and the back crystal of the electronic device, the PCB comprising a thermopile, wherein the thermopile comprises a plurality of thermocouples in series;

a plurality of vias in the PCB comprising one or more first vias from a first layer of the PCB to a second layer of the PCB comprising a first conductive material with a first Seebeck coefficient and one or more second vias from the first layer of the PCB to the second layer of the PCB comprising a second conductive material with a second Seebeck coefficient, different from the first Seebeck coefficient;

a plurality of conductive traces on the first layer of the PCB and on the second layer of the PCB, the plurality of conductive traces interconnecting the plurality of vias; and sensing circuitry coupled to the thermopile and configured to measure a voltage proportional to a temperature gradient between the first layer and the second layer of the PCB; and processing circuitry configured to estimate a second temperature at the optical sensor and/or at the back crystal using the voltage proportional to the temperature gradient and the first temperature.

2. The electronic device of claim 1, wherein each of the plurality of thermocouples comprises one of the first vias and one of the second vias coupled by one of the plurality of conductive traces.

3. The electronic device of claim 1, wherein the plurality of vias comprise through-hole vias through the first layer and the second layer.

4. The electronic device of claim 1, wherein:

the PCB comprises a third layer and a fourth layer, the third layer and the fourth layer between the first layer and the second layer; and the plurality of vias comprise through-hole vias.

5. The electronic device of claim 1, wherein:

the PCB comprises a third layer and a fourth layer, the first layer and the second layer between the third layer and the fourth layer; and the plurality of vias comprise buried vias.

6. The electronic device of claim 1, wherein:

the PCB comprises a third layer and a fourth layer, the first layer and the second layer above the third layer and the fourth layer or the first layer and the second layer below the third layer and the fourth layer; and the plurality of vias comprise blind vias.

7. The electronic device of claim 1, wherein the sensing circuitry is mounted on a surface of the PCB.

8. The electronic device of claim 1, wherein the first Seebeck coefficient is a positive Seebeck coefficient and the second Seebeck coefficient is a negative Seebeck coefficient.

9. The electronic device of claim 1, wherein the first conductive material is copper and the second conductive material is constantan.

10. The electronic device of claim 1, wherein the PCB has a thickness greater than 300 micron.

11. The electronic device of claim 1, wherein the PCB has a thickness greater than 1 millimeter.

12. The electronic device of claim 1, wherein the first temperature corresponds to a first location within the electronic device and the second temperature corresponds to a second location within the electronic device, the second location different than the first location.

13. The electronic device of claim 12, wherein the second location is separated from the first location by the PCB such that the second location is separated from the first location across a thickness of at least the PCB.

14. The electronic device of claim 1, further comprising:

a display comprising a second PCB.

15. The electronic device of claim 1, wherein the processing circuitry is further configured to estimate a physiological characteristic using the optical sensor and a wavelength of at least one of the one or more photoemitters.

16. A method comprising:

at an electronic device including an absolute temperature sensor and an optical sensor comprising one or more photoemitters and one or more photodetectors:

measuring a first temperature at a first location using the absolute temperature sensor;

estimating a heat flux through a printed circuit board comprising, an optical spacer between the optical sensor and a back crystal of the electronic device and further comprising a plurality of vias that comprise one or more first vias from a first layer of the PCB to a second layer of the PCB comprising a first conductive material with a first Seebeck coefficient and that further comprises one or more second vias comprising a second conductive material with a second Seebeck coefficient, different from the first Seebeck coefficient, wherein the plurality of vias are interconnected to form a thermopile; and estimating a second temperature at a second location different from the first location corresponding to the optical sensor and/or the back crystal using the first temperature and the estimated heat flux.

17. The method of claim 16, wherein estimating the heat flux through the printed circuit board comprises:

measuring a differential voltage across the thermopile; and estimating the heat flux using the differential voltage, a thermal resistance of the printed circuit board, and a thermoelectric sensitivity of the thermopile.

18. The method of claim 16, wherein the second temperature measures a skin temperature at a point of contact between a user's skin and the electronic device comprising the printed circuit board.

19. The method of claim 16, wherein the first temperature corresponds to the first location within the electronic device comprising the printed circuit board and the second temperature corresponds to the second location within the electronic device, the second location separated from the first location by the printed circuit board such that the second location is separated from the first location across a thickness of the printed circuit board.

20. The method of claim 16, further comprising:

estimating a physiological characteristic using the optical sensor and a wavelength of at least one of the one or more photoemitters.

* * * * *